(12) United States Patent
Park et al.

(10) Patent No.: US 10,721,775 B2
(45) Date of Patent: Jul. 21, 2020

(54) METHOD FOR PERFORMING EARLY DATA TRANSMISSION IN RANDOM ACCESS PROCEDURE IN WIRELESS COMMUNICATION SYSTEM AND APPARATUS THEREFOR

(71) Applicant: LG ELECTRONICS INC., Seoul (KR)

(72) Inventors: Changhwan Park, Seoul (KR); Seokmin Shin, Seoul (KR); Joonkui Ahn, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/257,960

(22) Filed: Jan. 25, 2019

(65) Prior Publication Data

US 2019/0215872 A1 Jul. 11, 2019

Related U.S. Application Data

(63) Continuation of application No. PCT/KR2018/014019, filed on Nov. 15, 2015.
(Continued)

(30) Foreign Application Priority Data

Apr. 5, 2018 (KR) .................. 10-2018-0039962
May 10, 2018 (KR) .................. 10-2018-0053640

(51) Int. Cl.
*H04W 74/08* (2009.01)
*H04W 52/02* (2009.01)
*H04W 74/00* (2009.01)

(52) U.S. Cl.
CPC .... *H04W 74/0833* (2013.01); *H04W 52/0209* (2013.01); *H04W 74/006* (2013.01)

(58) Field of Classification Search
CPC .............. H04W 52/0209; H04W 74/0833
(Continued)

(56) References Cited

U.S. PATENT DOCUMENTS

2010/0202288 A1* 8/2010 Park ............... H04W 48/08
370/230
2018/0227958 A1* 8/2018 Xiong ............. H04W 72/0406
(Continued)

FOREIGN PATENT DOCUMENTS

JP 2019-215038 * 11/2018 ............ H04W 74/08
WO WO-2012177993 A1 * 12/2012 ........... H04L 5/0023

OTHER PUBLICATIONS

ZTE, "On early data transmission for NB-IoT", 3GPP TSG RAN WG1 Meeting #90bis, Oct. 9-13, 2017, R1-1717213.
(Continued)

*Primary Examiner* — Robert J Lopata
(74) *Attorney, Agent, or Firm* — Dentons US LLP

(57) ABSTRACT

This specification provides a method for performing early data transmission in a random access procedure in a wireless communication system.
More specifically, the method performed by a user equipment (UE) includes: receiving, from a base station, a control message including first information indicating whether selection for a second transport size (TBS) smaller than a first TBS for message 3 is permitted and second information for the first TBS; transmitting, to the base station, a request for the EDT by using message 1; receiving, from the base station, message 2 including a UL grant for the message 3; determining a repetition number for the message 3 based on the control message and the UL grant; and transmitting the message 3 to the base station by the repetition number. Therefore, there is an effect that battery consumption of the UE can be reduced.

19 Claims, 19 Drawing Sheets

Related U.S. Application Data

(60) Provisional application No. 62/653,545, filed on Apr. 5, 2018, provisional application No. 62/630,842, filed on Feb. 15, 2016, provisional application No. 62/586,185, filed on Nov. 15, 2017.

(58) Field of Classification Search
USPC .......................................................... 370/338
See application file for complete search history.

(56) References Cited

U.S. PATENT DOCUMENTS

| | | | |
|---|---|---|---|
| 2018/0324869 A1* | 11/2018 | Phuyal | H04W 74/0833 |
| 2019/0045554 A1* | 2/2019 | Ye | H04W 74/0833 |
| 2019/0104553 A1* | 4/2019 | Johansson | H04W 76/19 |
| 2019/0141753 A1* | 5/2019 | Lin | H04W 74/0833 |
| 2019/0159260 A1* | 5/2019 | Charbit | H04L 1/0003 |
| 2019/0208411 A1* | 7/2019 | Shrestha | H04W 12/001 |
| 2019/0230499 A1* | 7/2019 | Sun | H04W 4/80 |

OTHER PUBLICATIONS

Huawei, HiSilicon, Neul, "Early data transmission for NB-IoT and eMTC", 3GPP TSG-RAN WG2 Meeting #99bis, Oct. 9-13, 2017, R2-1711325.

MediaTek Inc., "NPRACH resource partition for early data transmission", 3GPP TSG-RAN WG2 Meeting #99bis, Oct. 9-13, 2017, R2-1711633.

Nokia, Nokia Shanghai Bell, "Data transmission during random access procedure", 3GPP TSG RAN WG1 Meeting #90bis, Oct. 9-13, 2017, R1-1717229.

Ericsson, "Early data transmission for MTC", 3GPP TSG-RAN WG1 Meeting #90bis, Oct. 9-13, 2017, R1-1716996.

* cited by examiner

【Figure 1】
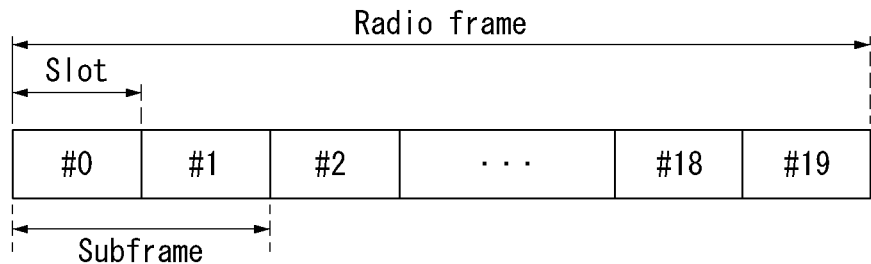
【Figure 2】
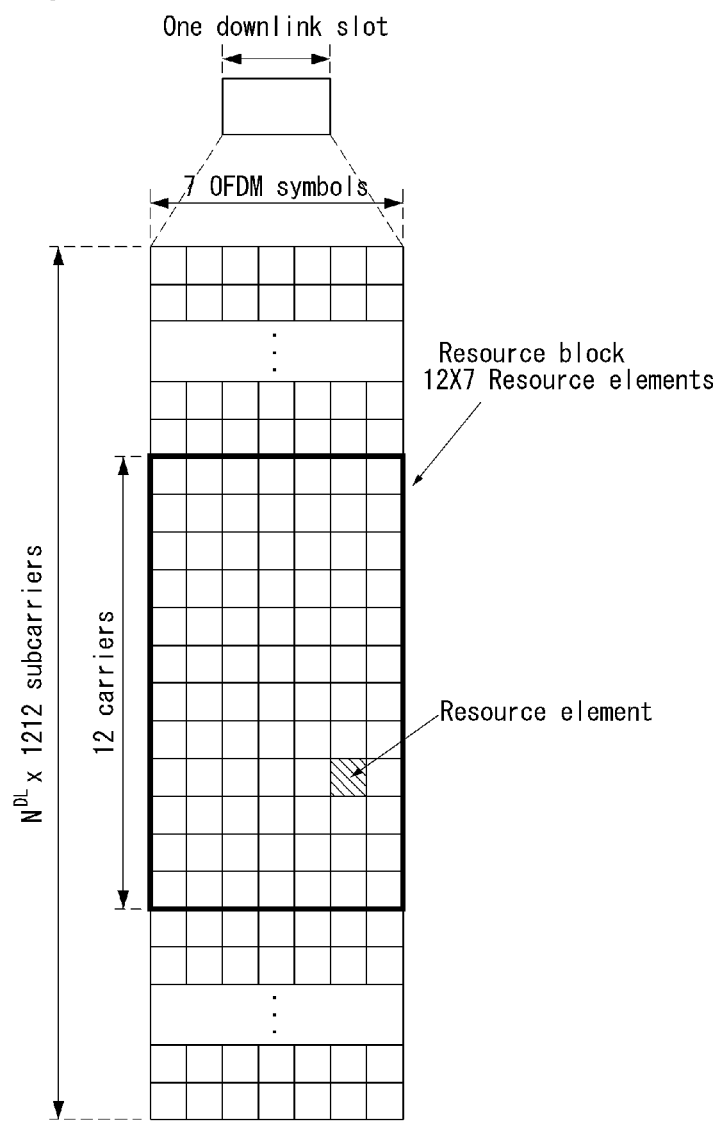

[Figure 3]
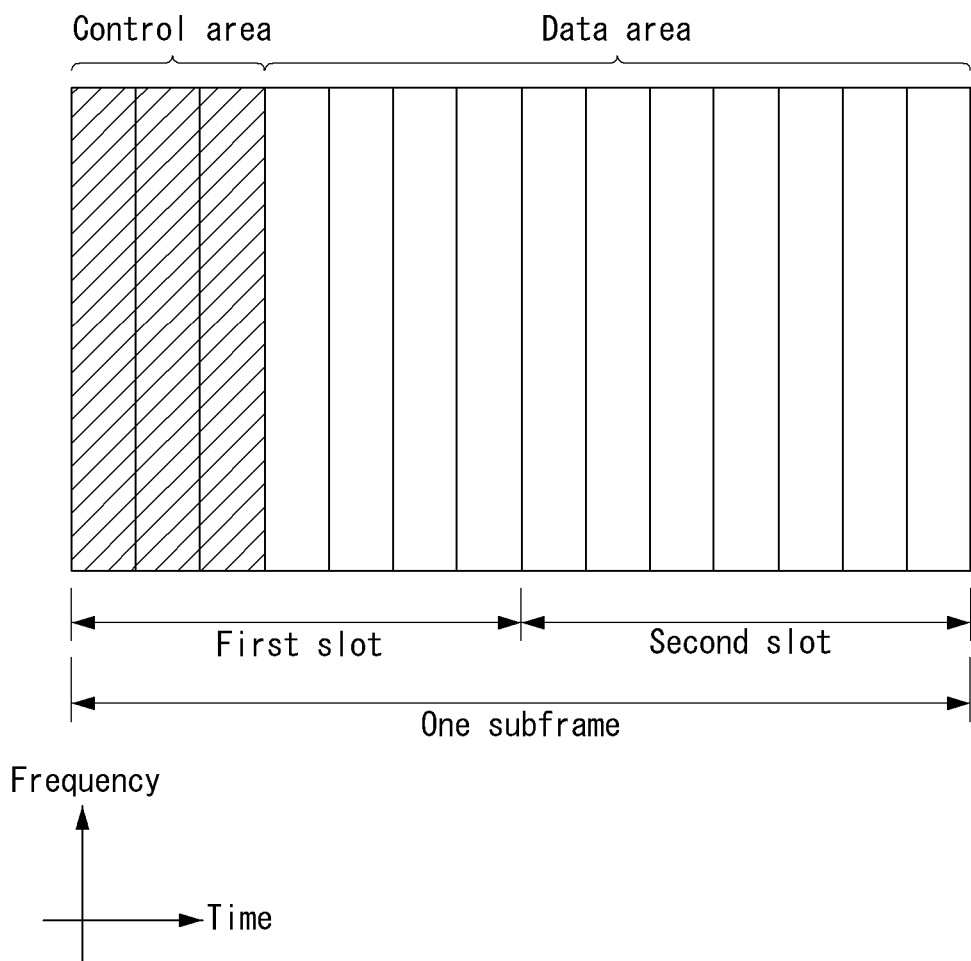

[Figure 4]
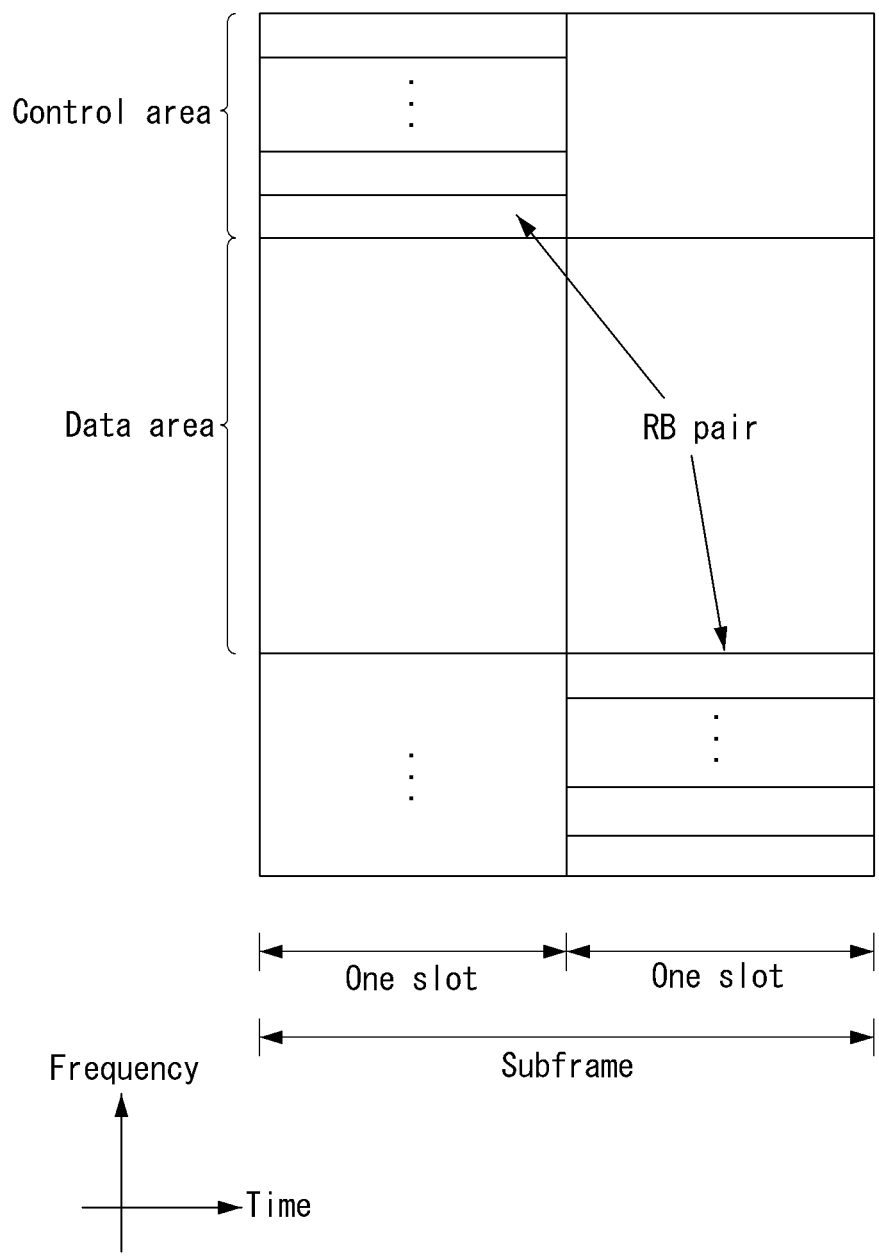

[Figure 5]
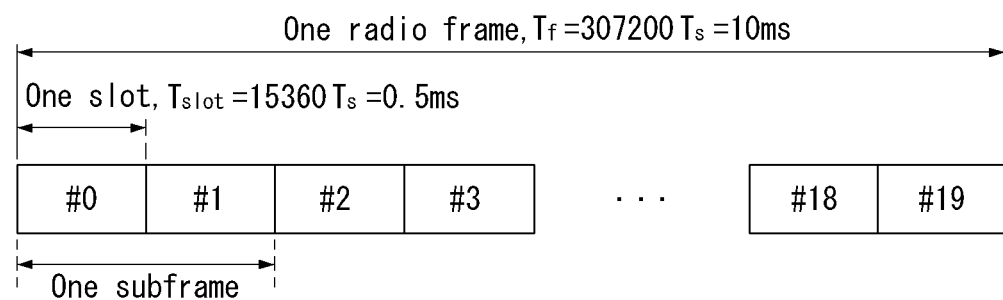

[Figure 7]

【Figure 9】
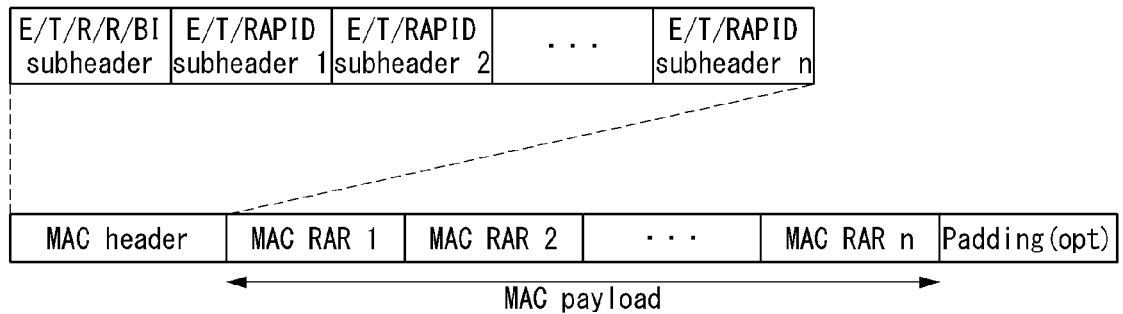
【Figure 10】
【Figure 11】
【Figure 12】
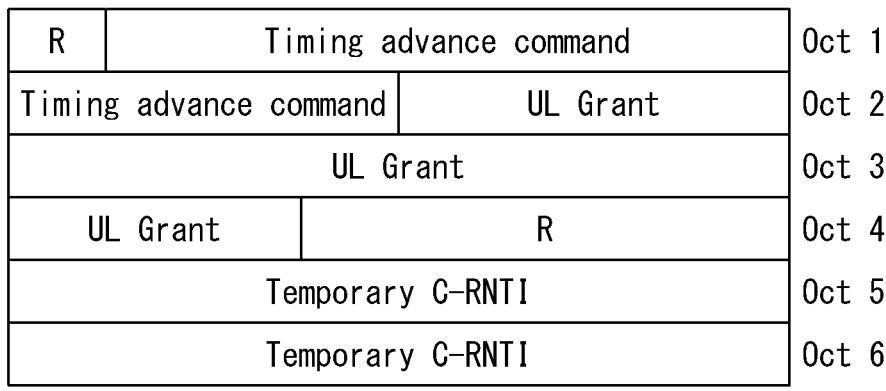

【Figure 13】
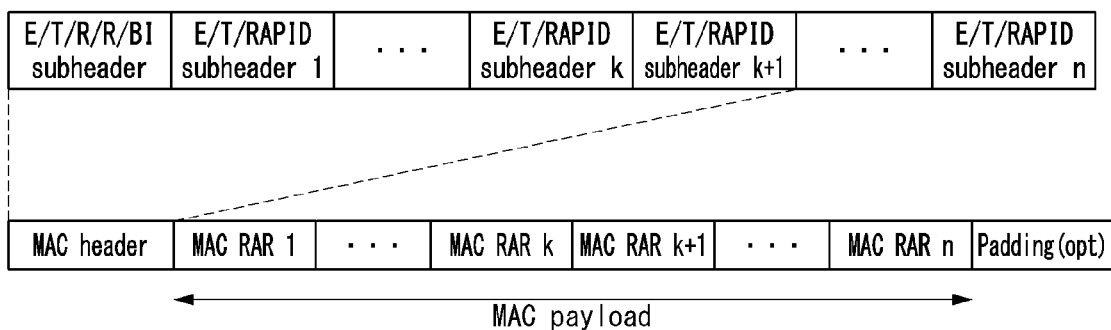
【Figure 14】
| R1 | Timing advance command | | Oct 1 |
|---|---|---|---|
| Timing advance command | UL Grant | | Oct 2 |
| UL Grant | | | Oct 3 |
| UL Grant | r2 | | Oct 4 |
| Temporary C-RNTI | | | Oct 5 |
| Temporary C-RNTI | | | Oct 6 |

[Figure 17]
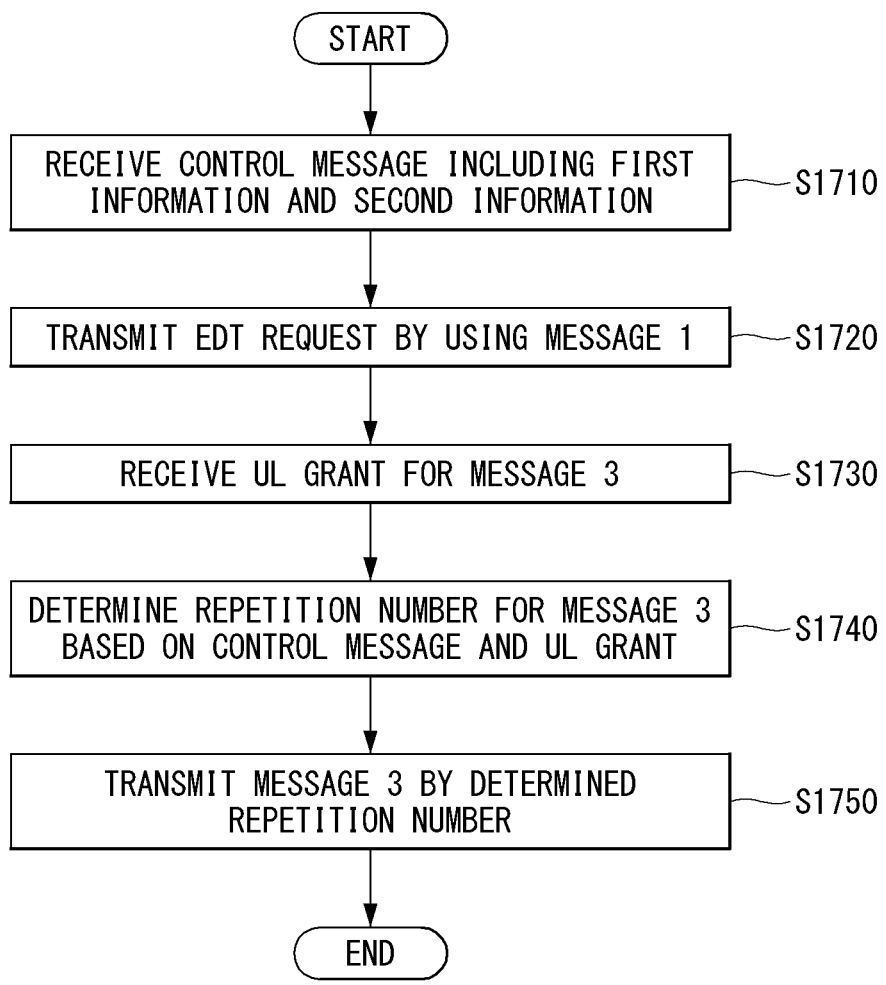

[Figure 18]
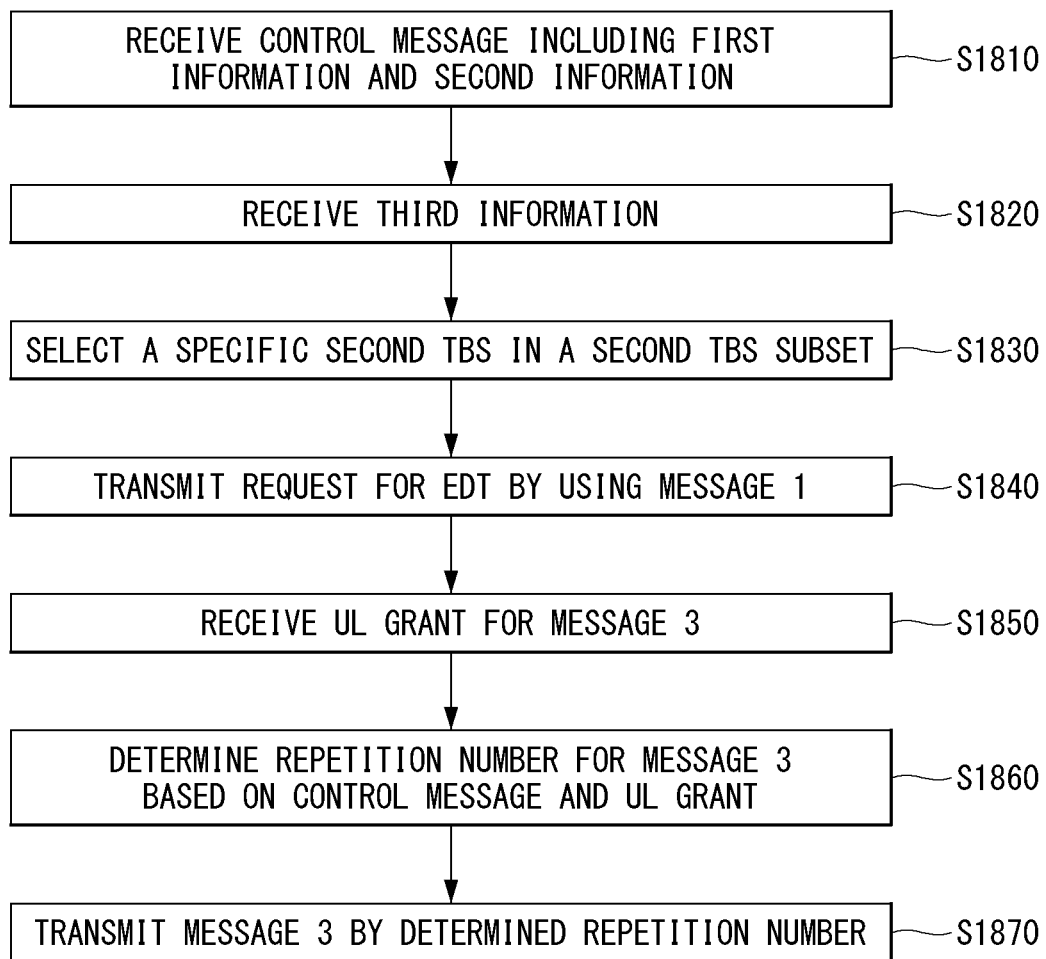

【Figure 19】
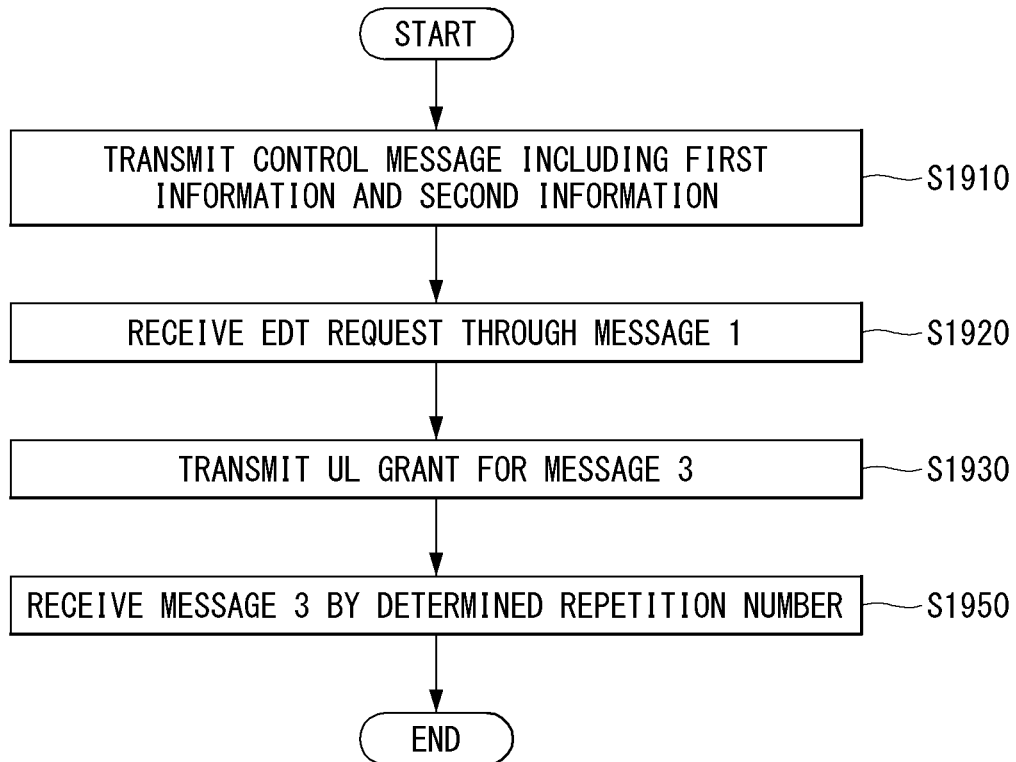
【Figure 20】
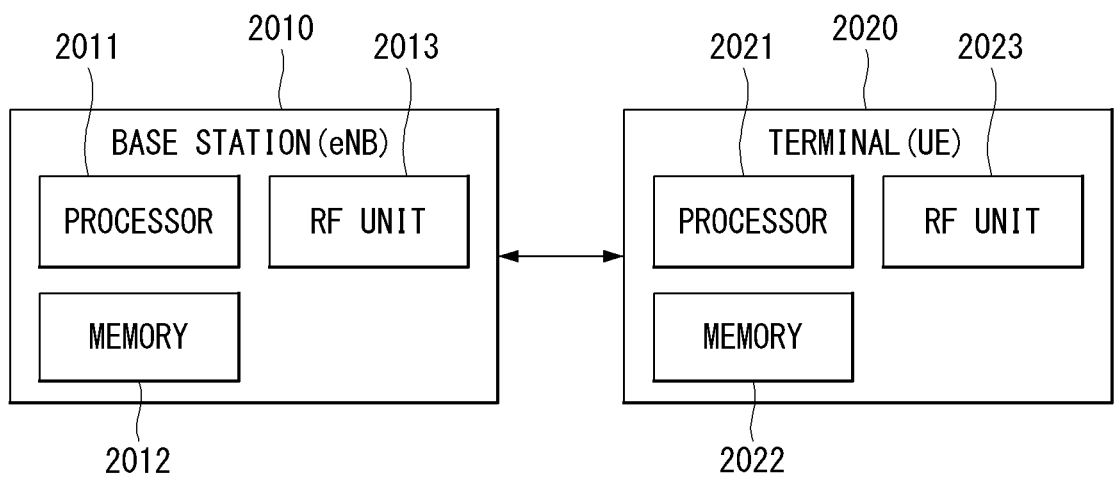

| MCS index $I_{MCS}$ | Modulation $\Delta f=3.75KHz$ or $\Delta f=15KHz$ and $I_{sc}=0,1,\ldots,11$ | Modulation $\Delta f=15KHz$ and $I_{sc}>11$ | $N_{RU}$ | TBS | $N_{RU\_1}$ | TBS-1 | $N_{RU\_2}$ | TBS-2 | $N_{RU\_3}$ | TBS-3 |
|---|---|---|---|---|---|---|---|---|---|---|
| '000' | pi/2 BPSK | QPSK | 4 | 88 | NAN | NAN | NAN | NAN | NAN | NAN |
| '001' | pi/4 QPSK | QPSK | 3 | 88 | NAN | NAN | NAN | NAN | NAN | NAN |
| '010' | pi/4 QPSK | QPSK | 1 | 88 | NAN | NAN | NAN | NAN | NAN | NAN |
| '011' | | | $R_{0,0}$ | $T_0$ | $R_{1,0}$ | $T_1$ | $R_{2,0}$ | $T_2$ | $R_{3,0}$ | $T_3$ |
| '100' | | | $R_{0,1}$ | $T_0$ | $R_{1,1}$ | $T_1$ | $R_{2,1}$ | $T_2$ | $R_{3,1}$ | $T_3$ |
| '101' | | | $R_{0,2}$ | $T_0$ | $R_{1,2}$ | $T_1$ | $R_{2,2}$ | $T_2$ | $R_{3,2}$ | $T_3$ |
| '110' | | | $R'_{0,0}$ | $T_0$ | NAN | NAN | NAN | NAN | NAN | NAN |
| '111' | | | $R'_{0,1}$ | $T_0$ | NAN | NAN | NAN | NAN | NAN | NAN |

EDT-UL grant

Fig. 22

| MCS index $I_{MCS}$ | Modulation $\Delta f=3.75KHz$ or $\Delta f=15KHz$ and $I_{sc}=0,1,\ldots,11$ | Modulation $\Delta f=15KHz$ and $I_{sc}>11$ | $N_{RU}$ | TBS | $N_{RU\_1}$ | TBS-1 | $N_{RU\_2}$ | TBS-2 | $N_{RU\_3}$ | TBS-3 |
|---|---|---|---|---|---|---|---|---|---|---|
| '000' | pi/2 BPSK | QPSK | 4 | 88 | NAN | NAN | NAN | NAN | NAN | NAN |
| '001' | pi/4 QPSK | QPSK | 3 | 88 | NAN | NAN | NAN | NAN | NAN | NAN |
| '010' | pi/4 QPSK | QPSK | 1 | 88 | NAN | NAN | NAN | NAN | NAN | NAN |
| '011' | | | $R_{0,0}$ | $T_0$ | $R_{1,0}$ | $T_1$ | $R_{2,0}$ | $T_2$ | $R_{3,0}$ | $T_3$ |
| '100' | | | $R_{0,1}$ | $T_0$ | $R_{1,1}$ | $T_1$ | $R_{2,1}$ | $T_2$ | $R_{3,1}$ | $T_3$ |
| '101' | | | $R_{0,2}$ | $T_0$ | $R_{1,2}$ | $T_1$ | $R_{2,2}$ | $T_2$ | $R_{3,2}$ | $T_3$ |
| '110' | | | $R'_{0,0}$ | $T_0$ | NAN | NAN | NAN | NAN | NAN | NAN |
| '111' | | | $R'_{0,1}$ | $T_0$ | NAN | NAN | NAN | NAN | NAN | NAN |

EDT-UL grant

Fig. 23

| MCS index $I_{MCS}$ | Modulation $\Delta f=3.75KHz$ or $\Delta f=15KHz$ and $I_{sc}=0,1,\ldots,11$ | Modulation $\Delta f=15KHz$ and $I_{sc}>11$ | $N_{RU}$ | TBS | $N_{RU\_1}$ | TBS-1 | $N_{RU\_2}$ | TBS-2 | $N_{RU\_3}$ | TBS-3 |
|---|---|---|---|---|---|---|---|---|---|---|
| '000' | pi/2 BPSK | QPSK | 4 | 88 | NAN | NAN | NAN | NAN | NAN | NAN |
| '001' | pi/4 QPSK | QPSK | 3 | 88 | NAN | NAN | NAN | NAN | NAN | NAN |
| '010' | pi/4 QPSK | QPSK | 1 | 88 | NAN | NAN | NAN | NAN | NAN | NAN |
| '011' | | | $R'_{0,0}$ | $T_0$ | $R_{1,0}$ | $T_1$ | $R_{2,0}$ | $T_2$ | $R_{3,0}$ | $T_3$ |
| '100' | | | $R'_{0,1}$ | $T_0$ | $R_{1,1}$ | $T_1$ | $R_{2,1}$ | $T_2$ | $R_{3,1}$ | $T_3$ |
| '101' | | | $R'_{0,2}$ | $T_0$ | $R_{1,2}$ | $T_1$ | $R_{2,2}$ | $T_2$ | $R_{3,2}$ | $T_3$ |
| '110' | | | $R'_{0,3}$ | $T_0$ | $R_{1,3}$ | $T_1$ | $R_{2,3}$ | $T_2$ | $R_{3,3}$ | $T_3$ |
| '111' | | | $R'_{0,4}$ | $T_0$ | $R_{1,4}$ | $T_1$ | $R_{2,4}$ | $T_2$ | $R_{3,4}$ | $T_3$ |

EDT-UL grant

Fig. 24

| MCS index $I_{MCS}$ | Modulation $\Delta f$=3.75KHz or $\Delta f$=15KHz and $I_{sc}$=0,1,...,11 | Modulation $\Delta f$=15KHz and $I_{sc}$>11 | $N_{RU}$ | TBS | $N_{RU\_1}$ | TBS-1 | $N_{RU\_2}$ | TBS-2 | $N_{RU\_3}$ | TBS-3 |
|---|---|---|---|---|---|---|---|---|---|---|
| '000' | pi/2 BPSK | QPSK | 4 | 88 | NAN | NAN | NAN | NAN | NAN | NAN |
| '001' | pi/4 QPSK | QPSK | 3 | 88 | NAN | NAN | NAN | NAN | NAN | NAN |
| '010' | pi/4 QPSK | QPSK | 1 | 88 | NAN | NAN | NAN | NAN | NAN | NAN |
| '011' | | | $R'_{0,0}$ | $T_0$ | NAN | NAN | NAN | NAN | NAN | NAN |
| '100' | | | $R'_{0,1}$ | $T_0$ | NAN | NAN | NAN | NAN | NAN | NAN |
| '101' | | | $R'_{0,2}$ | $T_0$ | NAN | NAN | NAN | NAN | NAN | NAN |
| '110' | | | $R'_{0,3}$ | $T_0$ | NAN | NAN | NAN | NAN | NAN | NAN |
| '111' | | | $R'_{0,4}$ | $T_0$ | NAN | NAN | NAN | NAN | NAN | NAN |

EDT-UL grant

Fig. 25

METHOD FOR PERFORMING EARLY DATA TRANSMISSION IN RANDOM ACCESS PROCEDURE IN WIRELESS COMMUNICATION SYSTEM AND APPARATUS THEREFOR

CROSS-REFERENCE TO RELATED APPLICATIONS

This application is a Continuation Bypass of International Application of PCT/KR2018/014019, filed on Nov. 15, 2018, which claims the benefit of U.S. Provisional Application No. 62/586,185, filed on Nov. 15, 2017, U.S. Provisional Application No. 62/630,842, filed on Feb. 15, 2018, U.S. Provisional Application No. 62/653,545 filed on Apr. 5, 2018, Korean Application No. 10-2018-0053640, filed on May 10, 2018, and Korean Application No. 10-2018-0039962, filed on Apr. 5, 2018, all of which are incorporated by reference in their entirety herein.

TECHNICAL FIELD

This specification relates to a wireless communication system, and more particularly, to a method for performing early data transmission in a random access procedure and an apparatus therefor.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification provides a request for EDT through a random access procedure.

Furthermore, this specification provides a method for transmitting and receiving message 3 by using a TBS smaller than a largest TB for message 3.

Furthermore, this specification provides a method for determining a repetition number for a small TBS.

The technical objects of the present invention are not limited to the aforementioned technical objects, and other technical objects, which are not mentioned above, will be apparently appreciated by a person having ordinary skill in the art from the following description.

Technical Solution

This specification provides a method for performing early data transmission (EDT) in a random access procedure in a wireless communication system.

More specifically, the method performed by a user equipment (UE) includes: receiving, from a base station, a control message including first information indicating whether selection for a second transport size (TBS) smaller than a first TBS for message 3 is permitted and second information for the first TBS, in which the first TBS is a maximum TBS for the message 3; transmitting, to the base station, a request for the EDT by using message 1; receiving, from the base station, message 2 including a UL grant for the message 3; determining a repetition number for the message 3 based on the control message and the UL grant; and transmitting the message 3 to the base station by the repetition number.

Furthermore, in this specification, the message 1, the message 2, and the message 3 are transmitted and received to and from the base station in the random access procedure.

Furthermore, in this specification, the message 3 corresponds to a specific coverage enhancement (CE) level.

Furthermore, in this specification, the method further includes receiving, from the base station, third information for a second TBS subset including at least one second TBS when the first information is configured so that selection of the second TBS is permitted.

Furthermore, in this specification, the method further includes selecting a specific second TBS in the second TBS subset, in which the message 3 is transmitted according to a repetition number for the specific second TBS.

Furthermore, in this specification, the repetition number for the specific second TBS is determined based on the repetition number for the message 3 configured by the UL grant, a value of the first TBS, and a value of the specific second TBS.

Furthermore, in this specification, the value of the specific second TBS is determined based on the value of the first TBS.

Furthermore, in this specification, a resource in a frequency domain and a start position of a time domain in which the message 3 is transmitted are constant regardless of a TBS.

Furthermore, in this specification, the request for the EDT is determined based on at least one of a CE level or reference signal received power (RSRP).

Furthermore, in this specification, the request for the EDT is transmitted to the base station on a carrier corresponding to the CE level.

Furthermore, in this specification, the method further includes: monitoring a physical downlink control channel in a Type-2 common search space (CSS); and receiving message 4 from the base station based on the physical downlink control channel.

Furthermore, in this specification, the request for the EDT is identified based on at least one of a starting carrier index of an NPRACH, a non-anchor carrier index used for transmission of the NPRACH, or a random access preamble identifier (RAPID).

Furthermore, in this specification, the message 2 includes information indicating permission or rejection of the request for the EDT.

Furthermore, in this specification, when the request for the EDT is identified based on the RAPID, the permission or rejection is indicated by a specific field of a medium access control (MAC) packet data unit (PDU) corresponding to the RAPID.

Furthermore, in this specification, the method further includes: confirming whether the value for the TBS included in the UL grant is the same as a value for a previous TBS; and identifying that the request for the EDT is rejected when the value for the TBS included in the UL grant is the same as the value for the previous TBS.

Furthermore, this specification provides a user equipment (UE) performing early data transmission (EDT) in a random access procedure in a wireless communication system, which includes: a radio frequency (RF) module transmitting and receiving a radio signal; and a processor controlling the RF module, in which the processor is configured to receive, from a base station, a control message including first information indicating whether selection for a second transport size (TBS) smaller than a first TBS for message 3 is permitted and second information for the first TBS, wherein the first TBS is a maximum TBS for the message 3, transmit, to the base station, a request for the EDT by using message 1, receive, from the base station, message 2 including a UL grant for the message 3, determine a repetition number for the message 3 based on the control message and the UL grant, and transmit the message 3 to the base station by the repetition number.

Furthermore, in this specification, the processor is configured to receive, from the base station, third information for a second TBS subset including at least one second TBS.

Furthermore, in this specification, the processor is configured to select a specific second TBS in the second TBS subset, and transmit the message 3 according to a repetition number for the specific second TBS.

Furthermore, in this specification, the repetition number for the specific second TBS is determined based on the repetition number for the message 3 configured by the UL grant, a value of the first TBS, and a value of the specific second TBS.

Advantageous Effects

This specification has an advantage in that a request for EDT is provided through a random access procedure to reduce battery consumption of a UE.

Advantages which can be obtained in the present invention are not limited to the aforementioned effects and other unmentioned advantages will be clearly understood by those skilled in the art from the following description.

DESCRIPTION OF DRAWINGS

In order to help understanding of the present invention, the accompanying drawings which are included as a part of the Detailed Description provide embodiments of the present invention and describe the technical features of the present invention together with the Detailed Description.

FIG. 1 is a diagram illustrating an example of an LTE radio frame structure.

FIG. 2 is a diagram illustrating an example of a resource grid for a downlink slot.

FIG. 3 illustrates an example of a structure of a downlink subframe.

FIG. 4 illustrates an example of a structure of an uplink subframe.

FIG. 5 illustrates an example of frame structure type 1.

FIG. 9 illustrates an example of a MAC PDU including a MAC header and MAC RARs.

FIG. 10 illustrates an example of an E/T/RAPID MAC subheader.

FIG. 11 illustrates an example of an E/T/R/R/BI MAC subheader.

FIG. 12 illustrates an example of a MAC RAR for NB-IoT UEs.

FIG. 13 illustrates an example of a new MAC PDU including a MAC header and MAC RARs proposed in this specification.

FIG. 14 illustrates an example of a new MAC PDU including a MAC header and MAC RARs for EDT proposed in this specification.

FIG. 17 is a flowchart illustrating an example of an operation of a UE for performing the method proposed in this specification.

FIG. 18 is a flowchart illustrating another example of the operation of the UE for performing the method proposed in this specification.

FIG. 19 is a flowchart illustrating an example of an operation of a base station for performing the method proposed in this specification.

FIG. 20 illustrates a block diagram of a wireless communication device to which methods proposed in this specification may be applied.

FIG. 22 illustrates an MCS index for Msg3 NPUSCH.

FIG. 23 illustrates a table that shows an example of the MCS index for the EDT Msg3 NPUSCH.

FIG. 24 illustrates an example of the MCS index for the EDT Msg3 NPUSCH when 4 TBS sets are enabled with respect to the EDT Msg.3.

FIG. 25 illustrates an example of the MCS index for the EDT Msg3 NPUSCH when the maximum TBS sets are just enabled with respect to only the EDT Msg.3.

MODE FOR INVENTION

Figure 6:
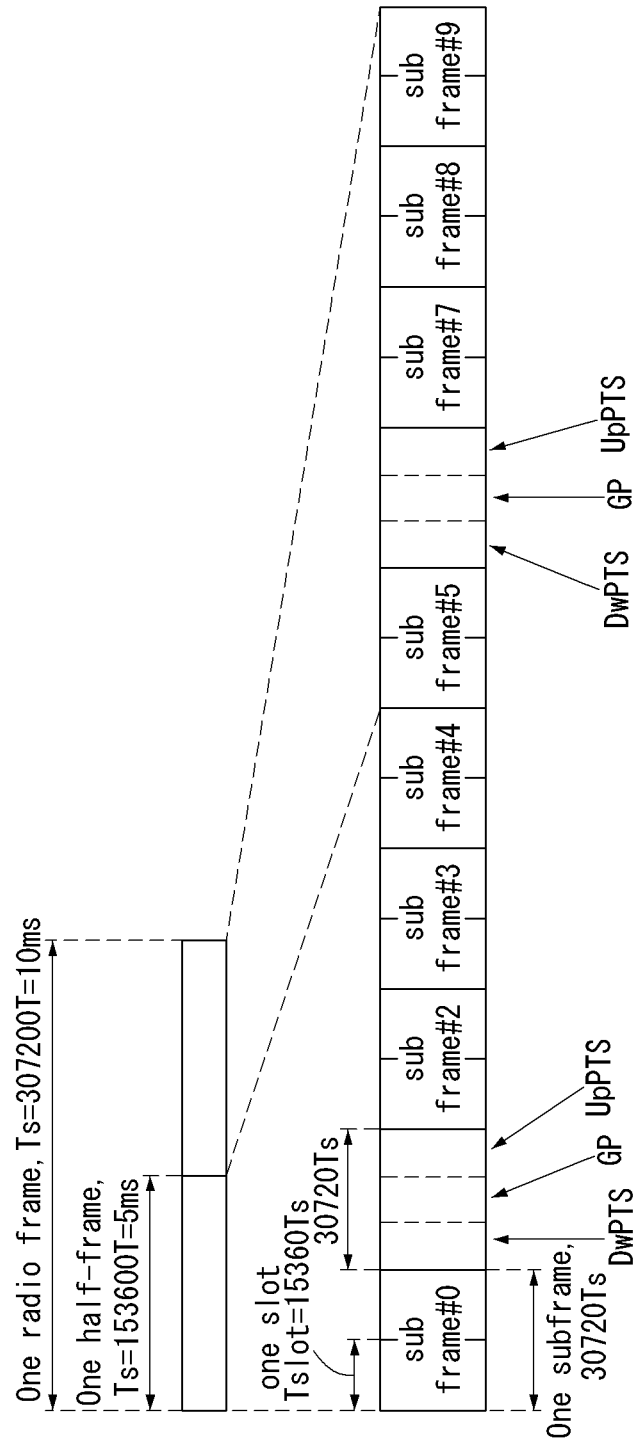
FIG. 6 illustrates another example of frame structure type 2.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System

FIG. 1 is a diagram showing an example of an LTE radio frame structure.

In FIG. 1, the radio frame includes 10 subframes. The subframe includes 2 slots in a time domain. Time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in the time domain. An OFDM symbol is for representing one symbol period because 3GPP LTE uses OFDMA in downlink. The OFDM symbol may be referred to as an SC-FDMA symbol or a symbol period. A resource block (RB) is a resource allocation unit and a plurality of contiguous sub-carriers in one slot. The structure of the radio frame is illustrative. Accordingly, the number of subframes included in the radio frame, the number of slots included in a subframe, or the number of OFDM symbols included in a slot may be modified in various manners.

FIG. 2 is a diagram showing an example of a resource grid for a downlink slot.

In FIG. 2, the downlink slot includes a plurality of OFDM symbols in a time domain. In this specification, for example, one downlink slot is illustrated as including 7 OFDM symbols and one resource block (RB) is illustrated as including 12 subcarriers in a frequency domain. However, the present invention is not limited to the above examples. Each element of the resource grid is referred to as a resource element (RE). One RB includes 12×7 REs. The number $N_{DL}$ of RBs included in the downlink slot is different depending on a downlink transmission bandwidth. The structure of an uplink slot may be the same as that of a downlink slot.

FIG. 3 shows an example of a downlink subframe structure.

In FIG. 3, a maximum of 3 OFDM symbols positioned in the front part of the first slot within a subframe is a control area to which a control channel is allocated. The remaining OFDM symbols correspond to a data area to which a PDSCH is allocated. Examples of downlink control channels used in I3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe, and carries information on OFDM symbols used for the transmission of control channels within a subframe. The PHICH is a response to uplink transmission and carries a HARQ acknowledgment (ACK)/negative-acknowledgment (NACK) signal. Control information transmitted through a PDCCH is referred to as downlink control information (DCI). DCI includes uplink or downlink scheduling information or includes an uplink transmission (Tx) power control command for given UE groups.

A PDCCH may carry the transport format and resource allocation of a downlink shared channel (DL-SCH), resource allocation information of an uplink shared channel (UL-SCH), paging information on a paging channel (PCH), system information on a DL-SCH, resource allocation of a higher layer control message such as a random access response transmitted on a PDSCH, a set of Tx power control commands for UEs within an arbitrary UE group, the Tx power control command of a voice over IP (VoIP), activation, etc. A plurality of PDCCHs may be transmitted within the control area. A UE may monitor a plurality of PDCCHs. A PDCCH is transmitted on an aggregation of one or some contiguous control channel elements (CCEs). A CCE is a logical allocation unit used to provide a PDCCH with a coding rate based on the state of a radio channel. A CCE corresponds to a plurality of resource element groups. The format of a PDCCH and the number of available bits of the PDCCH is determined based on the correlation between the number of CCEs and a coding rate provided by the CCEs. A BS determines a PDCCH format based on DCI that needs to be transmitted to a UE, and attaches a cyclic redundancy check (CRC) to control information. The CRC is masked with a unique identifier (called radio network temporary identifier (RNTI)) depending on the owner or use of a PDCCH. If a PDCCH is for a specific UE, a CRC may be masked with a unique identifier (e.g., cell-RNTI (C-RNTI)) of the specific UE. For another example, if a PDCCH is for a paging message, a CRC may be masked with a paging indicator identifier (e.g., paging-RNTI (P-RNTI)). If a PDCCH is for system information (system information block (SIB) to be described more specifically), a CRC may be masked with a system information identifier and a system information RNTI (SI-RNTI). A CRC may be masked with a random access-RNTI (RA-RNTI) in order to indicate a random access response, that is, a response to the transmission of a random access preamble by a UE.

FIG. 4 shows an example of an uplink subframe structure.

In FIG. 4, the uplink subframe may be divided into a control area and a data area in a frequency domain. A physical uplink control channel (PUCCH) for carrying uplink control information is allocated to the control area. A physical uplink shared channel (PUSCH) for carrying user data is allocated to the data area. In order to maintain a single carrier characteristic, one UE does not transmit a PUCCH and a PUSCH at the same time. A PUCCH for one UE is allocated to an RB pair within a subframe. An RB belonging to an RB pair occupies different subcarriers in two slots. This is called that an RB pair allocated to a PUCCH is frequency-hopped at a slot boundary.

Hereinafter, an LTE frame structure is described more specifically.

The sizes of various fields in the time domain is represented as the number of time units of $T_s=1/(15000\times 2048)$ seconds unless described otherwise through the LTE specification.

Downlink and uplink transmissions are organized as a radio frame having duration of $T_f=307200\times T_s=10$ m. Two radio frame structures are supported.

Type 1: applicable to FDD
Type 2: applicable to TDD
Frame Structure Type 1

The frame structure type 1 may be applied to both full duplex and half duplex FDD. Each radio frame is $T_f=307200\cdot T_s=10$ ms length, and is configured with 20 slots, that is, $T_f=307200\cdot T_s=10$ ms. The slots are numbered from 0 to 19. A subframe is defined as two contiguous slots, and a subframe i includes slots 2i and 2i+1.

In the case of FDD, 10 subframes are available for downlink transmission, and 10 subframes are available for uplink transmission every 10 ms interval.

Uplink and downlink transmissions are separated in the frequency domain. In a half duplex FDD operation, a UE cannot transmit and receive data at the same time, but there is no limit in full duplex FDD.

FIG. 5 shows an example of a frame structure type 1.

Frame Structure Type 2

The frame structure type 2 may be applied to FDD. The length of each radio frame of a length $T_f=307200\times T_s=10$ ms includes two half-frames, each one having $15360\cdot T_s=0.5$ ms. Each half-frame includes 5 subframes of length $30720\cdot T_s=1$ ms. Supported uplink-downlink configurations are listed in Table 2. In this case, in each subframe within a radio frame, "D" indicates that a subframe has been reserved for downlink transmission, "U" indicates that a subframe has been reserved for uplink transmission, and "S" indicates a special subframe having three fields of a downlink pilot time slot (DwPTS), a guard period (GP) and an uplink pilot time slot (UpPTS). On the premise that a DwPTS, GP and UpPTS have a total length $30720\cdot T_s=1$ ms, the length of the DwPTS and UpPTS is provided by Table 1. In each subframe 1, a length within each subframe is defined as two slots 2i and 2i+1, that is, $T_{slot}=15360\cdot T_s=0.5$ m.

An uplink-downlink configuration having switch-point periodicity from downlink to uplink in both 5 ms and 10 ms is supported. In the case of switch-point periodicity from downlink to uplink of 5 ms, a special subframe is present in both two half-frames. In the case of switch-point periodicity from downlink to uplink of 10 ms, the special subframe is present only in the first half-frame. Subframes 0 and 5 and a DwPTS are always reserved for downlink transmission. An UpPTS and a subframe subsequent to the special subframe are always reserved for uplink transmission.

FIG. 6 is a diagram showing another example of a frame structure type 2.

Table 1 shows an example of the configuration of a special subframe.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

NB-IoT

A narrowband-Internet of things (NB-IoT) is a standard for supporting low complexity, low cost devices, and has been defined to perform only a relatively simple operation compared to the existing LTE devices. The NB-IoT follows the basic structure of LTE, but operates based on the following defined contents. If the NB-IoT reuses a channel or signal of LTE, it may follow the standard defined in the existing LTE.

Uplink

The following narrowband physical channels are defined.
Narrowband physical uplink shared channel (NPUSCH)
Narrowband physical random access channel (NPRACH)
The following uplink narrowband physical signals are defined.
Narrowband demodulation reference signal
In a subcarrier $N_{sc}^{UL}$ aspect, an uplink bandwidth and slot duration $T_{slot}$ are given in Table 3.
Table 3 shows an example of NB-IoT parameters.

TABLE 3

| Subcarrier Spacing | $N_{sc}^{UL}$ | $T_{slot}$ |
|---|---|---|
| $\Delta f$ = 3.75 kHz | 48 | 61440 · $T_s$ |
| $\Delta f$ = 15 kHz | 12 | 15360 · $T_s$ |

A single antenna port p=0 is used for all uplink transmissions.

Resource Unit

A resource unit is used to describe the mapping of an NPUSCH and a resource element. The resource unit is defined as contiguous symbols of $N_{symb}^{UL}N_{slots}^{UL}$ in the time domain, and is defined as contiguous subcarriers of $N_{sc}^{RU}$ in the frequency domain. In this case, $N_{sc}^{RU}$ and $N_{symb}^{UL}$ are given in Table 4.

Table 4 shows an example of supported combinations of $N_{sc}^{RU}$, $N_{slots}^{UL}$ and $N_{symb}^{UL}$.

TABLE 4

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

Narrowband Uplink Shared Channel (NPUSCH)

A narrowband physical uplink shared channel is supported by two formats:
NPUSCH format 1 used to carry an UL-SCH
NPUSCH format 2 used to carry uplink control information Scrambling is performed according to Paragraph 5.3.1 of TS36.211. A scrambling sequence generator is initialized as $c_{ini}=n_{RNTI} \cdot 2^{14}+n_f \mod 2 \cdot 2^{13}+\lfloor n_s/2 \rfloor+N_{ID}^{Ncell}$. In this case, $n_s$ is the first slot of codeword transmission. In the case of NPUSCH repetition, a scrambling sequence is re-initialized as $n_s$ and $n_f$ configured as the first slot and a frame, respectively, used for repetition transmission after all $M_{identical}^{N-PUSCH}$ a codeword transmission according to the above equation. Quantity $M_{identical}^{NPUSCH}$ provided by Paragraph 10.1.3.6 of TS36.211.

Table 5 specifies modulation mappings applicable to narrowband physical uplink shared channel.

TABLE 5

| NPUSCH format | $N_{sc}^{RU}$ | Modulation method |
|---|---|---|
| 1 | 1 | BPSK, QPSK |
| | >1 | QPSK |
| 2 | 1 | BPSK |

An NPUSCH may be mapped to one or more resource units $N_{RU}$, such as that provided by Paragraph 3GPP TS 36.213. The one or more resource units are transmitted $M_{rep}^{NPUSCH}$ times.

In order to follow transmit power $P_{NPUSCH}$ defined in 3GPP TS 36.213, the block $z(0), \ldots, z(M_{rep}^{NPUSCH}-1)$ of complex-value symbols is multiplied by a size scaling element $\beta_{NPUSCH}$ and is mapped to subcarriers allocated for the transmission of an NPUSCH as a sequence that starts from z(0). Mapping to a resource element (k,l) allocated for transmission and corresponding to subcarriers not used for the transmission of reference signals becomes an increment sequence of an index k, a subsequent index l starting from the first slot of an allocated resource unit.

Prior to continuous mapping to the following slot of z(•) after $N_{slots}$ slot mapping, $N_{slots}$ slots are repeated as an $M_{identical}^{NPUSCH}-1$ additional number. In this case, Equation 1 is as follows:

$$M_{identical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases} \quad \text{[Equation 1]}$$

$$N_{slots} = \begin{cases} 1 & \Delta f = 3.75 \text{ kHz} \\ 2 & \Delta f = 15 \text{ kHz} \end{cases}$$

If mapping to an $N_{slots}$ slot or the repetition of the mapping includes a resource element overlapping a given configured NPRACH resource according to NPRACH-ConfigSIB-NB, the NPUSCH transmission of the overlapped $N_{slots}$ slots is postponed until next $N_{slots}$ slots do not overlap a given configured NPRACH resource.

Mapping of $z(0), \ldots, z(M_{rep}^{NPUSCH}-1)$ is repeated until $M_{rep}^{NPUSCH}N_{RU}N_{slots}^{UL}$ slots are transmitted. After transmissions and/or postponements by an NPRACH of a $256 \cdot 30720T_s$ time unit, if NPUSCH transmission is postponed, the gap of a $40 \cdot 307201T_s$ time unit is inserted. The postponement part attributable to an NPRACH matched with the gap is counted as part of the gap.

If a higher layer parameter npusch-AllSymbols is configured to be false, the resource elements of an SC-FDMA symbol overlapping a symbol configured as an SRS according to srs-SubframeConfig is calculated as NPUSCH mapping, but is not used for the transmission of an NPUSCH. If the higher layer parameter npusch-AllSymbols is configured to be true, all symbols are transmitted.

Uplink control information on an NPUSCH without UL-SCH data 1 bit information of HARQ-ACK $o_0^{ACK}$ is coded according to Table 6. In this case, or $o_0^{ACK}$=1 with respect to ACK, and $o_0^{ACK}$=0 with respect to NACK.

Table 6 shows an example of HARQ-ACK codewords.

TABLE 6

| HARQ-ACK $<o_0^{ACK}>$ | HARQ-ACK $<b_0, b_1, b_2, \ldots, b_{15}>$ |
| --- | --- |
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

In an NB-IoT UL slot i for a serving cell, UE transmit power for NPUSCH transmission is provided like Equations 2 and 3.

When the repetition number of allocated NPUSCH RUs is greater than 2, $$P_{NPUSCH,c}(i) = P_{CMAX,c}(i) \text{ [dBm]} \quad \text{[Equation 2]}$$

Otherwise, $$P_{NPUSCH,c}(i) = \min \left\{ \begin{array}{l} P_{CMAX,c}(i), \\ 10\log_{10}(M_{NPUSCH,c}(i)) + P_{O\_NPUSCH,c}(j) + \\ \alpha_c(j) \cdot PL_c \end{array} \right\} \text{ [dBm]} \quad \text{[Equation 3]}$$

In this case, $P_{CMAX,c}(i)$ is configured UE transmit power defined in 3GPP TS36.101 in an NB-IoT UL slot i with respect to a serving cell c.

$M_{NPUSCH,c}$ is {¼} with respect to 3.75 kHz subcarrier spacing, and is {1,3,6,12} with respect to 15 kHz subcarrier spacing.

$P_{O\_NPUSCH, c}(j)$ has the sum of a component $P_{O\_NOMINAL\_NPUSCH,c}(j)$ provided by higher layers with respect to the serving cell c and a component $P_{O\_UE\_NPUSCH,c}(j)$ provided by higher layers with respect to j=1. In this case, j∈{1,2}. j=1 with respect to NPUSCH (re)transmissions corresponding to a dynamic-scheduled grant, and j=2 with respect to NPUSCH (re)transmissions corresponding to a random access response grant.

$P_{O\_UE\_NPUSC\_H,c}(2)=0$ and $P_{O\_NORMINAL\_NPUSCH, c}(2)= P_{O\_PRE} + \Delta_{PREAMBLE\_Msg3}$. In this case, parameters preambleInitialReceivedTargetPower $P_{O\_PRE}$ and $\Delta_{PREAMBLE\_Msg3}$ are signaled from higher layers with respect to the serving cell c.

With respect to j=1, $\alpha_c(j)=1$ is provided by higher layers with respect to the NPUSCH format 2; $\alpha_c(j)$ is provided by higher layers with respect to the NPUSCH format 1 with respect to the serving cell c. $\alpha_c(j)=1$ with respect to j=2.

$PL_c$ is downlink pathloss estimation calculated in dB by a UE with respect to the serving cell c, and $PL_c$=nrs-Power+nrs-PowerOffsetNonAnchor−higher layer-filtered NRSRP. In this case, nrs-Power is provided by higher layers and lower Paragraph 16.2.2 of 3GPP 36.213. If nrs-powerOffsetNonAnchor is not provided by higher layers, it is set to zero. NRSRP is defined in 3GPP TS 36.214 with respect to the serving cell c, and a higher layer filter configuration is defined in 3GPP TS 36.331 with respect to the serving cell c.

When a UE transmits an NPUSCH in an NB-IoT UL slot i with respect to the serving cell c, a power headroom is calculated using Equation 4.

$$PH_c(i) P_{CMAX,c}(i) - \{P_{O\_NPUSCH,c}(l) + \alpha_c(l) \cdot PL_c\} \text{ [dB]} \quad \text{[Equation 4]}$$

UE Procedure for Transmitting Format 1 NPUSCH

When an NPDCCH having the DCI format N0 ended in an NB-IoT DL subframe n for a UE is detected in a given serving cell, the UE performs corresponding NPUSCH transmission using the NPUSCH format 1 in N contiguous NB-IoT UL slots $n_i$ that is, 1=0, 1, . . . , N−1, based on NPDCCH information at the end of an n+$k_0$ DL subframe. In this case, The subframe n is the last subframe in which the NPDCCH is transmitted, and is determined by the start subframe of the NPDCCH transmission and the DCI subframe repetition number field of corresponding DCI. Furthermore, $N=N_{Rep}N_{RU}N_{slots}^{UL}$. In this case, the value of $N_{Rep}$ is determined by the repetition number field of the corresponding DCI. The value of $N_{RU}$ is determined by the resource allocation field of the corresponding DCI. The value of $N_{slots}^{UL}$ is the number of NB-IoT UL slots of a resource unit corresponding to the number of subcarriers allocated in the corresponding DCI.

$n_0$ is the first NB-IoT UL slot that starts after the end of the subframe n+$k_0$.

The value of $k_0$ is determined by the scheduling delay field ($I_{delay}$) of the corresponding DCI according to Table 7.

Table 7 shows an example of $k_0$ for the DCI format N0.

TABLE 7

| $I_{Delay}$ | $k_0$ |
| --- | --- |
| 0 | 8 |
| 1 | 16 |
| 2 | 32 |
| 3 | 64 |

Resource allocation information of an uplink DCI format N0 for NPUSCH transmission is indicated by a scheduled UE.

Set of contiguously allocated subcarriers ($n_{sc}$) of a resource unit determined by the subcarrier indication field of corresponding DCI Multiple resource units ($N_{RU}$) determined by the resource allocation field of corresponding DCI according to Table 9

Repetition number ($N_{Rep}$) determined by the repetition number field of corresponding DCI according to Table 10

The subcarrier spacing Δf of NPUSCH transmission is determined by the uplink subcarrier spacing field of a narrowband random access response grant according to Lower Paragraph 16.3.3 of 3GPP TS36.213.

In the case of NPUSCH transmission having subcarrier spacing Δf=3.75 kHz, $n_{sc}=I_{sc}$. In this case, $I_{sc}$ is the subcarrier indication field of DCI.

In the case of NPUSCH transmission having subcarrier spacing Δf=15 kHz, the subcarrier indication field ($I_{sc}$) of DCI determines a set of contiguously allocated subcarriers ($n_{sc}$) according to Table 8.

Table 8 shows an example of subcarriers allocated to an NPUSCH having Δf=15 kHz.

TABLE 8

| Subcarrier indication field ($I_{sc}$) | Set of allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

Table 9 shows an example of the number of resource units for an NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the repetition number of an NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

A reference signal sequence $\bar{r}_u(n)$ for $N_{sc}^{RU}=1$ is defined by Equation 5.

$$\bar{r}_u(n) = \frac{1}{\sqrt{2}}(1+j)(1-2c(n))w(n \bmod 16), \quad 0 \le n < M_{rep}^{NPUSCH} N_{RU} N_{slots}^{UL} \quad \text{[Equation 5]}$$

In this case, the binary sequence c(n) is defined by 7.2 of TS36.211, and needs to be initialized as $c_{init}=35$ when NPUSCH transmission starts. The value w(n) is provided by Table 1-11. In this case, when group hopping is not enabled with respect to the NPUSCH format 1, $u=N_{ID}^{Ncell} \bmod 16$ for the NPUSCH format 2. When group hopping is enabled with respect to the NPUSCH format 1, the value w(n) is provided by Paragraph 10.1.4.1.3 of 3GPP TS36.211.

Table 11 shows an example of w(n).

TABLE 11

| u | w(0), . . . , w(15) | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | -1 | 1 | -1 | 1 | -1 | 1 | -1 | 1 | -1 | 1 | -1 | 1 | -1 | 1 | -1 |
| 2 | 1 | 1 | -1 | -1 | 1 | 1 | -1 | -1 | 1 | 1 | -1 | -1 | 1 | 1 | -1 | -1 |
| 3 | 1 | -1 | -1 | 1 | 1 | -1 | -1 | 1 | 1 | -1 | -1 | 1 | 1 | -1 | -1 | 1 |
| 4 | 1 | 1 | 1 | 1 | -1 | -1 | -1 | -1 | 1 | 1 | 1 | 1 | -1 | -1 | -1 | -1 |
| 5 | 1 | -1 | 1 | -1 | -1 | 1 | -1 | 1 | 1 | -1 | 1 | -1 | -1 | 1 | -1 | 1 |
| 6 | 1 | 1 | -1 | -1 | -1 | -1 | 1 | 1 | 1 | 1 | -1 | -1 | -1 | -1 | 1 | 1 |
| 7 | 1 | -1 | -1 | 1 | -1 | 1 | 1 | -1 | 1 | -1 | -1 | 1 | -1 | 1 | 1 | -1 |
| 8 | 1 | 1 | 1 | 1 | 1 | 1 | 1 | 1 | -1 | -1 | -1 | -1 | -1 | -1 | -1 | -1 |
| 9 | 1 | -1 | 1 | -1 | 1 | -1 | 1 | -1 | -1 | 1 | -1 | 1 | -1 | 1 | -1 | 1 |
| 10 | 1 | 1 | -1 | -1 | 1 | 1 | -1 | -1 | -1 | -1 | 1 | 1 | -1 | -1 | 1 | 1 |
| 11 | 1 | -1 | -1 | 1 | 1 | -1 | -1 | 1 | -1 | 1 | 1 | -1 | -1 | 1 | 1 | -1 |
| 12 | 1 | 1 | 1 | 1 | -1 | -1 | -1 | -1 | -1 | -1 | -1 | -1 | 1 | 1 | 1 | 1 |
| 13 | 1 | -1 | 1 | -1 | -1 | 1 | -1 | 1 | -1 | 1 | -1 | 1 | 1 | -1 | 1 | -1 |
| 14 | 1 | 1 | -1 | -1 | -1 | -1 | 1 | 1 | -1 | -1 | 1 | 1 | 1 | 1 | -1 | -1 |
| 15 | 1 | -1 | -1 | 1 | -1 | 1 | 1 | -1 | -1 | 1 | 1 | -1 | 1 | -1 | -1 | 1 |

A reference signal sequence for the NPUSCH format 1 is provided by Equation 6.

$$r_u(n) = \bar{r}_u(n) \quad \text{[Equation 6]}$$

A reference signal sequence for the NPUSCH format 2 is provided by Equation 7.

$$r_u(3n+m) = \bar{w}(m)\bar{r}_u(n), \; m=0,1,2 \quad \text{[Equation 7]}$$

In this case, $\bar{w}(m)$ is defined as Table 5.5.2.2.1-2 of 3GPP TS36.211 having a sequence index selected based on $$\left(\sum_{i=0}^{7} c(8n_s + i)2^i\right) \bmod 3$$

with $c_{init}=N_{ID}^{Ncell}$.

A reference signal sequences $r_u(n)$ for $N_{sc}^{RU}>1$ is defined by the cyclic shift α of a base sequence according to Equation 8.

$$r_u(n) = e^{j\alpha n} e^{j\phi(n)\pi/4}, \; 0 \le n < N_{sc}^{RU} \quad \text{[Equation 8]}$$

In this case, φ(n) is provided by Table 10.1.4.1.2-1 with respect to $N_{sc}^{RU}=3$, is provided by Table 12 with respect to $N_{sc}^{RU}=6$, and is provided by Table 13 with respect to $N_{sc}^{RU}=12$.

When group hopping is not enabled, a base sequence index u is provided by higher layer parameters threeTone-BaseSequence, sixTone-BaseSequence, and twelveTone-BaseSequence, respectively, with respect to $N_{sc}^{RU}=3$, $N_{sc}^{RU}=6$, and $N_{sc}=12$. When group hopping is not signaled by higher layers, a base sequence is provided by Equation 9.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases} \quad \text{[Equation 9]}$$

When group hopping is enabled, the base index u is provided by Paragraph 10.1.4.1.3 of 3GPP TS36.211.

A cyclic shift for $N_{sc}^{RU}=3$ and $N_{sc}^{RU}=6$ as defined in Table 14, are derived from respective higher layer parameters threeTone-CyclicShift and sixTone-CyclicShift. $\alpha=0$ for $N_{sc}^{RU}=12$.

Table 12 is a table showing an example of $\varphi(n)$ for $N_{sc}^{RU}=3$.

TABLE 12

| u | $\varphi(0), \varphi(1), \varphi(2)$ | | |
|---|---|---|---|
| 0 | 1 | −3 | −3 |
| 1 | 1 | −3 | −1 |
| 2 | 1 | −3 | 3 |
| 3 | 1 | −1 | −1 |
| 4 | 1 | −1 | 1 |
| 5 | 1 | −1 | 3 |
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

Table 13 is a table showing another example of $\varphi(n)$ for $N_{sc}^{RU}=6$.

TABLE 13

| u | $\varphi(0), \ldots, \varphi(5)$ | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 is a table showing an example of $\alpha$.

TABLE 14

| $N_{sc}^{RU} = 3$ | | $N_{sc}^{RU} = 6$ | |
|---|---|---|---|
| 3 tone - cyclic shift (threeTone-CyclicShift) | $\alpha$ | 6 tone - cyclic shift (sixTone-CyclicShift) | $\alpha$ |
| 0 | 0 | 0 | 0 |
| 1 | $2\pi/3$ | 1 | $2\pi/6$ |
| 2 | $4\pi/3$ | 2 | $4\pi/6$ |
| | | 3 | $8\pi/6$ |

For a reference signal for the NPUSCH format 1, sequence-group hopping may be enabled. In this case, the sequence-group number u of the slot $n_s$ is defined by a group hopping pattern $f_{gh}(n_s)$ and a sequence-shift pattern $f_{ss}$ according to Equation 10.

$$u = (f_{gh}(n_s) + f_{ss}) \bmod N_{seq}^{RU} \quad \text{[Equation 10]}$$

In this case, the number of reference signal sequences, $N_{seq}^{RU}$ available for each resource unit size is provided by Table 15.

Table 15 shows an example of $N_{seq}^{RU}$.

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping is enabled or disabled by cell-specific parameters groupHoppingEnabled provided by higher layers. Sequence group hopping for an NPUSCH may be disabled by a specific UE through a higher-layer parameter groupHoppingDisabled unless NPUSCH transmission corresponds to the retransmission of the same transport block or a random access response grant as part of a contention-based random access procedure.

A group hopping pattern $f_{gh}(n_s)$ is provided by Equation 11.

$$f_{gh}(n_s) = \left(\sum_{i=0}^{7} c(8n_s' + i) \cdot 2^i\right) \bmod N_{seq}^{RU} \quad \text{[Equation 11]}$$

In this case, $n_s'$ for $N_{sc}^{RU} => 1$, and $n_s'$ is the slot number of the first slot of a resource unit. The pseudo-random sequence c(i) is defined by Paragraph 7.2. The pseudo-random sequence generator is initialized as $$c_{init} = \left\lfloor \frac{N_{ID}^{Ncell}}{N_{seq}^{RU}} \right\rfloor$$

at the start of a resource unit with respect to $N_{sc}^{RU}=1$ and in each even-numbered slot with respect to $N_{sc}^{RU}>1$.

A sequence-shift pattern $f_{ss}$ is provided by Equation 12.

$$f_{ss} = (N_{ID}^{Ncell} + \Delta_{ss}) \bmod N_{seq}^{RU} \quad \text{[Equation 12]}$$

In this case, as $\Delta_{ss} \in \{0, 1, \ldots, 29\}$ is provided by a higher-layer parameter groupAssignmentNPUSCH. If the value is not signaled, $\Delta_{ss}=0$.

A sequence r(•) needs to be multiplied by a size scaling factor $\beta_{NPUSCH}$ and needs to be mapped to subcarriers as a sequence that starts as r(0).

A set of subcarriers used for a mapping process needs to be the same as corresponding NPUSCH transmission defined in Paragraph 10.1.3.6 of 3GPP 36.211.

In mapping to resource elements (k,l), an increment sequence of the slot number needs to be the first k, subsequently l, and the last. The values of the symbol index l within the slot are provided in Table 16.

Table 16 shows an example of demodulation reference signal locations for an NPUSCH.

TABLE 16

| | Values for l | |
|---|---|---|
| NPUSCH format | $\Delta f = 3.75$ kHz | $\Delta f = 15$ kHz |
| 1 | 4 | 3 |
| 2 | 0, 1, 2 | 2, 3, 4 |

SF-FDMA Baseband Signal Generation

With respect to $N_{sc}^{RU}>1$ the time-contiguous signal $s_l(t)$ of an SC-FDMA symbol l within a slot is defined by Paragraph 5.6 as a value $N_{RB}^{UL}N_{sc}^{RB}$ substituted with $N_{sc}^{UL}$.

With respect to $N_{sc}^{RU}=1$, the time-contiguous signal $s_{k,l}(t)$ for the subcarrier index k of an SC-FDMA symbol l within an uplink slot is defined by Equation 13.

$$s_{k,l}(t) = a_{k^{(-)},l} \cdot e^{j\phi_{k,l}} \cdot e^{j 2\pi(k+1/2)\Delta f(t - N_{CP,l}T_s)}$$

$$k^{(-)} = k + \lfloor N_{sc}^{UL}/2 \rfloor \qquad \text{[Equation 13]}$$

$0 \le t < (N_{CP,l}+N)T_s$. In this case, parameters for $\Delta f=15$ kHz and $\Delta f=3.75$ kHz and are provided by Table 17. $a_{k^{(-)},l}$ is the modulation value of the symbol l, and phase rotation $\varphi_{k,l}$ is defined by Equation 14.

$$\varphi_{k,l} = \rho(\tilde{l} \bmod 2) + \hat{\varphi}_k(\tilde{l}) \qquad \text{[Equation 14]}$$

$$\rho = \begin{cases} \frac{\pi}{2} & \text{for } BPSK \\ \frac{\pi}{4} & \text{for } QPSK \end{cases}$$

$$\hat{\varphi}_k(\tilde{l}) = \begin{cases} 0 & \tilde{l} = 0 \\ \hat{\varphi}_k(\tilde{l}-1) + 2\pi \Delta f(k+1/2)(N+N_{CP,l})T_s & \tilde{l} > 0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

In this case, $\tilde{l}$ is a symbol counter reset when transmission starts, and is increased with respect to each symbol during transmission.

Table 17 shows an example of SC-FDMA parameters for $N_{sc}^{RU}=1$.

TABLE 17

| Parameter | $\Delta f = 3.75$ kHz | $\Delta f = 15$ kHz |
| --- | --- | --- |
| N | 8192 | 2048 |
| Cyclic prefix length $N_{CP,l}$ | 256 | 160 for l = 0<br>144 for l = 1, 2, . . . , 6 |
| Set of values for k | −24, −23, . . . , 23 | −6, −5, . . . , 5 |

SC-FDMA symbols within a slot need to start at l=0 and to be transmitted in an increment sequence of l. In this case, an SC-FDMA symbol l>0 starts at time $\Sigma_{l'=0}^{l-1}(N_{CP,l'}+N)T_s$ within the slot. With respect to $\Delta f=3.75$ kHz, $2304T_s$ within $T_{slot}$ is not transmitted and is used for a guard period.

Narrowband Physical Random Access Channel (NPRACH)

A physical layer random access preamble is based on a single-subcarrier frequency-hopping symbol group. A symbol group is shown as a random access symbol group of FIG. 1-8, and has a cyclic prefix having a length of $T_{CP}$ and a sequence of 5 identical symbols having a total length of $T_{SEQ}$. Parameter values are listed in Table 18. The parameter values are listed as random access preamble parameters of Table 18.

Figure 7:
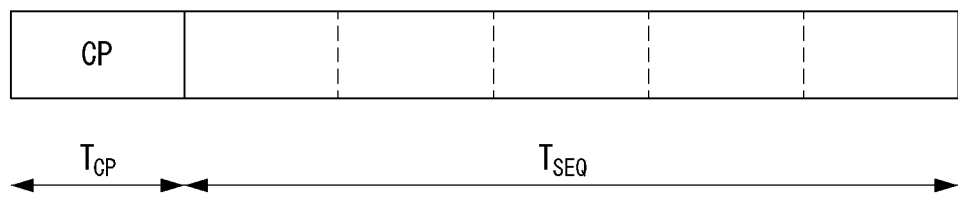
FIG. 7 illustrates an example of a random access symbol group.

FIG. 7 shows an example of a random access symbol group.

Table 18 shows an example of random access preamble parameters.

TABLE 18

| Preamble format | $T_{CP}$ | $T_{SEQ}$ |
| --- | --- | --- |
| 0 | $2048T_s$ | $5 \cdot 8192T_s$ |
| 1 | $8192T_s$ | $5 \cdot 8192T_s$ |

A preamble including 4 symbol groups transmitted without a gap is transmitted $N_{rep}^{NPRACH}$ times.

When a random access preamble is triggered by a MAC layer, the transmission of the random access preamble is limited to specific time and frequency domains.

An NPRACH configuration provided by higher layers includes the follows.

NPRACH resource periodicity $N_{period}^{NPRACH}$,

Frequency location $N_{scoffset}^{NPRACH}$ (nprach-Subcarrier-Offset) of a first subcarrier allocated to an NPRACH, The number of subcarriers $N_{sc}^{NPRACH}$ (nprach-NumSubcarriers) allocated to an NPRACH, The number of start subcarriers $N_{sc\_cont}^{NPRACH}$ (nprach-NumCBRA-StartSubcarriers) allocated to contention-based NPRACH random access NPRACH repetition number $N_{start}^{NPRACH}$ per attempt (nprach-StartTime), NPRACH start time $N_{start}^{NPRACH}$ (nprach-StartTime), Fraction $N_{MSG3}^{NPRACH}$ (nprach-SubcarrierMSG3-RangeStart) for calculating a start subcarrier index for an NPRACH subcarrier range reserved for the indication of UE support to multi-tone msg3 transmission NPRACH transmission may start $N_{start}^{NPRACH} \cdot 30720 \, T_s$ time unit after the start of a radio frame that fulfills $n_f \bmod(N_{period}^{NPRACH}/10)=0$. After the transmission of a 4·64 $(T_{CP}+T_{SEQ})$, the gap of a $40 \cdot 30720 T_s$ time unit is inserted.

NPRACH configurations, that is, $N_{scoffset}^{NPRACH} + N_{sc}^{NPRACH} > N_{sc}^{UL}$, are not valid.

NPRACH start subcarriers allocated to contention-based a random access are divided into two sets of subcarriers $\{0, 1, \ldots, N_{sc\_cont}^{NPRACH} N_{MSG3}^{NPRACH} - 1\}$ and $\{N_{sc\_cont}^{NPRACH} N_{MSG3}^{NPRACH}, \ldots, N_{sc\_cont}^{NPRACH} - 1\}$. In this case, if present, the second set indicates UE support for multi-tone msg3 transmission.

The frequency location of NPRACH transmission is restricted within an $N_{sc}^{RA}=12$ subcarrier. Frequency hopping is used within 12 subcarriers. In this case, the frequency location of an $i^{th}$ symbol group is provided by $N_{sc}^{RA}(i) = n_{start} + \tilde{N}_{sc}^{RA}(i)$. In this case, $n_{start} = N_{scoffset}^{NPRACH} + \lfloor n_{init}/N_{sc}^{RA} \rfloor \cdot N_{sc}^{RA}$, and Equation 15 is as follows.

$$\tilde{n}_{sc}^{RA}(i) = \quad \text{[Equation 15]}$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

In this case, $\tilde{n}_{sc}^{RA}(0) = n_{init} \bmod N_{sc}^{RA}$ having $n_{init}$ is a subcarrier selected by the MAC layer from $\{0, 1, \ldots, N_{sc}^{NPRACH} - 1\}$. A pseudo-random sequence c(n) is provided by Paragraph 7.2 of GPP TS36.211. A pseudo-random sequence generator is initialized as $c_{init} = N_{ID}^{Ncell}$.

A time-contiguous random access signal $s_i(t)$ for a symbol group i is defined by Equation 16.

$$s_i(t) = \beta_{NPRACH} e^{j2\pi(\tilde{n}_{SC}^{RA}(i) + Kk_0 + 1/2)\Delta f_{RA}(t - T_{CP})} \quad \text{[Equation 16]}$$

In this case, $0 \leq t \leq T_{SEQ} T_{CP}$. $\beta_{NPRACH}$ is a size scaling factor for following transmit power $P_{NPRACH}$ defined in Paragraph 16.3.1 of 3GPP TS 36.213. $k_0 = -N_{sc}^{UL}/2$, $K = \Delta f/\Delta_{RA}$ describes the difference of subcarrier spacing between a random access preamble and uplink data transmission. The location of the frequency domain controlled by a parameter $N_{sc}^{RA}(i)$ is derived from Paragraph 10.1.6.1 of 3GPP TS36.211. The variable $\Delta f_{RA}$ is provided by Table 19.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements that carry information generated from higher layers, and is an interface defined between 3GPP TS 36.212 and 3GPP TS 36.211.

The following downlink physical channels are defined.
Narrowband physical downlink shared channel (NPDSCH)
Narrowband physical broadcast channel (NPBCH)
Narrowband physical downlink control channel (NPDCCH)

A downlink narrowband physical signal corresponds to a set of resource elements used by physical layers, but does not carry information generated from higher layers. The following downlink physical signals are defined:
A narrowband reference signal (NRS)
A narrowband synchronization signal
A narrowband physical downlink shared channel (NPDSCH)

A scrambling sequence generator is initialized as $c_{init} = n_{RNTI} \cdot 2^{14} + n_f \bmod 2 \cdot 2^{13} + \lfloor n_s/2 \rfloor + N_{ID}^{Ncell}$. In this case, $n_s$ is the first slot of codeword transmission. In the case of NPDSCH repetitions and an NPDSCH carrying a BCCH, a scrambling sequence generator is initialized again according to expressions described with respect to each repetition. In the case of the NPDSCH repetitions, when an NPDSCH does not carry a BCCH, a scrambling sequence generator is initialized again according to the above-described expressions after each $\min(M_{rep}^{NPDSCH}, 4)$ transmission of codeword having $n_s$ and $n_f$ configured as the first slot and frame used for repetition transmission, respectively.

Modulation is performed using a QPSK modulation method.

An NPDSCH may be mapped to one or more subframes $N_{SF}$, as provided by Paragraph 16.4.1.5 of 3GPP TS 36.213. Each of the one or more subframes needs to be transmitted $M_{rep}^{NPDSCH}$ times.

With respect to each antenna port used for the transmission of a physical channel, the blocks $y^{(p)}(0), \ldots y^{(p)}(M_{symb}^{ap} - 1)$ of complex-value symbols need to be mapped to resource elements (k,l) satisfying all the following criteria in a current subframe.

A subframe is not used for the transmission of an NPBCH, NPSS or NSSS, and

They are assumed to be not used for an NRS by a UE, and

They do not overlap resource elements used for a CRS (if present), and

The index l of the first slot satisfies $l \geq l_{DataStart}$ in a subframe. In this case, $l_{Datastart}$ is provided by Paragraph 16.4.1.4 of 3GPP TS 36.213.

In a sequence starting at $y^{(p)}(0)$, mapping to the resource elements (k,l) through an antenna port p that satisfies the above criteria of $y^{(p)}(0), \ldots y^{(p)}(N_{symb}^{ap} - 1)$ is an increment sequence of the first index k and an index l, which start from the first slot of the subframe and end at the second slot. In the case of an NPDSCH not carrying a BCCH, after mapping to a subframe, Before continuing mapping to a next subframe of $y^{(p)}(\cdot)$, $M_{rep}^{NPDSCH} - 1$ part for a subframe is repeated with respect to subframes. Thereafter, the mapping of $y^{(p)}(0), \ldots y^{(p)}(M_{symb}^{ap} - 1)$ is repeated until $M_{rep}^{NPDSCH} N_{SF}$ subframes are transmitted. In the case of an NPDSCH carrying a BCCH, $y^{(p)}(0), \ldots y^{(p)}(M_{symb}^{ap} - 1)$ is mapped to $N_{SF}$ subframes as a sequence and is then repeated until the $M_{rep}^{NPDSCH} N_{SF}$ subframes are transmitted.

NPDSCH transmission may be configured by higher layers as transmission gaps where the NPSDCH transmission is postponed. When $R_{max} < N_{gap,threshold}$, a gap is not present in NPDSCH transmission. In this case, $N_{gap,threshold}$ is provided by a higher layer parameter dl-GapThreshold, and $R_{max}$ is provided by 3GPP TS 36.213. A gap start frame and subframe are provided by $(10n_f + \lfloor n_s/2 \rfloor)$ mod $N_{gap,period} = 0$. In this case, gap periodicity $N_{gap,period}$ is provided by a higher layer parameter dl-GapPeriodicity. Gap duration of a plurality of subframes is provided by $N_{gap,duration} = N_{gap,coeff} N_{gap,period}$. In this case, $N_{gap,coeff}$ is provided by a higher layer parameter dl-GapDurationCoeff. In the case of an NPDSCH carrying a BCCH, transmission gaps are not present.

If a subframe is not an NB-IoT downlink subframe, a UE does not expect an NPDSCH a subframe i other the transmission of an NPDSCH carrying SystemInformationBlock-Type1-NB in a subframe 4. In the case of NPDSCH transmissions, NPDSCH transmission is postponed up to a next NB-IoT downlink subframe in subframes not the NB-IoT downlink subframes.

UE procedure for receiving NPDSCH

An NB-IoT UE needs to assume a subframe as an NB-IoT DL subframe in the following case.

A UE determines that a subframe does not include NPSS/NSSS/NPBCH/NB-SIB1 transmission, and In the case of an NB-IoT carrier in which a higher layer parameter operation ModeInfo is received, a UE obtains SystemInformationBlockType1-NB and configures a subframe as an NB-IoT DL subframe.

In the case of an NB-IoT carrier in which DL-Carrier-ConfigCommon-NB is present, a subframe is configured as an NB-IoT DL subframe by downlinkBitmap-NonAnchor, that is, a higher layer parameter.

In the case of an NB-IoT UE supporting two HARQ-Processes-r14, a maximum of 2 downlink HARQ processes need to be present.

When an NPDCCH having the DCI format N1, N2 ended in a subframe n intended for a UE is detected by a given serving cell, the UE needs to start in a n+5 DL subframe and to decode corresponding NPDSCH transmission of an N contiguous NB-IoT DL subframe(s) $n_i$ having i=0, 1, . . . , N−1 for NPDCCH information. In this case, The subframe n is the last subframe in which an NPDCCH is transmitted, and is determined from the start subframe of NPDCCH transmission and the DCI subframe repetition number field of corresponding DCI;

A subframe(s) ni wherein i=0, 1, . . . , N−1 is N contiguous NB-IoT DL subframe(s) other than subframes used for SI messages. In this case, n0<n1< . . . , nN−1, $N = N_{Rep} N_{SF}$. In this case, the value of $N_{Rep}$ is determined by the repetition number field of corresponding DCI. The value of $N_{SF}$ is determined by the resource allocation field of corresponding DCI.

$k_0$ is the number of NB-IoT DL subframe(s) from a DL subframe n+5 to a DL subframe $n_0$. In this case, $k_0$ is determined by a scheduling delay field ($I_{Delay}$) with respect to the DCI format N1, and is $k_0 = 0$ with respect to the DCI format N2. In the case of DCI CRC scrambled by a G-RNTI, $k_0$ is determined by a scheduling delay field ($I_{Delay}$) according to Table 21. If not, $k_0$ is determined by a scheduling delay field ($I_{Delay}$) according to Table 20. The value of $R_{max}$ follows Lower Paragraph 16.6 of 3GPP 36.213 for a corresponding DCI format N1.

Table 20 shows an example of $k_0$ for the DCI format N1.

TABLE 20

| $I_{Delay}$ | $k_0$ $R_{max} < 128$ | $k_0$ $R_{max} \geq 128$ |
|---|---|---|
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of $k_0$ for the DCI format N1 having a DCI CRC scrambled by a G-RNTI.

TABLE 21

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

After the end of NPUSCH transmission by a UE, the UE does not expect to receive transmissions in 3 DL subframes.

Resource allocation information of the DCI format N1, N2 (paging) for an NPSICH is indicated by a scheduled UE.

Table 22 shows an example of the number of subframes of an NPDSCH. The number of subframes ($N_{SF}$) determined by a resource allocation field ($I_{SF}$) in corresponding DCI according to Table 22.

A repetition number ($N_{Rep}$) determined by the repetition number field ($I_{Rep}$) in corresponding DCI according to Table 23.

TABLE 22

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the repetition number of an NPDSCH.

TABLE 23

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |

TABLE 23-continued

| $I_{Rep}$ | $N_{Rep}$ |
|---|---|
| 9 | 256 |
| 10 | 384 |
| 11 | 512 |
| 12 | 768 |
| 13 | 1024 |
| 14 | 1536 |
| 15 | 2048 |

The repetition number of an NPDSCH carrying SystemInformationBlockType1-NB is determined based on the parameter schedulingInfoSIB1 configured by higher layers, and follows Table 24.

Table 24 shows an example of the repetition number of an SIB1-NB.

TABLE 24

| Value of schedulingInfoSIB1 | NPDSCH repetition number |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

A start radio frame for the first transmission of an NPDSCH carrying SystemInformationBlockType1-NB is determined according to Table 125.

Table 25 shows an example of a start radio frame for the first transmission of an NPDSCH on which an SIB1-NB is carried.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
|  | $N_{ID}^{Ncell}$ mod 4 = 1 | 16 |
|  | $N_{ID}^{Ncell}$ mod 4 = 2 | 32 |
|  | $N_{ID}^{Ncell}$ mod 4 = 3 | 48 |
| 8 | $N_{ID}^{Ncell}$ mod 2 = 0 | 0 |
|  | $N_{ID}^{Ncell}$ mod 2 = 1 | 16 |
| 16 | $N_{ID}^{Ncell}$ mod 2 = 0 | 0 |
|  | $N_{ID}^{Ncell}$ mod 2 = 1 | 1 |

A start OFDM symbol for an NPDSCH is provided by the index $I_{DataStart}$ of the first slot of a subframe k, and is determined as follows.

When the subframe k is a subframe used to receive an SIB1-NB,

When the value of the higher layer parameter operationModeInfo is set to '00' or '01', $I_{DataStart}$=3

Otherwise, $I_{DataStart}$=0

If not,

When the value of a higher layer parameter eutraControlRegionSize is present, $I_{DataStart}$ is provided by a higher layer parameter eutraControlRegionSize.

Otherwise, $I_{DataStart}$=0

UE Procedure for Reporting ACK/NACK

When NPDSCH transmission intended for a UE and ended in an NB-IoT subframe n for which ACK/NACK needs to be provided is detected, the use of the NPUSCH format 2 in N contiguous NB-IoT UL slots by the UE needs to be provided and started when n+$k_0$−1 DL subframe transmission of an NPUSCH carrying an ACK/NACK response is ended. In this case, $N=N_{Rep}^{AN} N_{slots}^{UL}$, and the value of $N_{Rep}^{AN}$ is provided by a higher layer parameter ack-NACK-NumRepetitions-Msg4 configured for an NPRACH resource associated with Msg4 NPDSCH transmission and by a higher layer parameter ack-NACK-NumRepetitions if not. The value of $N_{slots}^{UL}$ is the number of slots within a resource unit.

A subcarrier allocated for ACK/NACK and the value of k0 are determined by the ACK/NACK resource field of the DCI format of a corresponding NPDCCH according to Table 16.4.2-1 and Table 16.4.2-2 of 3GPP TS36.213.

Narrowband Physical Broadcast Channel (NPBCH)

A processing structure for a BCH transmission channel follows Paragraph 5.3.1 of 3GPP TS 36.212 and has the following differences.

A transmission time interval (TTI) is 640 ms.

The size of a BCH transport block is configured as 34 bits.

CRC mask for an NPBCH is selected based on 1 or 2 transmission antenna ports by an eNodeB according to Table 5.3.1.1-1 of 3GPP TS 36.212. In this case, the transmission antenna port has been defined in Section 10.2.6 of 3GPP TS 36.211.

The number of rate matching bits has been defined in Section 10.2.4.1 of 3GPP TS 36.211.

Scrambling is performed according to Paragraph 6.6.1 of 3GPP TS 36.211 using $M_{bit}$ indicating the number of bits to be transmitted through an NPBCH. $M_{bit}$ is the same as 1600 with respect to a normal cyclic prefix. A scrambling sequence is initialized as $c_{init}=N_{ID}^{Ncell}$ with respect to radio frames satisfying $n_f$ mod 64=0.

Modulation is performed on each antenna port using a QPSK modulation method, and is transmitted in a subframe 0 during 64 contiguous radio frames that starts at each radio frame satisfying $n_f$ mod 64=0.

Layer mapping and precoding are performed according to Paragraph 6.6.3 of 3GPP TS 36.211 wherein P∈{1,2}. A UE assumes that antenna ports $R_{2000}$ and $R_{2001}$ are used for the transmission of a narrowband physical broadcast channel.

The block $y^{(p)}(0), \ldots y^{(p)}(M_{symb}-1)$ of complex-value symbols for each antenna port is transmitted in a subframe 0 during 64 contiguous radio frames that start at each radio frame satisfying $n_f$ mod 64= and needs to be mapped to elements (k, l) not reserved for the transmission of reference signals as a sequence starting from contiguous radio frames that start at y(0). An increment sequence is the first index k, and a subsequent index l. After the mapping to a subframe, before continuing to perform mapping to the subframe 0 of $y^{(p)}(\bullet)$ in a subsequent radio frame, the subframe is repeated to the subframe 0 in 7 subsequent radio frames. The first three OFDM symbols of the subframe are not used in the mapping process. For the mapping purpose, a UE assume narrowband reference signals for antenna ports 2000 and 2001 present regardless of an actual configuration and cell-specific reference signals for antenna ports 0-3. The frequency shift of the cell-specific reference signals is calculated by substituting cell $N_{ID}^{cell}$ with $N_{ID}^{Ncell}$ in the calculation of $v_{shift}$ of Paragraph 6.10.1.2 of 3GPP TS 36.211.

Narrowband Physical Downlink Control Channel (NPD-CCH)

A narrowband physical downlink control channel carries control information. A narrowband physical control channel is transmitted through one or an aggregation of two contiguous narrowband control channel elements (NCCEs). In this case, a narrowband control channel element corresponds to 6 contiguous subcarriers in a subframe. In this case, an NCCE 0 occupies subcarriers 0 to 5, and an NCCE 1 occupies subcarriers 6 to 11. An NPDCCH supports several formats listed in Table 1-26. In the case of the NPDCCH format 1, all NCCEs belong to the same subframe. One or two NPDCCHs may be transmitted within a subframe.

Table 26 shows an example of supported NPDCCH formats.

TABLE 26

| NPDCCH format | Number of NCCEs |
|---|---|
| 0 | 1 |
| 1 | 2 |

Scrambling needs to be performed according to Paragraph 6.8.2 of TS36.211. A scrambling sequence needs to be initialized at the start of a subframe $k_0$ according to Paragraph 16.6 of TS36.213 after every fourth NPDCCH subframe having $c_{init}=\lfloor n_s/2 \rfloor 2^9 + N_{ID}^{Ncell}$. In this case, $n_s$ is the first slot of an NPDCCH subframe in which scrambling is (re-) initialized.

Modulation is performed using a QPSK modulation method according to Paragraph 6.8.3 of TS36.211.

Layer mapping and precoding is performed according to Paragraph 6.6.3 of TS36.211 using the same antenna port as that of an NPBCH.

The block $y(0), \ldots y(M_{symb}-1)$ of complex-value symbols is mapped as resource elements (k,l) in a sequence that starts at y(0) through associated antenna ports that satisfy all the following criteria:

They are the part of an NCCE(s) allocated for NPDCCH transmission, and

They are assumed to be not used for the transmission of an NPBCH, NPSS, or NSSS, and They are assumed to be not used for an NRS by a UE, and They do not overlap resource elements used for a PBCH, PSS, SSS, or CRS as defined in Paragraph 6 of TS36.211 (if present), and The index l of the first slot of a subframe satisfies $l \geq l_{NPDCCHStart}$. In this case, $l_{NPDCCHStart}$ is provided by Paragraph 16.6.1 of 3GPP TS 36.213.

Mapping to a resource elements (k, l) through an antenna port p satisfying the above-described criteria is an increment sequence of the first index k, a subsequent index l that start from the first slot of a subframe and end at the second slot.

NPDCCH transmission may be configured by higher layers having transmission gaps where NPDCCH transmission is postponed. A configuration is the same as that described with respect to the NPDSCH of Paragraph 10.2.3.4 of TS36.211.

If a subframe is not an NB-IoT downlink subframe, a UE does not expect an NPDCCH in a subframe i. In the case of NPDCCH transmissions, NPDCCH transmissions are postponed up to an NB-IoT downlink subframe in subframes not NB-IoT downlink subframes.

DCI Format

DCI format N0

The DCI format N0 is used for the scheduling of an NPUSCH in one UL cell. The following information is transmitted by the DCI format N0.

Flag for format N0/format N1 distinction (1 bit), subcarrier indication (6 bits), resource allocation (3 bits), scheduling delay (2 bits), modulation and coding method (4 bits), redundancy Version (1 bit), a repetition number (3 bits), a new data indicator (1 bit), a DCI subframe repetition number (2 bits)

DCI Format N1

The DCI format N1 is used for the scheduling of one NPDSCH codeword and a random access procedure initiated by an NPDCCH sequence in one cell. DCI corresponding to the NPDCCH sequence is carried by an NPDCCH. The following information is transmitted by the DCI format N1:

Flag for format N0/format N1 distinction (1 bit), NPDCCH sequence indicator (1 bit)

The format N1 is used for a random access procedure initiated by an NPDCCH sequence only when an NPDCCH sequence indicator is set to "1", a format N1 CRC is scrambled as a C-RNTI, and the remaining all fields are configured as follows:

The start number of NPRACH repetitions (2 bits), subcarrier indication (6 bits) of an NPRACH, and all the remaining bits of the format N1 are set to 1.

Otherwise,

Scheduling delay (3 bits), resource allocation (3 bits), a modulation and coding method (4 bits), a repetition number (4 bits), a new data indicator (1 bit), an HARQ-ACK resource (4 bits), a DCI subframe repetition number (2 bits)

When a format N1 CRC is scrambled as an RA-RNTI, the following field of the above fields is reserved.

A new data indicator, HARQ-ACK resource

When the number of information bits of the format N1 is smaller than the number of information bits of the format N0, zero is attached to the format N1 until a payload size becomes identical with that of the format N0.

DCI Format N2

The DCI format N2 is used for paging and direct indication. The following information is transmitted by the DCI format N2.

A flag (1 bit) for paging/direct indication distinction where flag=0:

Direct indication information (8 bit), reservation information bits are added until the size becomes the same size as the size of the format N2 where flag=1.

where flag=1:

Resource allocation (3 bits), a modulation and coding method (4 bits), a repetition number (4 bits), a DCI subframe repetition number (3 bits)

NPDCCH-Related Procedure

A UE needs to monitor an NPDCCH candidate set configured by higher layer signaling for control information. In this case, the monitoring means that an attempt is made to decode each of NPDCCHs within a set according to all monitored DCI formats.

An NPDCCH search space $NS_k^{(L',R)}$ within an aggregation level $L' \in \{1,2\}$ and a repetition level $R \in \{1,2,4,8,16,32,64,128,256,512,1024,2048\}$ is defined by a set of NPFCCH candidates. In this case, each candidate is repeated as a set of R contiguous NB-IoT downlink subframes other than subframes used for the transmission of SI messages that start in a subframe k.

The location of the start subframe k is provided by $k=k_b$. In this case, $k=k_b$ is a b-th contiguous NB-IoT DL subframe in a subframe k0 other than subframes used for the transmission of SI messages $b=u \cdot R$, $u=0, 1, \ldots,$ $$\frac{R_{max}}{R} - 1,$$

and the subframe k0 is a subframe that satisfies a condition $(10n_f + \lfloor n_s/2 \rfloor) \mod T) = \lfloor \alpha_{offset} \cdot T \rfloor$. In this case, $T=R_{max} \cdot G$, $T \geq 4$. G and $\alpha_{offset}$ are provided by a higher layer parameter.

With respect to a type 1-NPDCCH common search space, k=k0, and is determined from the locations of NB-IoT paging opportunity subframes.

When a UE is configured as an NB-IoT carrier by higher layers in order to monitor an NPDCCH UE-specific search space, The UE monitors the NPDCCH UE-specific search space through the NB-IoT carrier configured by higher layers, The UE does not expect to receive an NPSS, NSSS, NPBCH through the NB-IoT carrier configured by higher layers.

Otherwise,

The UE monitors the NPDCCH UE-specific search space through the same NB-IoT carrier in which an NPSS/NSSS/NPBCH has been detected.

In the first slot of a subframe k, a start OFDM symbol for an NPDCCH provided by an index $l_{NPDCCHStart}$ is determined as follows.

If a higher layer parameter eutraControlRegionSize is present, $l_{NPDCCHStart}$ is provided by a higher layer parameter eutraControlRegionSize.

Otherwise, $l_{NPDCCHStart}=0$

Narrowband Reference Signal (NRS)

Before a UE obtains operationModeInfo, the UE may assume that narrowband reference signals are transmitted in a subframe #9 not including an NSSS and in subframes #0 and #4.

When the UE receives the higher layer parameter operationModeInfo indicating a guard band or standalone, Before the UE obtains SystemInformationBlockType1-NB, the UE may assume that narrowband reference signals are transmitted in a subframe #9 not including an NSSS and subframes #0, #1, #3, #4.

After the UE obtains SystemInformationBlockType1-NB, the UE may assume that narrowband reference signals are transmitted in the subframe #9 not including an NSSS, the subframes #0, #1, #3, #4, and an NB-IoT downlink subframe, and does not expect narrowband reference signals in other downlink subframes.

When a UE receives a higher layer parameter operationModeInfo indicating inband-SamePCI or inband-Different PCI, Before the UE obtains SystemInformationBlockType1-NB, the UE may assume that narrowband reference signals are transmitted in a subframe #9 not including an NSSS and subframes #0, #4.

After the UE obtains SystemInformationBlockType1-NB, the UE may assume that narrowband reference signals are transmitted in the subframe #9 not including an NSSS, the subframes #0, #4, and an NB-IoT downlink subframe, and does not expect narrowband reference signals in other downlink subframes.

Narrowband Primary Synchronization Signal (NPSS)

A sequence $d_l(n)$ used for a narrowband primary synchronization signal is generated from the Zadoff-Chu sequence of a frequency domain according to Equation 17.

$$d_l(n) = S(l) \cdot e^{-j\frac{\pi u n(n+1)}{11}}, \quad n = 0, 1, \ldots, 10 \quad \text{[Equation 17]}$$

In this case, a Zadoff-Chu root sequence index u=5 and S(l) for different symbol indices l is provided in Table 27.

Table 27 shows an example of S(l).

TABLE 27

| Cyclic prefix length | s(3), ..., s(13) |             |
|---|---|---|
| Normal | 1  1  1  1  −1  −1  1  1 1 −1  1 |

The same antenna port needs to be used for all the symbols of a narrowband primary synchronization signal within a subframe.

A UE should not assume that a narrowband primary synchronization signal is transmitted through the same antenna port as a given downlink reference signal. The UE should not assume that the transmissions of a narrowband primary synchronization signal in a given subframe use the same antenna port or ports as a narrowband primary synchronization signal in given other subframes.

A sequences $d_l(n)$ needs to be mapped to resource elements (k,l) as an increment sequence of the first index k=0, 1, ..., $N_{sc}^{RB}-2$ and a subsequent index=3, 4, ..., $2N_{symb}^{DL}-1$ in a subframe 5 within all radio frames. With respect to resource elements (k, l) overlapping resource elements in which a cell-specific reference signals is transmitted, a corresponding sequence element d(n) is not used for an NPSS, but is counted as a mapping process.

Narrowband Secondary Synchronization Signals (NSSS)

A sequence d(n) used for a narrowband secondary synchronization signal is generated from a frequency domain Zadoff-Chu sequence according to Equation 18.

$$d(n) = b_q(n) \cdot e^{-j2\pi\theta_f n} \cdot e^{-j\frac{\pi u n'(n'+1)}{131}} \quad \text{[Equation 18]}$$

In this case, n=0, 1, ..., 131 n'=n mod 131 m=n mod 128

$$u = N_{ID}^{Ncell} \mod 126 + 3$$

$$q = \left\lfloor \frac{N_{ID}^{Ncell}}{126} \right\rfloor$$

A binary sequence $b_q(n)$ is provided by Table 28. The cyclic shift $\theta_f$ of a frame number $n_f$ is provided by mod 4.

$$\theta_f = \frac{33}{132}(n_f/2)$$

Table 28 shows an example of $b_q(n)$.

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 -1 -1 1 1 -1 1 -1 -1 1 -1 1 1 -1 1 1 -1<br>-1 1 1 1 -1 -1 1 -1 1 1 -1 1 -1 -1 1 -1 1 1 -1 -1 1 1 1 -1 -1 1 1 1 -1<br>1 -1 -1 1 -1 1 1 1 -1 1 1 -1 -1 1 -1 1 1 -1 -1 1 -1 1 1 1 -1 -1 1 1 1 -1<br>-1 1 -1 1 1 1 -1 -1 1 1 -1 1 -1 -1 1 -1 1 1 1 -1 -1 1 1 1 -1 -1 1 -1 1 1<br>1 -1 -1 1 -1 1 1 1 -1 1 1 -1 -1 1 -1 1 1 -1 -1 1 -1 1 1 1 -1 -1 1 1 1 -1<br>-1 1 -1 1 1 -1 1 -1 -1 1 1 1 -1 -1 1 1 1 -1 -1 1 -1 1 1 1 -1] |
| 2 | [1 -1 -1 1 -1 1 1 -1 -1 1 1 -1 -1 1 1 -1 1 -1 -1 1 -1 1 1 -1 -1 1 1 1 -1<br>-1 1 1 1 -1 -1 1 -1 1 1 -1 -1 1 1 1 -1 -1 1 1 1 -1 -1 1 1 1 -1<br>-1 1 1 -1 1 -1 -1 1 -1 1 1 -1 -1 1 1 1 -1 -1 1 -1 1 1 1 -1<br>-1 1 -1 1 1 1 -1 -1 1 1 -1 1 -1 -1 1 -1 1 1 1 -1 -1 1 1 1 -1 -1 1 -1 1 1<br>1 -1 -1 1 -1 1 1 1 -1 1 1 -1 -1 1 -1 1 1 -1 -1 1 -1 1 1 1 -1 -1 1 1 1 -1<br>1 -1 1 -1 -1 1 1 1 -1 -1 1 1 1 -1 -1 1 -1 1 1] |
| 3 | [1 -1 -1 1 -1 1 1 -1 -1 1 1 -1 -1 1 -1 1 1 -1 -1 1 -1 1 1 1 -1<br>-1 1 1 1 -1 -1 1 -1 1 1 -1 -1 1 1 1 -1 -1 1 1 1 -1<br>-1 1 1 -1 1 -1 -1 1 -1 1 1 -1 -1 1 1 1 -1 -1 1 -1 1 1 -1 -1 1 -1 1 1<br>1 -1 1 -1 -1 1 1 1 -1 -1 1 1 1 -1 -1 1 -1 1 1 1 -1 -1 1 1 1 -1<br>-1 1 1 -1 -1 1 -1 1 1 -1 -1 1 1 1 -1 -1 1 1 1 -1 -1 1 -1 1 1 1 -1<br>-1 1 -1 1 1 -1 1 -1 -1 1 1 1 -1 -1 1 1 -1 1 1 -1] |

The same antenna port needs to be used by all the symbols of a narrowband secondary synchronization signal within a subframe.

A UE should not assume that a narrowband secondary synchronization signal is transmitted through the same antenna port as a given downlink reference signal. The UE should not assume that the transmissions of a narrowband secondary synchronization signal in a given subframe uses the same antenna port or ports as the narrowband secondary synchronization signal of a given another subframe.

A sequence d(n) should be mapped to resource elements (k,l) as a sequence starts at d(0) in the sequence of the first index k through 12 allocated subcarriers and then the sequence of an index l through the last $N_{symb}^{NSSS}$ symbols allocated in radio frames to satisfy $n_f$ mod 2=0. In this case, $N_{symb}^{NSSS}$ is provided by Table 29.

Table 29 shows an example of the number of NSSS symbols.

TABLE 29

| Cyclic prefix length | $N_{symb}^{NSSS}$ |
|---|---|
| Normal | 11 |

Generation of OFDM Baseband Signal

If the higher layer parameter operationModeInfo does not indicates "inband-SamePCI" and samePCI-Indicator does not indicate "samePCI", the time-contiguous signal $s_l^{(p)}(t)$ through the antenna port p of an OFDM symbol l in a downlink slot is defined by Equation 19.

$$s_l^{(p)}(t) = \sum_{k=-\lfloor N_{sc}^{RB}/2 \rfloor}^{\lceil N_{sc}^{RB}/2 \rceil - 1} a_{k^{(-)},l}^{(p)} e^{j2\pi(k+\frac{1}{2})\Delta f(t-N_{CP,l}T_s)}$$ [Equation 19]

$0 \leq (N_{CP,l}+N) \times T_s$. In this case, $k^{(-)}=k+\lfloor N_{sc}^{RB}/2 \rfloor$, N=2048, $\Delta f$=15 kHz, and $a_{k,l}^{(p)}$ is the contents of a resource element (k,l) through an antenna port.

When the higher layer parameter operationModeInfo indicates "inband-SamePCI" or samePCI-Indicator indicates "samePCI", the time-contiguous signal $s_l^{(p)}(t)$ through the antenna port p of an OFDM symbol l'. In this case, $l'=l+N_{symb}^{DL}(n_s \mod 4) \in (0, \ldots, 27)$ is an OFDM symbol index in at the start of the last even-numbered subframe, and is defined by Equation 20.

$$s_l^{(p)}(t) = \sum_{k=-\lfloor N_{RB}^{DL}N_{sc}^{RB}/2 \rfloor}^{-1} e^{\theta_{k^{(-)}}} a_{k^{(-)},l}^{(p)} \cdot e^{j2\pi k \Delta f(t-N_{CP,l'} \mod N_{symb}^{DL} T_s)} +$$

$$\sum_{k=1}^{\lceil N_{RB}^{DL}N_{sc}^{RB}/2 \rceil} e^{\theta_{k^{(+)}}} a_{k^{(+)},l}^{(p)} \cdot e^{j2\pi k \Delta f(t-N_{CP,l'} \mod N_{symb}^{DL} T_s)}$$ [Equation 20]

$0 \leq t < (N_{CP,l}+N) \times T_s$. In this case, if $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor-1$ and a resource element (k, l') is used for narrowband IoT, $\theta_{k,l'}=j2\pi f_{NB-IoT}T_s$ $(N+\Sigma_{i=0}^{l'}N_{CP,i \mod 7})$, and otherwise is 0. $f_{NB-IoT}$ is a value obtained by subtracting the center frequency location of an LTE signal from the frequency location of a carrier of a narrowband IoT PRB.

In specific 3GPP spec., only a normal CP is supported for narrowband IoT downlink.

Hereinafter, a physical layer process of a narrowband physical broadcast channel (NPBCH) is described more specifically.

Scrambling

Scrambling is performed according to Paragraph 6.6.1 of 3GPP TS 36.211 using $M_{bit}$ indicating the number of bits to be transmitted through an NPBCH. $M_{bit}$ is the same as 1600 for a normal cyclic prefix. A scrambling sequence is initialized as $c_{init}=N_{ID}^{Ncell}$ in radio frames that satisfy $n_f$ mod 64=0.

Modulation

Modulation is performed using the modulation method of Table 10.2.4.2-1 according to Paragraph 6.6.2 of TS36.211.

Table 30 shows an example of a modulation method for an NPBCH.

TABLE 30

| Physical channel | Modulation methods |
|---|---|
| NPBCH | QPSK |

Layer Mapping and Precoding

Layer mapping and precoding is performed according to Paragraph 6.6.3 of 3GPP TS 36.211 where P∈{1,2}. A UE assumes that antenna ports $R_{2000}$ and $R_{2001}$ are used for the transmission of a narrowband physical broadcast channel.

Mapping to Resource Elements

A block $y^{(p)}(0), \ldots y^{(p)}(M_{symb}-1)$ of complex-value symbols for each antenna port needs to be transmitted in a subframe 0 during 64 contiguous radio frames that start at each radio frame satisfying $n_f$ mod 64=and needs to be mapped to elements (k,l) not reserved for the transmission of reference signals starting from contiguous radio frames that start at y(0) as a sequence, and needs to be an increment sequence of the first index k, a subsequent index l. After the mapping to the subframe, before continuing to mapping to a subframe 0 of $y^{(p)}(\cdot)$ in a subsequent radio frame, a subframe is repeated to a subframe 0 in subsequent 7 radio frames. The first three OFDM symbols of the subframe are not used for a mapping process.

For the mapping purpose, a UE assumes narrowband reference signals for antenna ports 2000 and 2001 present regardless of an actual configuration and cell-specific reference signals for antenna ports 0-3. The frequency shift of the cell-specific reference signals is calculated by substituting cell $N_{ID}^{cell}$ with $N_{ID}^{Ncell}$ in the calculation of $v_{shift}$ of Paragraph 6.10.1.2 of 3GPP TS 36.211.

Information related to an MIB-NB and an SIBN1-NB is described more specifically.
MasterInformationBlock-NB
MasterInformationBlock-NB includes system information transmitted through a BCH.
Signaling radio bearer: N/A
RLC-SAP: TM
Logical channel: BCCH
Direction: E-UTRAN to UE
Table 31 shows an example of a MasterInformationBlock-NB format.

TABLE 31

```
-- ASN1START
MasterInformationBlock-NB ::=     SEQUENCE {
          systemFrameNumber-MSB-r13           BIT STRING (SIZE (4)),
          hyperSFN-LSB-r13                    BIT STRING (SIZE (2)),
          schedulingInfoSIB1-r13              INTEGER (0..15),
          systemInfoValueTag-r13              INTEGER (0..31),
          ab-Enabled-r13                      BOOLEAN,
          operationModeInfo-r13               CHOICE {
                 inband-SamePCI-r13                  Inband-SamePCI-NB-r13,
                 inband-Different PCI-r13            Inband-Different  PCI-NB-
r13,
                 guardband-r13                       Guardband-NB-r13,
                 standalone-r13                      Standalone-NB-r13
          },
          spare                               BIT STRING (SIZE (11))
}
ChannelRasterOffset-NB-r13   ::=   ENUMERATED  {khz-7dot5, khz-2dot5, khz2dot5,
khz7dot5}
Guardband-NB-r13 ::=                SEQUENCE {
          rasterOffset-r13                    ChannelRasterOffset-NB-r13,
          spare                               BIT STRING (SIZE (3))
}
Inband-SamePCI-NB-r13 ::=           SEQUENCE {
          eutra-CRS-SequenceInfo-r13          INTEGER (0..31)
}
Inband-Different PCI-NB-r13 ::=   SEQUENCE {
          eutra-NumCRS-Ports-r13              ENUMERATED {same, four},
          rasterOffset-r13                    ChannelRasterOffset-NB-r13,
          spare                               BIT STRING (SIZE (2))
}
Standalone-NB-r13 ::=               SEQUENCE {
          spare                               BIT STRING (SIZE (5))
}
-- ASN1STOP
```

Table 32 shows the description of the Masterinformation-Block-NB field.

TABLE 32

| MasterInformationBlock-NB field descriptions |
| --- |
| ab-Enabled |
| A value TRUE indicates that a UE should obtain SystemInformationBlockType14-NB before an RRC connection configuration or resumption is initiated and access barring is enabled. |
| eutra-CRS-SequenceInfo |
| Information of a carrier including an NPSS/NSSS/NPBCH. Each value is associated with an E-UTRA PRB index as an offset in the middle of an LTE system arranged by a channel raster offset. |
| eutra-NumCRS-Ports |
| The number of E-UTRA CRS antenna ports. A port or 4 antenna ports having the same number of NRSs. |
| hyperSFN-LSB |
| Indicate two least significant bits of a Hyper SFN. The remaining bits are present in SystemInformationBlockType1-NB. |
| operationModeInfo |
| Refer to a deployment scenario (in-band/guard band/standalone) and related information TS 36.211 [21] and TS 36.213 [23]. |
| Inband-SamePCI indicates in-band deployment, and an NB-IoT and LTE cell share the same physical cell ID and have the same number of NRSs and CRS ports. |
| Inband-Different PCI indicates in-band deployment, and an NB-IoT and LTE cell have different physical cell IDs. |

TABLE 32-continued

MasterInformationBlock-NB field descriptions

Guardband indicates guard band deployment.
Standalone indicates standalone deployment.
rasterOffset
an NB-IoT offset from LTE channel raster.
Unit of kHz of a set {−7.5, −2.5, 2.5, 7.5}.
schedulingInfoSIB1
This field includes indices of a table defined in TS 36.213 [23, Table 16.4, 1.3-3] that
defines SystemInformationBlockType1-NB scheduling information.
system FrameNumber-MSB
Defines four most significant bits of an SFN. As indicated in TS 36.211 [21], six least
significant bits of an SFN are implicitly obtained by decoding an NPBCH.
system InfoValueTag
Common for all SIBs other than an MIB-NB, SIB14-NB and SIB16-NB.

SystemInformationBlockType1-NB

A SystemInformationBlockType1-NB message includes related information when evaluating whether a UE is permitted to access a cell, and defines the scheduling of other system information.

Signalling radio bearer: N/A
RLC-SAP: TM
Logical channel: BCCH
Direction: E-UTRAN to UE Table 33 shows an example of the SystemInformationBlockType1 (SIB1)-NB message.

TABLE 33

```
-- ASN1START
SystemInformationBlockType1-NB ::=   SEQUENCE {
        hyperSFN-MSB-r13                BIT STRING (SIZE (8)),
        cellAccessRelatedInfo-r13       SEQUENCE {
                plmn-IdentityList-r13           PLMN-IdentityList-NB-r13,
                trackingAreaCode-r13            TrackingAreaCode,
                cellIdentity-r13                CellIdentity,
                cellBarred-r13                  ENUMERATED {barred, notBarred},
                intraFreqReselection-r13        ENUMERATED {allowed, notAllowed}
        },
        cellSelectionInfo-r13           SEQUENCE {
                q-RxLevMin-r13                  Q-RxLevMin,
                q-QualMin-r13                   Q-QualMin-r9
        },
        p-Max-r13                       P-Max                  OPTIONAL,          -- Need OP
        freqBandIndicator-r13           FreqBandIndicator-NB-r13,
        freqBandInfo-r13                NS-PmaxList-NB-r13     OPTIONAL,          -- Need OR
        multiBandInfoList-r13           MultiBandInfoList-NB-r13  OPTIONAL,       -- Need OR
        downlinkBitmap-r13              DL-Bitmap-NB-r13       OPTIONAL,          -- Need OP,
        eutraControlRegionSize-r13      ENUMERATED {n1, n2, n3} OPTIONAL,         -- Cond
inband
        nrs-CRS-PowerOffset-r13         ENUMERATED {dB-6,     dB-4dot77, dB-3,
                                                    dB-1dot77, dB0,   dB1,
                                                    dB1dot23,  dB2,        dB3,
                                                    dB4,       dB4dot23,   dB5,
                                                    dB6,       dB7,        dB8,
                                                    dB9} OPTIONAL, -- Cond inband-SamePCI
        schedulingInfoList-r13          SchedulingInfoList-NB-r13,
        si-WindowLength-r13             ENUMERATED {ms160,  ms320,  ms480,  ms640,
                                                    ms960, ms1280, ms1600, spare1},
        si-RadioFrameOffset-r13         INTEGER (1..15)        OPTIONAL,          -- Need OP
        systemInfoValueTagList-r13      SystemInfoValueTagList-NB-r13 OPTIONAL,   -- Need OR
        lateNonCriticalExtension        OCTET STRING           OPTIONAL,
        nonCriticalExtension            SEQUENCE { }           OPTIONAL
}
PLMN-IdentityList-NB-r13 ::=            SEQUENCE   (SIZE   (1..maxPLMN-r11))  OF  PLMN-
IdentityInfo-NB-r13
PLMN-IdentityInfo-NB-r13 ::=            SEQUENCE {
        plmn-Identity-r13                   PLMN-Identity,
        cellReservedForOperatorUse-r13      ENUMERATED {reserved, notReserved},
        attachWithoutPDN-Connectivity-r13   ENUMERATED {true}   OPTIONAL   -- Need OP
}
SchedulingInfoList-NB-r13 ::= SEQUENCE {SIZE (1..maxSI-Message-NB-r13)) OF SchedulingInfo-
NB-r13
SchedulingInfo-NB-r13::=                SEQUENCE {
        si-Periodicity-r13                  ENUMERATED {rf64, rf128, rf256, rf512
                                                        rf1024, rf2048, rf4096, spare},
        si-RepetitionPattern-r13            ENUMERATED {every2ndRF, every4thRF,
                                                        every8thRF,  every16thRF},
```

TABLE 33-continued

```
        sib-Mapping Info-r13            SIB-MappingInfo-NB-r13,
        si-TB-r13           ENUMERATED {b56, b120, b208, b256, b328, b440, b552, b680}
}
SystemInfoValueTagList-NB-r13 ::=      SEQUENCE (SIZE (1.. maxSI-Message-NB-r13)) OF
                                          SystemInfoValueTagSI-r13
SIB-MappingInfo-NB-r13 ::=             SEQUENCE (SIZE (0..maxSIB-1)) OF SIB-Type-NB-r13
SIB-Type-NB-r13 ::=                    ENUMERATED {
                                          sibType3-NB-r13, sibType4-NB-r13, sibType5-NB-r13,
                                          sibType14-NB-r13,  sibType16-NB-r13,  spare3,  spare2,
spare1}
-- ASN1STOP
```

Table 34 shows the description of the SystemInformationBlockType1-NB field.

TABLE 34

SystemInformationBlockType1-NB field descriptions attach WithoutPDN-Connectivity
If present, the field indicates that attach is supported without a PDN connection specified
in TS 24.301 [35] with respect to such a PLMN.
cellBarred
Barr means that a cell is barred as defined in TS 36.304 [4].
cellIdentity
Indicate a cell identity.
cellReservedForOperatorUse
The same as that defined in TS 36.304 [4].
cellSelectionInfo
Cell selection information, such as that defined in TS 36.304 [4].
downlinkBitmapNB-IoT downlink subframe configuration for downlink transmission.
If a bitmap is not present, as specified in TS 36.213[23], a UE assumes that all subframes
are valid (other than subframes on which an NPSS/NSSS/NPBCH/SIB1-NB is carried).
eutraControlRegionSize
Indicate the control area size of an E-UTRA cell for an in-band operation mode. A unit is
the number of OFDM symbols.
freqBandIndicator
A list, such as that defined in TS 36.101 [42, Table 6.2.4-1], with respect to the
frequency band of freqBandIndicator
freqBandInfo
A list of additionalPmax and additionalSpectrumEmission, such as that defined in TS
36.101 [42, table 6.2.4-1], with respect to the frequency band of freqBandIndicator.
hyperSFN-MSB
Indicate eight most significant bits of a hyper-SFN. A complete hyper-SFN is
constructed along with the hyper SFN-LSB of an MIB-NB. The hyper-SFN is increased
one by one when the SFN wraps around.
intraFreqReselection
As defined in TS 36.304 [4], treated as being barred by a UE or if the most significant
rank cell is barred, it is used to control cell reselection through intra-frequency cells.
multiBandInfoList
As defined in TS 36.101 [42, Table 5.5-1], additional frequency band indicators, a list of
additionalPmax and additionalSpectrumEmission values. If a UE supports the frequency
band of a freqBandIndicator IE, the frequency band is applied. Otherwise, the first listed
band supported by a UE in a multiBandInfoList IE is applied.
nrs-CRS-PowerOffset
an NRS power offset between an NRS and an E-UTRA CRS. dB unit, a default value
of 0.
plmn-IdentityList
A list of PLMN identities. The first listed PLMN-Identity is a primary PLMN.
p-Max
A value applicable to a cell. If not present, a UE applies maximum power according to
the UE capability.
q-QualMin
A parameter "Qqualmin" of TS 36.304 [4].
q-RxLevMin
A parameter Qrxlevmin of TS 36.304 [4]. An actual value Qrxlevmin = IE value *
2 [dB].
schedulingInfoList
Indicate additional scheduling information of SI messages.
si-Periodicity
Periodicity of an SI-message of a radio frame. For example, rf256 indicates 256 radio
frames, rf512 denotes 512 radio frame, etc.
si-RadioFrameOffset
The offset of a radio frame number for calculating the start of an SI window.
If the field is not present, an offset is not applied.
si-RepetitionPattern TABLE 34-continued SystemInformationBlockType1-NB field descriptions Indicate start radio frames within an SI window used for SI message transmission. A value very2ndRF corresponds to all second radio frames starting from the first radio frame of an SI window used for SI transmission, and a value every4thRF corresponds to a fourth radio frame, etc.
si-TB
This field indicates an SI transport block size as the number of bits used to broadcast a message.
si-WindowLength
A common SI scheduling window for all SIs. In this case, ms160 indicates 160 milliseconds, and ms320 indicates 320 millisecond, etc.
sib-Mapping Info
A list of SIBs mapped to such a SystemInformation message. Mapping information of an SIB2 is not present; this is always present in the first SystemInformation message listed in the schedulingInfoList list.
systemInfoValueTagList
Indicate SI message-specific value tags. As in SchedulingInfoList, this includes the entries of the same number and is listed as the same side sequence.
systemInfoValueTagSI
An SI message-specific value tag, such as that specified in 5.2.1.3. Common to all SIBs within an SI message other than SIB14.
trackingAreaCode
trackingAreaCode common to all PLMNs is listed.

TABLE 35

| Conditional presence | Description |
| --- | --- |
| inband | When an IE operationModeInfo of an MIB-NB is configured as inband-SamePCI or inband-Different PCI, the field is mandatory. Otherwise, the field is not present. |
| inband-SamePCI | When an IE operationModeInfo of an MIB-NB is configured as inband-SamePCI, the field is mandatory. Otherwise, the field is not present. |

Before describing a method for transmitting and receiving early data transmission proposed in this specification, abbreviations of terms to be described later will be summarized.
Abbreviation
EDT: early data transmission or early uplink data transmission (EUT)
RAR: random access response
RAPID: random access preamble ID
C-RNTI: cell-radio network temporary identifier
TC-RNTI: temporary C-RNTI
CE: coverage enhancement
BSR: buffer state report
TBS: transport block size
CBRA: Contention-based Random Access
CFRA: Contention-free Random Access
The expression of '/' disclosed in this specification may be construed as 'and/or' and the expression of 'A and/or B' may be construed as the same meaning as 'including at least one of A or (and/or) B'.
Hereinafter, a method for transmitting uplink data in a random access procedure without transiting an RRC state to RRC_CONNECTED in a UE in an RRC_IDLE mode proposed in this specification will be described.
The method proposed in this specification is based on the NB-IoT system for convenience of description, but may also be applied to other communication systems featuring low power/low cost such as MTC, enhanced MTC (eMTC), etc.
In this case, channels, parameters, and the like described in this specification may be defined or expressed differently according to the characteristics of each system.
In addition, an overall description or procedure for NB-IoT described above may be applied to embody the method proposed in this specification.

In a general wireless communication system, before the data transmission/reception, the RRC state of the UE needs to be transited to RRC_CONNECTED.
Such a procedure is performed through the random access procedure.
The random access procedure may be performed (1) in the process in which the UE enters the cell or (2) by a request by the base station when the base station needs to transmit downlink data to a specific UE. The process of (1) may be sued for the RRC_IDLE UE to change the RRC state to RRC_CONNECTED. In addition, the base station may directly indicate the process of (2) to the RRC_CONNECTED UE through PDCCH.
The "early UL data transmission (hereinafter, referred to as 'EDT')" proposed in this specification is a method for transmitting uplink data in a state in which the UE does not enter the RRC_CONNECTED mode in the process of (1), that is, during the random access procedure.
The EDT method may have a great advantage in reducing the power consumption of the UE transmitting the uplink data intermittently.
However, since uplink scheduling is required in a state in which the base station may not accurately predict the channel state of the UE, the power consumption of the UE may be still further increased under a specific condition.
Therefore, this specification proposes a method for efficient EDT in consideration of such a disadvantage.
First, the random access procedure in the NB-IoT system may be briefly summarized as follows.
First, the random access procedure starts with transmission (from the UE) of NPRACH called Msg.1.
In addition, when the base station detects the Msg.1, the base station transmits Msg.2 corresponding to the Msg.1 to the downlink.
Here, Msg.2 is constituted by NPDCCH and NPDSCH and NPDCCH is scrambled and transmitted to RA_RNTI.
Here, the RA_RNTI is constituted by uplink (time/frequency) resources transmitting the Msg.1, and all UEs transmitting the Msg.1 to the same uplink resource may detect the corresponding NPDCCH.
The NPDCCH is DL_grant for scheduling the NPDSCH and is transmitted to common search space type-2 in a form of DCI format N1.

The NPDSCH is transmitted with UL_grant configured by a MAC message.

Here, the UL_grant is generally called RAR. The UL_grant that is delivered to a MAC layer classifies one or more specific sequences (starting frequency index in the case of the NB-IoT) detected by the base station among Msg.1 that may be included in the uplink resource indicated by the RA_RNTI into RAPIDs and transmits the UL_grant to the UE.

Here, the UL_grant transmitted to the MAC layer is generally different from the UL_grant (DCI format N0) included in the NPDCCH and is characteristically used only for Msg.3 scheduling.

In general, the random access procedure is divided into contention-free and contention-based.

The random access procedure which the UE uses for entering the cell initially is divided into a content-based random access.

That is, the UE that transmits Msg.3 may be multiple UEs that transmit the Msg.1 by using the same RAPID.

For distinguishing (contention resolution) thereof in the process of Msg.4, each UE transmits a contention resolution ID (unique ID of each UE) included in the Msg.3.

Further, the Msg.3 is scrambled with TC-RNTI and transmitted.

The TC-RNTI is delivered from the base station through the Msg.2.

The base station confirms the contention resolution ID of the received Msg. 3 and transmits the Msg. 4 to the corresponding UEs.

The Msg.4 is delivered with the contention resolution ID received from the Msg.3.

The UE detects the Msg.4 using the TC-RNTI and uses the TC-RNTI as the C-RNTI when the detected message includes the contention resolution ID included in the Msg.3.

After the completion of the process, the UE becomes contention resolution and the RRC state transited to the RRC_CONNECTED state naturally.

Here, the NB-IoT may select a CE level based on the RSRP which each UE receives through downlink NRS or the NSSS.

Prior to transmitting the NPRACH to the selected CE level, the UE may inform the base station of whether the UE is a UE that may perform multi-tone uplink transmission using the NPRACH starting carrier index.

That is, the UE may inform the base station of the CE level thereof and a multi-tone capability through transmission of the Msg.1.

In this case, the base station may perform appropriate Msg. 3 scheduling based thereon.

When an NPRACH starting carrier area for informing the multi-tone capability to the CE level resource is not separately allocated from the base station (SIB2-NB or SIB22-NB), the UE selects an NPRACH starting carrier in a single-tone capability area.

In addition, even if there is the NPRACH starting carrier area for informing the multi-tone capability to a resource of the corresponding CE level, if the Msg.2 is not received for a predetermined time after the Msg.1 transmission, the CE level increases by 1.

When an NPRACH starting carrier area for informing the multi-tone capability is not separately allocated to a newly selected CE level, the UE selects the NPRACH starting carrier in the single-tone capability area.

Procedure for EDT Request and (N)PRACH Resource Discrimination Method

The EDT proposed in this specification is based on a method in which the UE in the RRC_IDLE state transmits the uplink data to the Msg.3 during the random access procedure.

First, the reason why the UE performs the random access (not based on a PDCCH order) is that data needs to be sent to the uplink or simply to enter the cell.

In particular, even if there is data to be transmitted to the uplink in a transmission buffer of the UE, the UE may request the uplink data transmission more stably in the RRC_CONNECTED state instead of the EDT as required.

For this reason, the base station needs to determine whether a purpose of an attempt of the random access by the UE is the EDT.

In addition, when the UE transmits the Msg.1 for the EDT, the base station needs to know information corresponding to the BSR of the UE in scheduling the Msg.3 of the UE.

That is, when the base station may know how much information is in an uplink buffer of the UE, the corresponding TBS may be reflected to the Msg.3 scheduling.

In addition, since the multi-tone uplink transmission is a capability of the UE, the NB-IoT UE needs to know whether the UE may perform only the single-tone transmission or even the multi-tone transmission in the Msg.3 scheduling.

Of course, the base station may schedule only the single-tone transmission to the Msg.3 regardless of the multi-tone transmission capability of the UE.

It may be necessary to distinguish the resources of the Msg.1 for various usages or the purpose of the attempt of the random access of the UE, and in order to distinguish required data size and capability.

When the aforementioned are summarized, contents which may need to be distinguished by the Msg.1 resource may be summarized as follows.

1. Whether to transmit the Msg.1 for the EDT
2. Uplink buffer status (represents an amount of data to be transmitted to the uplink by the UE, which may be different from a value expected to be scheduled at one time in the Msg.3, and may represent a type of data stored in the uplink buffer. Here, the data type may be distinguished into control-data or user-data.
3. Multi-tone capability For the purpose of distinguishing the above contents, the resources of the Msg.1 may be distinguished by the following method.

Figure 8:
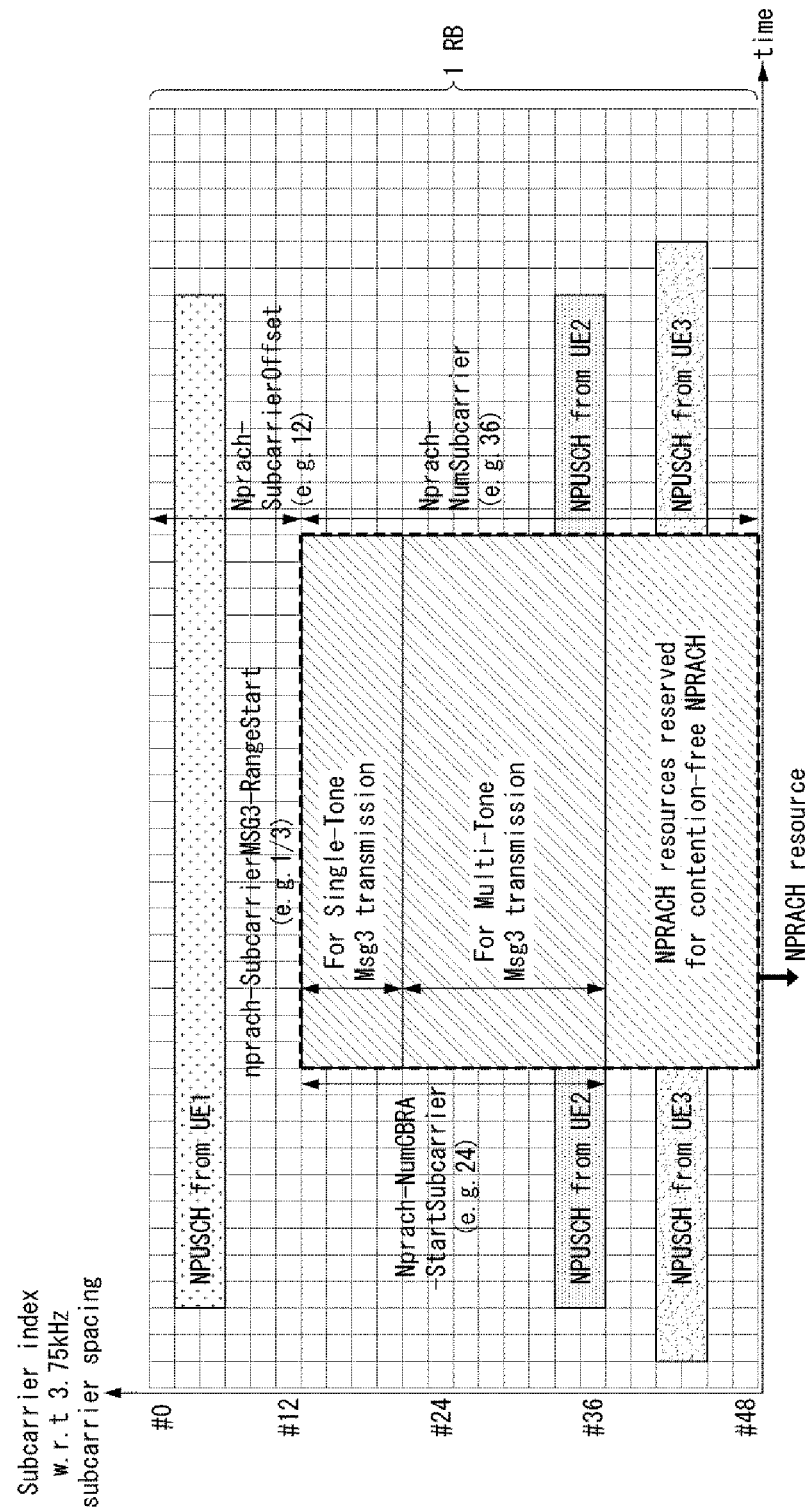
FIG. 8 illustrates an example of an NPRACH resource configuration.

FIG. 8 illustrates an example of an NPRACH resource configuration.

One NPRACH resource may be configured for each CE level.

In addition, since release 14, the UE may have a capability to transmit the NPRACH to non-anchor carriers other than anchor-carriers.

In such a case, the NPRACH of the non-anchor carrier may be configured in SIB22-NB by in the following method.

Further, in FIG. 8, the NPRACH starting carrier index area for multi-tone Msg. 3 transmission may not exist according to a configuration of the base station.

This is independent for each CE level. In addition, up to the release 14, areas other than the single-tone Msg.3 transmission area and the multi-tone Msg.3 transmission area are not actually used in the NPRACH resource illustrated in FIG. 8 below.

This may be used for contention-free of the Msg.1 transmission based on an NPDCCH order or may be used by the UE after Rel.14 for other usages.

The NPRACH resource area left for the contention-free among the NPRACH resources may be used for distinguishing the above three purposes.

In the simplest method, some of the NPRACH resources except for the NPRACH starting carrier index area to announce the single-tone and multi-tone Msg.3 transmissions may be re-classified by higher signaling.

That is, the base station may restrict the Msg. 1 starting carrier index for the EDT usage to a part of the contention-free NPRACH area of FIG. 8 by utilizing SIBx-NB or the like.

In this case, when it is desired to distinguish the buffer status or the multi-tone capability of the UE requesting the EDT, the corresponding area may be further distinguished and used.

When the contention-free area is insufficient to distinguish all of the purposes, the base station may allocate a part of the corresponding area in order to just distinguish only the EDT.

However, when the NPRACH area for the EDT request is configured to be distinguished from the existing NPRACH area (i.e., which may not be understood by the legacy NB-IoT UE), collision with the NPUSCH transmission of the existing UE may not be avoided.

As another method for distinguishing the NPRACH resource for the EDT, there may be a method for transmitting the NPRACH defined differently from the existing NPRACH sequence to the existing NPRACH resource.

That is, the corresponding method is a method in which the UE selects the NPRACH (time/frequency) resource in the same method according to the CE level and multi-tone capability of the UE in the existing NPRACH resource and changes only the NPRACH sequence transmitted in the corresponding area and transmits the changed NPRACH sequence.

Here, the method for changing the NPRACH sequence may adopt a method for changing frequency hopping of the NPRACH, shifting and transmitting the NPRACH by a specific frequency (for example, 0.75 kHz), applying a new scrambling between symbols in an NPRACH symbol group, or applying the new scrambling between the NPRACH symbol groups.

In such a case, the multi-tone capability of the UE may be naturally reported in the existing NPRACH resource selection process and the EDT request and the corresponding buffer status may be distinguished by a sequence configuration.

In addition to the methods described above, as a method for distinguishing (1) Msg.1 for the EDT and/or (2) uplink buffer status (amount of data to be transmitted to the uplink by the UE, which may be different from a value expected to be scheduled at one time in the Msg.3) and/or (3) the multi-tone capability, there is a method for utilizing the NPRACH resource of the non-anchor carrier.

In FIG. 8, the NPRACH starting carrier index for single tone/multi-tone Msg.3 transmission in the NPRACH resource and the NPRACH starting carrier index for the contention-free usage may be independently configured for each non-anchor carrier NPRACH resource.

Therefore, the contention-free area of a specific non-anchor carrier may be used for distinguishing (1), and the contention-free area of another specific non-anchor carrier may be used for distinguishing information of (2), and the contention-free area of yet another specific non-anchor carrier may be used for distinguishing (3).

Here, the contention-free area of the non-anchor carrier may be used independently for distinguishing (1), (2), and (3) above, but may be configured to be partially overlapped by a specific relationship and the NPRACH resource of the anchor-carrier may also be used together as well as the NPRACH resource of the anchor-carrier.

A resource (e.g., (N)PRACH resource) capable of transmitting the Msg.1 may be configured not only to identify that a transmission purpose of the Msg.1 is the EDT, but also to express a type (e.g., C-plane or U-plane) and size information of data desired to be transmitted in the Msg.3.

1) Method for Informing Data Size or Type of UL Buffer by Distinguishing NPRACH Resource by Time As described above, the NPRACH resource may be divided into a CBRA area and a CFRA area.

This is repeated for a specific period. That is, after acquiring information on the NPRACH resource, the UE in the idle state may transmit the Msg.1 by selecting an arbitrary RAPID in the CBRA area.

Of course, the use of some RAPIDs may be restricted for indirect reporting of the single-tone or multi-tone capability of the Msg.3.

That is, when a specific CE level is selected, the Msg.1 may be transmitted at an arbitrary time in the NPRACH resource of the corresponding CE level, which repeatedly appears on a time axis.

In this case, a part of the CFRA area may be reserved for the EDT request.

Furthermore, the CFRA NPRACH resources which are repeated at a predetermined period may be further divided for the purpose of distinguishing the UL buffer size and data.

For example, transmitting the EDT request in the CRFA area of the NPRACH resource at time t1 for the NPRACH resource of the same CE level and transmitting the EDT request in the CFRA area of the NPRACH resource at time t2 of the same CE level may be configured for the purpose of distinguishing and informing the size or type of the UL buffer.

In this case, when all conditions are the same regardless of the times t1 and t2, it is possible to arbitrarily select a transmission time of the Msg.1 for the EDT request in order to lower a collision probability of the UE.

2) Method for Informing Data Size or Type of UL Buffer by Distinguishing NPRACH Resource by (Non-Anchor) Carrier Method 2) is similar to method 1) above, but is different from method 1) above in that the data size or type of the UL buffer is informed by distinguishing the NPRACH resource by the non-anchor index including the NPRACH on a frequency axis other than the time axis.

That is, the data size or type of the UL buffer may be independently configured as a condition for requesting the EDT by the Msg.1 for each carrier.

In this case, for example, when the UE makes the EDT request by the Msg.1, the UE may desire to inform the base station that the UL buffer size is 100 bytes.

In this case, the number of carriers capable of transmitting the Msg.1 at the corresponding time may be one or more.

When the number of NPRACH carriers designated to schedule 100 bytes or more in the Msg.3 among the carriers may be two or more, the UE may select a carrier which may least perform padding in the Msg.3 among the NPRACH carriers.

When it is difficult to predict the selection or two or more carriers are under the same condition, the UE may arbitrarily select the carrier with respect to the corresponding carrier and transmit the Msg.1 for the EDT request.

If the Msg.3 EDT TBSs of all carriers are smaller than 100 bytes at the corresponding start, the UE may start a legacy RA procedure or select a carrier that satisfies the corresponding condition at an earliest time.

Method for Contiguously Permitting EDT

Next, a method for contiguously permitting the EDT transmission will be described.

As described above, the UE may perform the EDT through the Msg.3 during the random access procedure in the RRC_IDLE state.

However, (1) the base station may not schedule the Msg.3 without knowing the uplink buffer size of the UE or (2) the base station knows the uplink buffer size, but may not perform scheduling through the Msg.3 at one time.

In case of (1), the uplink buffer size may be reported together with the uplink buffer data of the UE when the Msg.3 is transmitted.

In addition, the multi-tone capability of the UE may be included and reported as needed.

Here, the TBS of the Msg.3 scheduled through the Msg.2 may be a value including both uplink data and uplink buffer size report and multi-tone capability report.

Alternatively, even if the TBS of the Msg.3 indicates only the size of the uplink data, the base station and the UE may transmit the "uplink buffer size report" and/or the "multi-tone capability report" to the Msg.3 together by a specific method through mutual promise (may be specified in 3GPP TS spec. or may be configured with higher layer signaling).

Here, in the method for delivering both the "uplink buffer size report" and/or the "multi-tone capability report" to the Msg.3, all information may be configured to be included in the NPUSCH or all information may be delivered through the DMRS of the NPUSCH.

Here, in the method for delivering the information through the DMRS of the NPUSCH, the base station may configure one or more DMRSs and the UE may select and transmit a specific DMRS according to contents of the "uplink buffer size report" and/or the "multi-tone capability report".

Further, when the information is directly delivered to the NPUSCH, the uplink data and the "uplink buffer size report" and/or the "multi-tone capability report" may be delivered while being channel-coded at one time.

Similarly to a method in which the UCI is transported to the PUSCH in the existing LTE, the uplink data and the "uplink buffer size report" and/or the "multi-tone capability report" may be separately in separate coding and/or separate resource (RE level).

Here, when the "uplink buffer size" is delivered during the Msg.3 process, the "uplink buffer size" may be a value acquired by excluding the TBS transmitted in the Msg.3.

When the base station continuously requests early uplink data of the UE after the Msg.3 process, the data may be distinguished through the Msg.4.

That is, the UE may transmit all uplink buffers of the UE in single EDT of the Msg.3, but there may be additional data to be transmitted in the uplink buffer after the Msg.3 transmission.

In addition, even if the Msg.3 is allocated from a transmission request of the early uplink data transmission by the UE, the base station may require downlink data transmission in the corresponding UE.

This may be simply applied to a case where the base station determines whether there is data to be transmitted to the corresponding UE when the contention resolution ID of the Msg.3 is directly mapped to a unique ID of the UE.

Here, an EDT operation of the Msg.3 of the UE may be changed depending on whether the data stored in the uplink buffer of the UE is control information or user data.

For example, when the data stored in the uplink buffer is the control information (C-plane) and the TBS of the Msg.3 transmitted through the Msg.2 is smaller than the control information, the UE may not perform the early uplink data transmission.

That is, the UE may directly inform the base station through the Msg.3 that the data of the uplink buffer is the control information and the control information may not be transmitted to the Msg.3 by dividing the TBS.

When the data of the uplink buffer is the user data (U-plane) and the TBS of the Msg.3 is smaller than the uplink buffer, the base station may contiguously schedule next uplink to the Msg.4.

In such a case, when the base station knows the buffer status and the multi-tone capability of the UE through the Msg.3, the base station may transmit the UL_grant by considering the buffer status and the multi-tone capability in a subsequent scheduling process.

When the base station instructs single-tone transmission at subcarrier spacing 3.75 kHz for Msg.3 scheduling, uplink scheduling needs to be instructed based on multi-tone in a subsequent process as needed.

However, according to the current 3GPP TS standard, the subcarrier spacing of the UE may be determined by the RAR of the Msg.2 and may not be changed in the random access procedure or the subsequent procedure.

Therefore, during the early uplink data transmission process, the subcarrier spacing may need to be reconfigured differently than indicated in the RAR, or in the RAR for the early uplink data transmission, uplink subcarrier spacing needs to be contiguously set to 15 kHz.

When the base station does not need to make an RRC state transition to the RRC_CONNECTED after the early uplink data transmission, the BASE STATION needs to transmit the UL_grant at the Msg.4 time and indirectly inform that transmission of the Msg.3 is ACK and the RRC state is not transited.

However, when the base station continues to perform uplink scheduling with the UL_grant at the time of transmitting the Msg.4 or after the Msg.4 and the needs to transit the RRC state of the corresponding UE to RRC_CONNECTED, the base station may trigger the RRC_CONNECTED procedure to the UE with DL_grant. The UE and the base station know the uplink buffer size after first Msg.3 transmission/reception.

Therefore, at a specific time when the sum of the TBSs (contiguously) allocated with the UL_grant exhausts the uplink buffer, the base station may still request new data transmission with UL_grant without triggering the RRC_CONNECTED procedure with the DL_grant.

In this case, the NPUSCH that is just transmitted (last uplink transmission in which the uplink is exhausted) is received by the base station as the ACK and this completes the EDT.

Then, it can be seen that the UE no longer needs to monitor the NPDCCH.

A case where the subcarrier spacing may be changed described above may be a step of the Msg.4 first received after the Msg.3.

That is, the base station may receive the multi-tone capability of the UE through the Msg.3 and may then change the uplink subcarrier spacing in a procedure trigger process for contiguous UL_grant allocation or RRC_CONNECTED transition.

Some of the contents described above may be expressed by a simple example in the following order.

1. The UE requests the EDT through the Msg.1 when the EDT condition is satisfied.

2. The base station determines whether the corresponding EDT request is made through the NPRACH resource (NPRACH starting carrier (tone) index and/or non-anchor carrier index and/or RAPID used for NPRACH transmission) of the Msg.1 and transmits the Msg.2 to the UE by the corresponding RA-RNTI.

A. When the base station desires to schedule the Msg.3 of a general random access procedure rather than the Msg.3 transmission for the EDT with respect to the EDT request, the base station informs the UE of rejecting the EDT request with a value of '0' in a reserved bit of an MAC payload (RAR) of the corresponding RAPID.

The UE recognizes that the EDT request is rejected from the value '0' of the corresponding reserved bit and interprets the MAC RAR like the general random access procedure.

B. When the base station accepts the EDT request and schedules the Msg.3 for the EDT request, the base station informs acceptance of the EDT request with a value of '1' in the reserved bit of the MAC RAR of the corresponding RAPID.

The UE may recognize that the EDT request is accepted from the value '1' of the reserved bit and interpret the MAC RAR differently from the existing MAC RAR.

3. The base station may contiguously support the EDT by referring to the uplink buffer status of the UE and/or the multi-tone scheduling capability of the UE additionally delivered through the corresponding NPUSCH after decoding of the received Msg.3 is successful.

A. For example, when the uplink buffer reported by the UE is still not 0 after the Msg.3 NPUSCH transmission, the base station may transmit the UL grant for the subsequent NPUSCH scheduling on the NPDCCH.

In this case, the base station may newly set a value different from the NPUSCH subcarrier spacing used for scheduling in the Msg.3.

This may be supported a method other than the UL grant.

For example, the base station may transmit the DL grant to the UE on the NPDCCH and the corresponding NPDSCH may include the UL grant for NPUSCH scheduling in a similar method to the MAC RAR.

This may allow the NPUSCH subcarrier spacing to be newly configured.

B. When the uplink buffer data of the UE is the control information (C-plane) and is bigger than the TBS scheduled by the Msg.3 and may not be transmitted to the Msg.3 by the EDT, the UE may additionally inform such a state by the Msg.3.

The base station may newly transmit the MAC RAR for the Msg.3 transmission with reference to the informing.

Even in such a case, this may be supported a method other than the UL grant.

For example, the base station may transmit the DL grant on the NPDCCH and the corresponding NPDSCH may include the UL grant for NPUSCH scheduling in the similar method to the MAC RAR.

This may allow the NPUSCH scheduling for emptying a C-plane buffer of the UE to be performed.

C. When the base station desires to transit the corresponding UE to RRC_CONNECTED after receiving the Msg.3, the base station may transmit the DL grant to the Msg.4 and trigger a procedure for state transition to the RRC_CONNECTED in the corresponding NPDSCH.

4. The UE compares the uplink buffer size reported by the UE in the Msg.3 with the sum of the TBSs transmitted on the NPUSCH in the meantime and when the UE receives the UL grant on the NPDCCH after first NPUSCH transmission when entire uplink buffer size is exhausted, the UE may know that the corresponding NPUSCH transmission is normally received by the base station and stop NPDCCH monitoring.

When the base station desires to transit the UE to the RRC_CONNECTED state at the corresponding time or there is data to be transmitted to the downlink, the base station may transmit the DL grant on the NPDCCH.

When the UE receives the DL grant on the NPDCCH at the corresponding time, a next operation may be different depending on the contents of the corresponding NPDSCH.

A. At the time (e.g., when all data stored in the uplink buffer of the UE is transmitted in the Msg.3 transmission or after first NPUSCH transmission when the entire uplink buffer size is exhausted) when the entire uplink buffer size of the UE is exhausted, the base station may normally receive the corresponding message (ACK) and when the UE has no plan to transit the UE to the RRC_CONNECTED state, the base station schedules the NPDSCH by transmitting the DL grant on the NPDCCH in a step of the Msg.4 (or NPDCCH at a specific time).

The corresponding NPDSCH includes information for the contention resolution, etc.

However, information required for transiting the RRC state of the UE to the RRC_CONNECTED state may be omitted or may be transmitted including another high-layer message instead.

In this case, the UE may recognize that the EDT of the UE is well completed and may not separately report the ACK for the corresponding NPDSCH to the uplink.

In this case, the UE may also stop the NPDCCH monitoring.

Method for Supporting Various Uplink Grants for EDT in RAR

In the UL_grant of the currently defined RAR, only fixed TBS (88 bits in case of NB-IoT) may be allocated.

N_resource unit (RU) may be set to only one of 1, 3, and 4.

For the early uplink data transmission, more various TBSs and N_RUs need to be supported.

As a method therefor, there may be a method for (1) using unused or undefined states in the UL_grant of the existing RAR or (2) newly defining the UL_grant of the RAR that may be expected by the UEs requesting the EDT by the Msg.1.

Here, a simplest method as the method of (2) may include a method of using the same UL_grant as DCI format N0 transmitted to the NPDCCH.

Here, in the method of (2), a UL_grant size and/or format of the RAR expected by the UE is changed after the Msg.1 transmission and are not particularly the same as the existing DCI format N0 and the method of (2) may correspond to an arbitrary case in which the size and/or format is not the same as the UL_grant included in the existing RAR.

Utilizing UL-Grant of Existing RAR

First, a method of utilizing the unused or undefined states in the UL_grant of the existing RAR is described.

First, there may be a method for indicating the TBS and the N_RU as follows by jointly interpreting a modulation and coding scheme (MCS) and a reserved state of I_sc as a "method of utilizing the unused or undefined states in the UL_grant of the existing RAR".

In such a method, the same size and format as the UL_grant of the existing RAR are utilized.

That is, a method of utilizing the reserved value in Table 38 will be described in more detail below.

It is assumed that the Msg.1 to be described below is explicitly transmitted to the NPRACH resource for the EDT.

That is, the above case corresponds to a case in which the base station and the UE accurately understand that the transmission of the Msg.1 is intended for the EDT together.

Method 1. When the Msg.1 is transmitted to the multi-tone NPRACH resource and SCS of the RAR is 3.75 kHz and I_MCS>2, the TBS and the N_RU, n_SC, # n_SC (the number of NPUSCH tones), and the subcarrier spacing (SCS) of the Msg.3 are interpreted by a specific method Method 2. When the Msg.1 is transmitted to the multi-tone NPRACH resource and SCS of the RAR is 3.75 kHz and I_SC>11, the TBS and the N_RU, n_SC, # n_SC, and the SCS of the Msg.3 are interpreted by a specific method Method 3. A method of using 7>I_MCS>2 for interpreting the TBS and the N_RU, # n_SC, and the SCS of the Msg.3 when the Msg.1 is transmitted to the multi-tone NPRACH resource and SCS of the RAR is 15 kHz and 19>I_SC>11.

Method 4. A method of using 7>I_MCS>0 for interpreting the TBS and the N_RU, n_SC, # n_SC, and the SCS of the Msg.3 when the Msg.1 is transmitted to the multi-tone NPRACH resource and SCS of the RAR is 15 kHz and 64>I_SC>18.

Method 5. When the Msg.1 is transmitted to the single-tone NPRACH resource and SCS of the RAR IS 3.75 kHz and I_MCS>2, the TBS and the N_RU, n_SC, and the SCS of the Msg.3 are interpreted Method 6. When the Msg.1 is transmitted to the single-tone NPRACH resource and SCS of the RAR IS 3.75 kHz and I_SC>11, the TBS and the N_RU, n_SC, # n_SC, and the SCS of the Msg.3 are interpreted (# n_SC is fixed to 1)

Method 7. When the Msg.1 is transmitted to the single-tone NPRACH resource and SCS of the RAR is 15 kHz and I_MCS>2, the TBS and the N_RU, n_SC, # n_SC, and the SCS of the Msg.3 are interpreted (# n_SC is fixed to 1)

Method 8. When the Msg.1 is transmitted to the single-tone NPRACH resource and SCS of the RAR is 15 kHz and I_SC>11, the TBS and the N_RU, n_SC, # n_SC, and the SCS of the Msg.3 are interpreted (# n_SC is fixed to 1)

Method 9. When the conditions are not met, it is assumed that the EDT is rejected by the base station or the base station does not accept the corresponding request and the UE and the base station similarly perform the existing random access procedure.

In the case of methods 1 to 8 above, reinterpretation of the TBS and the N_RU, n_SC, # n_SC, and the SCS of the Msg3 may be defined in various methods, but may not include all cases of the existing NPDCCH format N0.

In particular, the TBS that may be reinterpreted or allocated to the reserved value in Table 38 may be configured to a value that is continuously (equal to or) larger than 88 bits.

A maximum value is characterized to not exceed 1000 bits (maximum allocated TBS of 1 UL HARQ).

Further, when the UL grant of the MAC RAR indicates the same value as the existing TBS (for example 88 bits in Nb-IoT), the UE may indirectly know that the Early Uplink Data Transmission (EDT) request of the UE is rejected by the base station and thereafter, the random access procedure may be performed in the same procedure in the related art.

FIG. 22 illustrates a table showing an MCS index for Msg3 NPUSCH.

Second, a method for rejecting or accepting the EDT request or allocating a larger TBS by using MCS index MSB 1 bit in the UL_grant of the existing RAR is described.

This method is similar to the first method above, but this method is a method that may implement a similar purpose to the first method more simply by using an unused bit in the UL grant of the MAC RAR.

In Table 38, when the MSB 1 bit of the MCS index is '1', the MSB 1 bit is allocated to all reserved states.

Accordingly, the MCS index MSB 1 bit may be used by the base station to accept or reject the EDT request of the UE.

For example, when the base station may distinguish the EDT request of the UE by the RAPID of the Msg.1 or other method, the base station may implicitly accept or reject the EDT request using the corresponding bit.

When the UE does not request the EDT or does not support an EDT feature, the value of the corresponding bit (MCS 1 bit in the MCS index) may be ignored.

When the UE requests the EDT and the MCS index MSB 1 bit is indicated as '1' in the UL grant of the corresponding RAPID, the UE may assume that the EDT request of the UE is accepted by the base station.

In addition, the UE may interpret the UL grant except the MCS index MSB 1 bit differently from the related art.

Parameters that may be interpreted differently from the related art may include uplink subcarrier spacing and/or subcarrier indication and/or scheduling delay and/or repetition number and/or NRU (IRU).

Thus, when interpreted as the UL grant for the EDT, the TBS as a value(s) which is (equal to) or larger than 88 bits and equal to or smaller than the maximum TBS which a UL HARQ process may have may be a value determined in the 3GPP TS standard or configured by the base station.

In addition, the interpretation of the UL grant for the EDT may vary for each CE level and in the simplest interpretation, the TBS may be different for each CE level.

Method for Newly Defining UL Grant of RAR

Next, a method for newly defining the UL grant of the RAR that may be expected by the UEs requesting the EDT through the Msg.1 will be described.

FIGS. 9 to 12 illustrate an MAC PDU related to RAR included in the Msg.2 in the related art.

All UEs that transmit the Msg.1 to a specific NPRACH resource detect the NPDCCH by using the same RA-RNTI.

The NPDSCH scheduled to the corresponding NPDCCH includes the MAC PDU related to the RAR.

The corresponding MAC PDU includes UL grants for different RAPIDs (configured by the starting carrier index of the Msg.1).

The UE first checks whether there is an UL grant corresponding to the RAPID used by the UE in the MAC PDU.

When the corresponding RAPID is found, the UE interprets MAC RAR corresponding to the RAPID as illustrated in FIG. 12 and transmits the Msg. 3 to the base station.

Here, when the EDT request is distinguished into the RAPID from the NPRACH resource to which the Msg.1 is transmitted, the UE may know how many RAPIDs corresponding to the EDT request are included in the MAC PDU as well as the RAPID used by the UE.

When the base station configures the size of the MAC RAR of a response to the EDT differently from the existing MAC RAR and configures the MAC E/T/RAPID in order from the MAC RAR instead of the EDT RAPID and then, arranges MAC E/T/RAPID in order, the legacy UE and the Rel.15 UE may interpret the MAC PDU without misunderstanding.

Here, the release 15 UE means a UE that may interpret a new MAC PDU definition for the EDT.

For example, in FIG. 13, k MAC RARs are the same as the existing MAC RARs, and k corresponding MAC RARs may be received by the UE that transmits the Msg.1 with RAPIDs that are not used for the EDT.

Here, k MAC RARs may be configured/interpreted without misunderstanding each MAC RAR order calculation from the order of the existing E/T/RAPID subheaders.

On the other hand, the UE that transmits the Msg. 1 among RAPID candidates for the purpose of the EDT may sequentially find k which is the number of MAC RARs not included in the RAPID for the purpose of the EDT from each E/T/RAPID subheader and then, find the RAPID thereof among n-k MAC RARs included in the RAPID for the purpose of the EDT.

From this, the UE may interpret a harmful MAC RAR having a size different from that of the existing MAC RAR.

However, the UE needs to consider a fact that even if the UE transmits the RAPID for the purpose of the EDT, the base station may not continuously schedule the UL grant for the EDT purpose for transmission of the RAPID.

In this case, a first bit (R1 in FIG. 14) of the MAC RAR may be used to discriminate whether the corresponding MAC RAR indicates the UL grant for the EDT purpose.

That is, the reserved bits (R1 and/or R2) in FIG. 14 may be used in other methods only when the RAPID is included in the Early Uplink Data Transmission EDT) purpose.

Here, instead of R1, MSB 1 bit of the MCS index included in the UL grant of the MAC RAR may be used.

In addition, the base station may transmit a new MAC RAR for the RAPID for EDT purpose by adding the UT/RAPID MAC subheader by directly adding 1-byte information to the MAC subheader.

Here, the 1-byte information added to the MAC subheader may be configured to further include a specific RAPID once more (for example, a method in which a MAC subheader for a specific RAPID is continuously and/or discontinuously included in the MAC header).

In such a case, the corresponding MAC RAR may be a MAC RAR having a size twice as large as that of the existing MAC RAR and the corresponding MAC RAR may be interpreted in a different method from the existing MAC RAR.

Such a method may have an advantage that the UL grant included in the RAR of the Msg.2 may be used in the same manner as the existing NPDCCH format N0, while may have a disadvantage that it may be inefficient in terms of resource utilization.

There is a method of using R1 and R2 illustrated in FIG. 14 as a method for configuring the UL grant for the RAPID for the purpose of the EDT more efficiently than the above method.

The UL grant included in the MAC RAR may be configured by 15 bits and there are many restrictions on the NPUSCH scheduling for the Msg. 3.

This may be known by comparison with the existing NPDCCH format N0 of Table 39, which is configured by 23 bits (in the case of 1 UL HARQ capable UE).

In order to use the MAC RAR having no restriction on the NPUSCH scheduling, a method for positively utilizing R2 in FIG. 14 is needed.

For example, Table 40 removes some unnecessary fields from the existing NPDCCH format N0, which may be unnecessary information for Msg.3 scheduling of the random access procedure.

That is, "flag for difference of format N0/format N1", "Redundancy version", and "New data indicator" are predefined as "0", "specific value (e.g., 0)", and "specific value (e.g., 0 by default)", respectively Can be predefined to a specific value (e.g., 0 by default) in the Msg.3 scheduling process.

In this case, the maximum number of bits required for the UL grant of the Msg.3 is 20 bits, which corresponds to the number of bits combined with the existing UL grant and R2 illustrated in FIG.

When the EDT does not support a TBS smaller than 88 bits or does not support a value larger than a specific TBS, the required number of UL grants may be further reduced.

In addition, when the EDT does not continuously assume a specific subcarrier spacing, 1 bit for indicating the subcarrier spacing may be additionally used.

Alternatively, an NPUSCH subcarrier spacing may be indicated indirectly through a subcarrier indication field (ISC).

For example, when I_SC is 0-11, I_SC means single-tone Msg.3 NPUSCH scheduling.

In this case, Msg.3 NPUSCH subcarrier spacing may be implicitly indicated at 3.75 kHz.

As described above, when the UE transmits the Msg.1 for requesting the EDT, the base station may request the Msg.3 scheduling according to the existing random access procedure instead of the Msg.3 scheduling for the EDT for various reasons.

In this case, R1 of FIG. 14 may be used in order to distinguish the scheduling.

The corresponding information may be delivered using not only R1 but also some bits of R2 and may be distinguished in the MAC subheader or header configuration described above.

In a case where it is assumed that the base station does not reject the EDT request of the UE in all of the methods described above, the UE requesting the EDT by the Msg.1 may not use the MCS index MSB 1 bit in the UL grant or the reserved bits (R1 and/or R2) of the MAC RAR for EDT acceptance (or rejection) usage of the base station in interpreting the UL grant included in the MAC RAR but directly interpret the UL grant of the MAC RAR as the UL grant for the EDT.

FIG. 9 illustrates an example of a MAC PDU including a MAC header and MAC RARs, FIG. 10 illustrates an example of an E/T/RAPID MAC subheader, FIG. 11 illustrates an example of an E/T/R/R/BI MAC subheader, and FIG. 12 illustrates an example of a MAC RAR for NB-IoT UEs.

FIG. 13 illustrates an example of a new MAC PDU including a MAC header and MAC RARs proposed in this specification.

FIG. 14 illustrates an example of a new MAC PDU including a MAC header and MAC RARs for EDT proposed in this specification.

General contents of the MAC PDU will be briefly described with reference to FIGS. 9 to 14.

The MAC PDU may include a MAC header, at least one MAC service data unit (SDU), and at least one MAC control element, and further include padding. In some cases, at least one of the MAC SDU and the MAC control element may not be included in the MAC PDU.

The MAC control element is generally positioned ahead of the MAC SDU.

In addition, the size of the MAC control element may be fixed or variable. When the size of the MAC control element is variable, it may be determined whether the size of the MAC control element is extended through an extended bit. The size of the MAC SDU may also be variable.

The MAC header may include one or more subheaders. In this case, at least one subheader included in the MAC header corresponds to each of the MAC SDU, the MAC control element, and the padding, and the order of the subheaders is the same as an arrangement order of the corresponding elements. For example, when the MAC PDU includes MAC control element 1, MAC control element 2, a plurality of MAC SDUs, and the padding, in the MAC header, a subheader corresponding to MAC control element 1, a subheader corresponding to MAC control element 2, a plurality of subheaders corresponding to the plurality of MAC SDUs, respectively, and a subheader corresponding to the padding may be arranged in order.

'R' represents the reserved bit and an unused bit.

In addition, 'E' as an extended field, represents whether to extend an element corresponding to the subheader.

Table 37 shows an example of a field configuration for DCI format N0 in the related art.

TABLE 37

| Field | # bits |
|---|---|
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| Total | 23 |

Table 38 is a table showing an example of the field configuration in the UL grant of the RAR for the EDT.

TABLE 38

| Field | # bits |
|---|---|
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| Total | 20 |

When one bit (or more) of the MAC RAR may be used as the response to the EDT request, the UE may interpret the UL grant of the RAR differently based on 1 bit of the MAC RAR additionally allocated.

In this case, as the additional bit of the RAR, '0' may be interpreted as a method of using the existing UL grant to prevent the UE from being confused and '1' may be defined to newly interpret the UL grant.

That is, when '0' is indicated, the UL grant in the MAC RAR is interpreted as a legacy UL grant as in the previously proposed method.

When the unused states are present, extended interpretation is also possible by using the unused states.

On the other hand, when '1' is indicated, the UL grant in the MAC RAR may be interpreted differently from the existing MAC RAR.

However, 1 bit of the MAC RAR that is used additionally may be restricted to be used for only the UE that transmits the RAPID and/or RA-RNTI reserved for the EDT in the Msg.1.

Next, a method for introducing a new MSG3 UL Grant including the MCS, the TBS, the RU, etc., which may be indicated by a legacy MSG3 UL Grant will be described. In this method, backward compatibility is not considered.

Since this method considers a method of not using the reserved bits in the legacy RAR, the total MSG UL Grant size may not exceed 15 bits.

Basically, considering a method for configuring an MSG3 repetition number field (3 bits) and a scheduling delay field (2 bits) similarly as legacy, remaining 10 bits may be designed as follows.

(1) 6 bits for subcarrier indication field

A method for indicating a subcarrier indication and a subcarrier type in a subcarrier indication field 6 bits (i.e., 64 states) at once may be considered.

That is, a method for indicating a subcarrier index, a subcarrier number, and subcarrier spacing in which actual MSG and early data are to be transmitted at once may be considered.

However, since 3.75 kHz subcarrier spacing with single tone requires 48 states and 15 kHz subcarrier spacing requires 19 states (12 states for a single tone+4 states for 3 tones+2 states for 6 tones+1 state for 12 tones), a total of 67 states are required.

Therefore, three specific cases need to be excluded.

Characteristically, since 48 states are present in 3.75 kHz SCS, it may be promised that three specific subcarrier indexes among 48 states are not used.

For example, subcarrier indexes #45, #46, and #47 may be configured not to be allocated through the new MSG3 UL Grant.

Additionally, only the 3.75 kHz SCS may be excluded alone, but a method in which the 3.75 kHz SCS is excluded by mixing with the 15 kHz SCS may also be considered.

Characteristically, a total of 3 states including single tone subcarrier index #11 of the 15 kHz SCS in addition to subcarrier indexes #46 and #47 of the 3.75 kHz SCS may be configured not to be used.

However, since there are 48 3.75 kHz SCSs with the single tone, it may be desirable from the viewpoint of efficient resource allocation not to use three of 48 3.75 kHz SCSs.

Like the method described above, the subcarrier indication field table may be made as shown in Table 39 when subcarrier indexes #45, #46, and #47 among 3.75 kHz SCSs having the single tone are excluded.

Characteristically, the uplink subcarrier spacing of the UE is determined to be 3.75 kHz when the value of the subcarrier indication field ($I_{sc}$) is indicated as 0 to 44 and to 15 kHz when the value is indicated as 45 to 63.

Table 39 shows an example of a subcarrier indication field (6 bits).

TABLE 39

| Subcarrier indication field ($I_{sc}$) | Uplink Subcarrier spacing ($\Delta f$) | Allocated subcarriers ($n_{sc}$) |
|---|---|---|
| 0-44 | 3.75 kHz | $I_{sc}$ |
| 45-56 | 15 kHz | $I_{sc} - 45$ |
| 57-60 | 15 kHz | $3(I_{sc} - 57) + \{0, 1, 2\}$ |
| 61-62 | 15 kHz | $6(I_{sc} - 61) + \{0, 1, 2, 3, 4, 5\}$ |
| 63 | 15 kHz | $\{0, 1, 2, 3, 4, 5,$ $6, 7, 8, 9, 10, 11\}$ |

In addition, the excluded subcarrier index may be configured to be configured via SIB (e.g., SIB2-NB or SIB22-NB).

However, it may be preferable that the excluded subcarrier index is determined in advance and that only one table exists in the 3GPP TS specification as shown in FIG. 23.

(2) TBS for Msg.3 field, modulation, and 4 bits of numbers of RUs

A current maximum TBS value is configured to be transmitted via SIB (e.g., SIB2-NB and/or SIB22-NB).

In addition, the number of values which may become the maximum TBS is promised as 8.

That is, when the base station configures the maximum TBS value for each CE level as one of eight promised values, the maximum TBS value for the EDT at the corresponding CE level is determined.

In this case, a maximum of 4 TBSs for the EDT may be configured and used.

The values corresponding to the TBS are not yet determined, but preferably include TBS, RU, modulation order, and the like indicated by the legacy MSG3 UL grant for an operation (i.e., fall back operation) for EDT rejection.

That is, even if the UE transmits MSG1 to a place corresponding to a resource (e.g., a subcarrier index, a resource pool, etc.) predetermined for the EDT, when the same TBS, RU, and modulation order as the value indicted by the legacy MSG3 UL grant in the new MSG3 UL grant, the UE determines that the EDT is rejected and acts on the legacy NPRACH procedure (i.e., falls back).

In this case, "meaning that the UE operates on the legacy NPRACH procedure" indicates that additional UL data is not sent to the MSG3 together, but only legacy MSG3 information is sent.

Characteristically, a type may be defined in which one table includes all of 8 maximum TBS values which may be configured via the SIB, but 8 separate tables to be referred to are specified in 3GPP TS spec. according to the maximum TBS value via the SIB in order to support more various coding rates, etc. each TBS and the UE may be configured to follow 8 tables.

States 0 to 2 of each table may be configured to include the same modulation, number of RUs, TBS value as legacy.

For example, a 4-bit (16 states) table for indicating the TBS, the modulation, the number of RUs, etc. is expressed as shown in Table 40.

In Table 40, it is assumed that the maximum TBS is 1000 and in this case, it is assumed that a total of 4 TBSs including 208, 256, and 680 may be used.

Referring to Table 40, when the UE is configured with New MSG3 UL grant as one of 0 to 2 by the New MSG3 UL grant, the UE may be configured to determine that the EDT is rejected as mentioned above and transmit only the legacy MSG3 information.

Additionally, when the UE is configured with '3' as $I_{MCS}$, the UE may be configured to determine and select one of 4 TBSs and then, transmit the corresponding NPUSCH.

In this case, the base station may determine the TBS selected by the UE through blind decoding (BD).

It is not excluded in this specification that all of 16 states are also used in order to support more various numbers of RUs, of course.

Table 40 is a table that shows an example of the MCS index for MSG3 NPUSCH in which the configured maximum TBS is 1000.

TABLE 40

| MCS Index $I_{MCS}$ | Modulation $\Delta f = 3.75$ kHz or $\Delta f = 15$ kHz and $I_{sc} = 0, 1, \ldots, 11$ | Modulation $\Delta f = 15$ kHz and $I_{sc} > 11$ | Number of RUs $N_{RU}$ | TBS |
|---|---|---|---|---|
| 0 | pi/2 BPSK | QPSK | 4 | 88 bits |
| 1 | pi/4 QPSK | QPSK | 3 | 88 bits |
| 2 | pi/4 QPSK | QPSK | 1 | 88 bits |
| 3 | pi/4 QPSK | QPSK | 1 | 208 bits |
|   | pi/4 QPSK | QPSK | 2 | 256 bits |
|   | pi/4 QPSK | QPSK | 3 | 680 bits |
|   | pi/4 QPSK | QPSK | 4 | 1000 bits |
| 4 | pi/4 QPSK | QPSK | 3 | 208 bits |
|   | pi/4 QPSK | QPSK | 3 | 256 bits |
|   | pi/4 QPSK | QPSK | 4 | 680 bits |
|   | pi/4 QPSK | QPSK | 5 | 1000 bits |
| 5 | pi/4 QPSK | QPSK | 4 | 208 bits |
|   | pi/4 QPSK | QPSK | 4 | 256 bits |
|   | pi/4 QPSK | QPSK | 5 | 680 bits |
|   | pi/4 QPSK | QPSK | 6 | 1000 bits |
| 6 | pi/2 BPSK | QPSK | 5 | 208 bits |
|   | pi/4 QPSK | QPSK | 5 | 256 bits |
|   | pi/4 QPSK | QPSK | 8 | 680 bits |
|   | pi/4 QPSK | QPSK | 8 | 1000 bits |
| 7 | pi/4 QPSK | QPSK | 6 | 208 bits |
|   | pi/2 BPSK | QPSK | 6 | 256 bits |
|   | pi/4 QPSK | QPSK | 10 | 680 bits |
|   | pi/4 QPSK | QPSK | 10 | 1000 bits |
| 8 | pi/2 BPSK | QPSK | 8 | 208 bits |
|   | pi/4 QPSK | QPSK | 8 | 256 bits |
|   | pi/4 QPSK | QPSK | 10 | 680 bits |
|   | pi/4 QPSK | QPSK | 10 | 1000 bits |
| 9 | pi/2 BPSK | QPSK | 8 | 208 bits |
|   | pi/2 BPSK | QPSK | 10 | 256 bits |
|   | pi/4 QPSK | QPSK | 10 | 680 bits |
|   | pi/4 QPSK | QPSK | 10 | 1000 bits |
| 10-15 | reserved | reserved | reserved | reserved |

Next, a method of using the unused state of the legacy MCS index table by considering the backward compatibility will be described.

Additionally, it may also be considered that the unused state of the legacy table is used by considering the backward compatibility.

That is, for example, the EDT operation may be configured to be performed by adding states 3 to 7 of Table 40 to unused states 3 to 7 of the legacy table.

Characteristically, 8 separate tables to be referred to are specified in the 3GPP TS spec. according to the maximum TBS value via the SIB in order to support more various coding rates, etc. each TBS and the UE may be configured to follow 8 tables.

States 0 to 2 of each table may be configured to continuously include the same modulation, number of RUs, TBS value as legacy.

Method for Scheduling Various TBS Sets Considering Code-Rate by EDT Msg.3

Next, a method for scheduling various TBS sets by the EDT Msg.3 by considering (effective) code-rate will be described.

Code rate (CR) in the NB-IoT may be defined by Equation 23 below.

$$CR = TBS / (N_b \cdot 6 \cdot N_{sc}^{RU} \cdot N_{slot}^{UL} \cdot N_{RU} \cdot N_{Rep})$$ [Equation 23]

$$N_b = \begin{cases} 1 & \text{for } \pi/2 \ BPSK \\ 2 & \text{otherwise} \end{cases}$$

In the NB-IoT, the UL grant of the existing Msg.2 RAR may schedule only the TBS of 88 bits and supports various code rates by a combination of the MCS index and the number of RUs and the number of REs (RU size).

eMTC supports different values of parameters and more TBSs depending on CE mode A and CE mode B.

However, a principle for supporting various code rates of the Msg.3 is similarly applied.

This needs to be similarly applied even to a case where the Msg.3 for the EDT is supported and a principle proposed in the corresponding method may be similarly applied even in the NB-IoT and the eMTC or other systems.

Hereinafter, a basic method for supporting various TBS and code rates with respect to the NB-IoT will be described first and a method for applying the principle to the eMTC based on the basic method will be described.

FIG. 23 shows the MCS index table in the UL grant of Msg.2 RAR, which is suitable for 'B) a method of dynamically directly informing 2) and 3) in the Msg.2' of a method (a method for enabling N TBS sets which may be scheduled to the EDT) and N is assumed to be 4.

Here, NRU_1, TBS_2, NRU_2, TBS_2, NRU_3, and TBS_3 are parameters added for the purpose of adjusting the number of RUs for adjusting the code rate according to each TBS value while simultaneously scheduling four TBSs.

Top three values of the MCS index may be used to reject the EDT request by the UE and when any other values are allocated, it may be interpreted that four or one TBS is scheduled for the purpose for the EDT.

N MCS indexes are used to schedule four TBS sets by the EDT Msg.3 and M MCS indexes are used to schedule only the maximum TBS value to the EDT Msg.3.

Here, N and M may be configured in system information or specified in the 3GPP TS spec. and may be configured as different values according to the CE level or a carrier location of the Msg.1.

T0 represents the maximum TBS value which the UE may expect from the base station when the EDT is requested using the corresponding Msg.1.

T1, T2, and T3 as values derived or determined by T0 are values smaller than T0.

In addition, when an arbitrary MCS index excluding the top three MCS indexes is indicated, the maximum TBS value is the same as the remaining TBS value regardless of the MCS index.

The base station may adjust y code rates based on the T0 TBS, indicating a specific MCS index in the UL grant.

Rx,y denotes the number of RUs when the Tx TBS is scheduled.

For example, when the MCS index is indicated as '100', the UE is scheduled with four TBSs and R1,1, R2,1, and R3,1 are configured to have a code rate similar to code rates derived from T0 and R0,1.

That is, R0,1 and R1,1, R2,1, and R3,1 may be configured to be proportional to T0, T1, T2, and T3.

However, R'0,0 and R'0,1 included in M MCS indexes may be selected among R0,0, R0,1, AND R0,2, or may be other values.

The tables in FIGS. 24 and 25 correspond to cases where M and N in the table shown in FIG. 23 are 0, respectively.

This may be a UL grant suitable for 'A) a method for informing 2) and 3) in the system information in advance before requesting the EDT by the Msg.1 of a method (a method for enabling N TBS sets which may be scheduled by the EDT) to be described below.

NRU_1, NRU_2, and NRU_3 indicating the number of RUs in the proposal may be used as a value for adjusting the Msg.3 repetition number of each TBS_i (i=1, 2, 3).

That is, in the UL grant, the repetition number (NRep) of the Msg.3 is used as the Msg.3 repetition number for the Msg.3 of T0 and NRUs for each MCS index are indicated as R0,0, R0,1, R0,2, R'0,0, and R'0,1, respectively.

In addition, values of may be values used for scheduling the Msg.3 repetition number of the corresponding TBS based on NRep again when the UE selects TBS_i (1=1, 2, 3).

This is consistent with the purpose used to adjust the code rate of TBS_i (i=1, 2, 3) to have a code rate similar to the code rate derived from T0 and R0,1.

Further, a redundancy version (RV) changed while the Msg.3 is transmitted may be defined as a different value or pattern from the related art according to a scaled repetition number.

For example, RV may have different values as well as 0 and 2.

As described above, when the code rate for each code rate is adjusted by adjusting the repetition number without adjusting the number of RUs, there is an advantage in that a blind detection complexity of the base station may be reduced.

Figure 15:
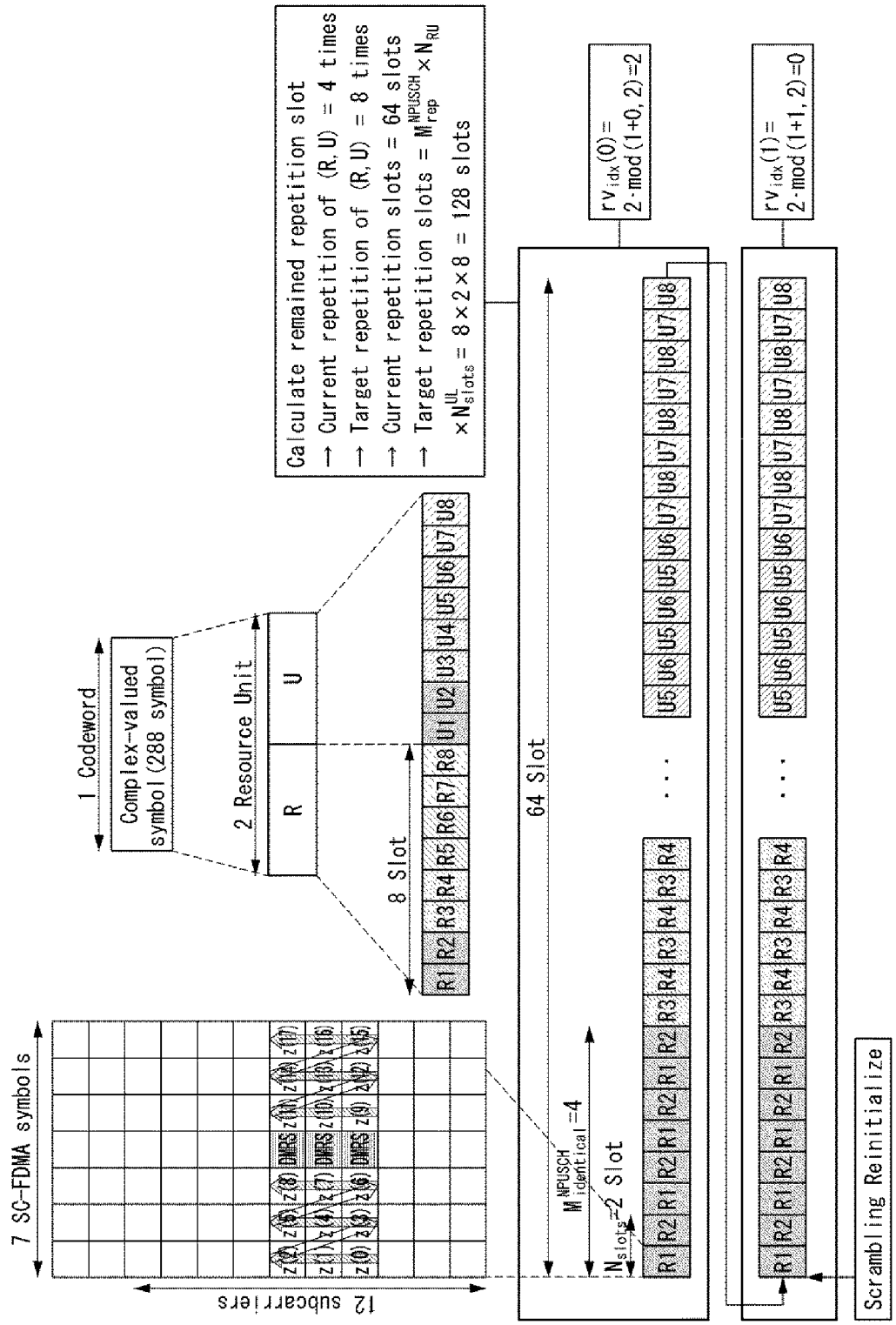
FIG. 15 is a diagram illustrating an example of repetition transmission of NPUSCH proposed in this specification.

For example, when the UL grant is indicated by a specific MCX index (when the specific MCS index is indicated as '100' in the table of FIG. 23, for example), when different repetition numbers are used for each TBS, and a parameter of T0 TBS indicated in the UL grant is $\Delta f=15$ kHz, $N_{RU}=2$, $N_{sc}^{RU}=3$ $\{3, 4, 5\}$, $N_{slot}^{UL}=8$, $M_{rep}^{NPUSCH}=4$, $rv_{DCI}=0$ (that is, R0,1), and only T0 and T1 of the TBS are present in the table of FIG. 23 (for simplifying the example), and when R1,1 is 2, 64 slots are used when the UE selects T0 in FIG. 15 (in the case of Msg.3, rvindx(0) and rvindx(1) may be 0 and 2, respectively).

In addition, when the UE selects T1, 128 slots are used.

Here, R1 and R2 are expressed as A, R3 and R4 are expressed as B, R5 and R6 are expressed as C, R7 and R8 are expressed as D, U1 and U2 are expressed as E, U3 and U4 are expressed as F, U5 and U6 are expressed as G, and U7 and U8 are expressed as H, which may be expressed as AAAABBBB . . . HHHH on the time axis in the case of T0 and AAAABBBB . . . HHHHA'A'A'A'B'B'B'B' . . . H'H'H'H' on the time axis in the case of T1.

Here, in A', B', . . . , H', A, B, . . . H and RV and scrambling represent different things.

Therefore, the base station may advantageously avoid additional memory for log likelihood ratio (LLR) or symbol combining for each number of TBS cases in blind detection of T0 and T1.

Unlike this, when the number of RUs is differently allocated for each TBS, it may be advantageous in that the additional memory for LLR or symbol combining is required for each number of TBS cases.

Further, when a specific MCS index is indicated in the UL grant, physical resources of T0, T1, T2, and T3 may be configured in a nested structure (a scheme in which the remaining physical resources are included in a largest physical resource) from the viewpoint of resource allocation.

Further, regardless of the value of the TBS selected by the UE, in the physical resource of the Msg.3, the same resource is used on the frequency axis and a transmission start location of the Msg.3 is the same on the time axis.

This is advantageous from the viewpoint of reduction of the blind detection of the base station and is advantageous in that transmission power per time of the UE may be made to be the same regardless of the selected TBS.

For example, when the frequency axis resource size used varies according to the selected TBS, there may be a disadvantage in that the transmission power per RE varies according to the selected TBS.

The modulation values for EDT Msg.3 scheduling in the tables of FIGS. 23, 24, and 25 are selected from pi/2 BPSK or pi/4 QPSK for the single-tone and may be fixed to by Quadrature Phase Shift Keying (QPSK) for the multi-tone ((lsc>11).

However, in the case where single-tone transmission is not permitted, when the MCS index is included in the EDT-UL grant area with the corresponding single-tone scheduling (Isc<12), this may be interpreted as a failure of RAR or Msg.3 UL grant detection.

FIG. 23 is a table that shows an example of the MCS index for the EDT Msg3 NPUSCH.

FIG. 24 illustrates a table showing an example of the MCS index for the EDT Msg3 NPUSCH when 4 TBS sets are enabled with respect to the EDT Msg.3.

FIG. 25 illustrates a table showing an example of the MCS index for the EDT Msg3 NPUSCH when the maximum TBS sets are just enabled with respect to only the EDT Msg.3.

FIG. 15 is a diagram illustrating an example of repetition transmission of NPUSCH proposed in this specification.

The UL grant and resource allocation method for the EDT Msg.3 is applicable not only to NB-IoT but also to the eMTC and other systems.

However, since the UL grant in the eMTC is different from the UL grant in the NB-IoT, a method for designing the UL grant as the UL grant suitable for the eMTC system will be described.

First, the eMTC is defined as a type in which the RAR UL grant varies depending on CE mode A and CE mode B.

Further, unlike the NB-IoT, in the eMTC, the EDT UL grant may be designed by additionally using unused or reserved 1 bit of the RAR.

1. Case where unused or reserved 1 bit is additionally used

The unused or reserved 1 bit of the RAR may be defined to reinterpret corresponding 1 bit only when the UE transmits the Msg.1 to a resource (or example, the PRB index including the PRACH resource, the RA-RNTI, the RAPID, etc.) for the EDT request.

To this end, when the unused or reserved 1 bit needs to be defined as '0' when the unused or reserved 1 bit is not used as the response to the EDT request.

When the unused or reserved 1 bit is used as the response to the EDT request, UL grant interpretation of the RAR may be changed according to the value of 1 bit as follows.

A) Case of being indicated as '0' (or '1')

It is interpreted that the EDT request is rejected by the base station and the UL grant of the RAR is interpreted similarly as the method for interpreting the UL grant in the existing random access procedure.

Further, a subsequent procedure between the UE and the base station follows not the EDT procedure but the existing random access procedure. That is, the base station may use the followed procedure for rejecting the EDT request of the UE.

B) Case of being indicated as '1' (or '0')

It is interpreted that the EDT request is accepted by the base station and the UL grant of the RAR is interpreted quite differently from the method for interpreting the UL grant in the existing random access procedure.

For example, the UL grant may be configured to indicate one or more TBS values at the same time.

In CE mode A, the 'CSI request' field of the UL grant may be used instead of the unused or reserved 1 bit of the RAR described above.

2. Method for reinterpreting existing RAR UL grant as EDT Msg.3 UL grant

The method for reinterpreting the existing RAR UL grant as the EDT Msg.3 UL grant is based on a method for interpreting some element(s) as the EDT UL grant in Tables 44 and 45.

Even in the corresponding method, some elements include an RAR UL grant element value of the existing random access so as to be used for rejecting the EDT request (the EDT request of the UE is rejected and the subsequent procedure instructs to follow the existing random access and the UE performs the random access procedure other than the EDT procedure while transmitting the Msg.3 according to the indication of the corresponding RAR UL grant).

Table 44 shows an example of a TBS table in the RAR UL grant for CE mode A.

TABLE 44

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |

Table 45 shows an example of the TBS table in the RAR UL grant for CE mode B.

TABLE 45

| $I_{TBS}$ | $N_{PRB}$ | |
|---|---|---|
| | 1 | 2 |
| 0 | 56 | 152 |
| 1 | 88 | 208 |
| 2 | 144 | 256 |
| 3 | 176 | 328 |

Table 46 shows an example of the TBS table in the RAR UL grant for CE mode A. Table 46 shows an example of a case of being used as the EDT UL grant.

TABLE 46

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | T0 | T0 | T0 | T0 | T0 | T0 |
| 7 | T0 | T0 | T0 | T0 | T0 | T0 |

The above proposed method may be conceptually configured by the following features regardless of the CE mode.

A) Permitting some elements in TBS table to be reinterpreted for EDT UL grant

① Selected element may be all elements corresponding to a specific ITBS value.

In Tables 44 and 45, a high value of specific ITBS may be preferentially used for the EDT UL grant.

This is because the Msg.3 TBS required for the EDT may be a relatively high value, so that the $I_{TBS}$ having a high possibility of overlapping with the Msg.3 TBS may be reused as the EDT UL grant.

Here, in 'A) the method for informing 2) and 3) in the system information in advance before requesting the EDT by the Msg.1' of the method (the method for enabling N TBS sets which may be scheduled to the EDT) to be described below, only one $I_{TBS}$ value (largest value) may be reused and reinterpreted.

In addition, in 'B) a method for dynamically directly 2) and 3) in the Msg.2' of the method the system information in advance before requesting the EDT by the Msg.1' of the method (the method for enabling N TBS sets which may be scheduled to the EDT) to be described below, at least two ITBS values EDT may be reused or reinterpreted as the UL grant.

In a simple embodiment, when $I_{TBS}$ is 6 or 7 in Table 46, the UE determines that the EDT request is accepted and when $I_{TBS}$ is 6, the UE needs to transmit the Msg.3 to the T0 TBS.

In addition, when $I_{TBS}$ is 7, Msg.3 may be transmitted with a value selected by the UE directly among T0, T1, T2, and T3 as the TBS.

Here, T0 is a maximum TBS value that may be expected by the base station when the EDT request is made by the corresponding Msg.1 and T1, T2, and T3 are values determined by T0.

Further, T1, T2, and T3 may be defined or interpreted differently depending on the CE level, the CE mode, the PRACH resource, and the like even when T0 is the same.

In this case, the repetition number value for the Msg3 PUSCH in the RAR UL grant is set based on T0.

The PUSCH repetition number of the actual Msg.3 may be interpreted differently according to the value of the TBS (T0, T1, T2, T3) selected by the UE and is conceptually set to a value corresponding to the ratio of the TBS value and T0 selected by the UE.

For example, it may be interpreted as '(repetition number for Msg3 PUSCH in UL grant)×cell ((selected TBS)/T0)'.

Of course, the repetition number for the Msg3 PUSCH in the UL grant indicated for the EDT is newly defined or defined based on a smallest value of the TBSs selectable for EDT Msg.3 transmission (when $I_{TBS}$ is fixed) with the corresponding UL grant.

In this case, the PUSCH repetition number of the actual Msg.3 may be interpreted as '(repetition number for Msg3 PUSCH in UL grant)×floor (T0/(selected TBS))'.

Here, ceiling and floor are only functions for creating integers to express the repetition number and other mathematical expressions may be used.

② The selected element may be restricted to a combination of a specific $I_{TBS}$ value and a specific $N_{PRB}$ value.

The method is the same as the previous method ①, but the method is different from method ① in that that the elements that may be selected for the EDT Msg.3 UL grant in the TBS Table may also be restricted by the $N_{PRB}$.

For example, when the TBS is permitted only with respect to a case where the number of PRBs in the Msg.3 is smaller than or larger than a specific value, even if the $I_{TBS}$ indicated in the RAR UL grant is equal to the $I_{TBS}$ value reserved for the EDT in ①, the interpretation may be changed as acceptance or rejection of the EDT request according to the number of PRBs.

In such a case, when the number of PRBs indicated by the RAR UL grant corresponds to the number of PRBs that do not support the EDT, the TBS table is interpreted to be the same as the TBS table of the RAR UL grant for the existing random access.

When the number of PRBs indicated by the RAR UL grant corresponds to the number of PRBs supporting the EDT, the corresponding element of the TBS table is newly interpreted for the EDT according to the $I_{TBS}$ value or interpreted to be the same as the TBS table of the RAR UL grant for the existing random access.

The corresponding method may be similarly applied even to the table of FIG. 23 of the NB-IoT.

For example, only the maximum TBS configured according to subcarrier spacing and/or $I_{sc}$ is permitted in the EDT Msg.3 transmission or whether the UE directly selects the TBS for Msg.3 transmission among N TBSs that are equal to or less than the maximum TBS may be indicated.

③ A value of an unselected element is included in the existing RAR UL grant

When the RAR UL grant indicates the corresponding element, the UE determines that the EDT request is rejected, transmits the Msg.3 in the existing random access procedure according to the parameter indicated by the UL grant, and falls back to not the EDT procedure but the random access procedure.

However, if a TBS value smaller than 56 is indicated, other operations may be performed without falling back to the existing random access procedure.

For example, the EDT request may be accepted, but only the maximum permittable TBS may be determined to be scheduled by the EDT Msg.1 transmitted by the UE and the EDT Msg.3 may be transmitted.

Alternatively, the UE may interpret the EDT request to be attempted again after a specific time.

Since the TBS value smaller than 56 is not used in the RAR UL grant, a method for selecting an element for EDT scheduling using the characteristic may be additionally considered as follows in CE mode A.

In Table 46, when the elements (16, 24, 32, 40) are indicated by the EDT RAR UL grant, five elements are divided into logical numbers 0 to 4, respectively, so that a combination for {modulation order, scheduling only maximum TBS for EDT, or scheduling of N (=4) TBSs that are equal to or smaller than the maximum TBS} may be notified.

Here, the maximum TBS value used in the EDT Msg.3 is information that may be acquired in advance by the UE as the system information and TBSs that are equal to or smaller than the maximum TBS as a set determined according to the maximum TBS are values set as the system information and the corresponding information is also a value which the UE may know in advance.

Next, a method for allocating a Msg. 3 resource when a UE directly selects a TBS among a plurality of TBSs will be described.

In response to the EDT request of the UE, the base station may schedule more than one TBS, and physical resources required for each TBS may vary.

In addition, the base station needs to reserve maximally required physical resources.

As such, in the case where the UE directly selects the TBS according to its UL buffer state (size and type of data), when the selected TBS does not use the maximally reserved physical resources, some of the reserved physical resources may be wasted.

To minimize this, the base station performs blind detection for each TBS that may be selected by the UE and schedules physical resources that are reserved but unused physical resources to other users (eMTC or NB-IoT or LTE UE) to prevent waste of the resources.

Even in this case, (some) physical resources overlapping with 'time to perform blind detection by the base station', 'time to generate UL grant for scheduling data (PUSCH, PUCCH or NPUSCH, etc.) to the corresponding resource to another UE', and 'time to start transmission by generating an uplink signal scheduled by the scheduled UE' may be wasted.

As the method to solve the problem, a 'specific gap' may be configured between physical resources of a plurality of TBSs.

Here, the 'specific gap' needs to be configured to include the listed 'time to perform blind detection by the base station', 'time to generate UL grant for scheduling data (PUSCH, PUCCH or NPUSCH, etc.) to the corresponding resource to another UE', and 'time to start transmission by generating an uplink signal scheduled by the scheduled UE'.

Of course, it may be configured as a specific time in the base station or configured and interpreted as a different value depending on a type (eMTC or NB-IoT or LTE or the capability of UE) of the scheduled UE or the size of the TBS to be scheduled to the EDT.

As a simple example of the method, in the method of scheduling various TBS sets to EDT Msg.3 considering 'Code-rate' described above, Msg.3 repetition number varies among a plurality of TBSs scheduled with EDT UL grant and the 'specific gap' may be inserted between repetitions for each TBS or in the TBS.

When using this method, the base station may pre-schedule uplink channels and signals of other UEs for the 'specific gap' period between physical resources corresponding to a plurality of TBSs scheduled with the EDT.

When the Msg.3 of the TBS having a size smaller than the maximum scheduled or configured TBS is detected in the base station, a physical resource larger than the detected TBS may be effectively used for the other UEs.

Condition for EDT Request

EDT is an effective procedure from the viewpoint of power consumption when the UE may transmit all the uplink buffers in a random access procedure without performing an RRC connection process when the data to be transmitted to the NPUSCH in a poor-coverage is not large.

However, since the UE is located very far from the base station, when the NPUSCH transmission is not likely to succeed at one time, or the data in the uplink buffer is too large (a large amount to expect to be able to be scheduled with Msg.3 at one time), it may be rather an ineffective method.

That is, the base station needs to configure a condition for requesting the EDT because the base station may schedule the Msg. 3 without knowing the exact channel status of the UE, the uplink buffer status, or the multi-tone capability.

In addition, when it is determined that the probability of collision between different UEs may be high in Msg.1 and Msg.3, the base station may need to be configured to request the EDT through Msg.1 only for UEs satisfying specific conditions.

By such a requirement, the following method may be considered as a specific constraint condition for requesting the EDT.

1. An EUT (or EDT) request condition may be configured based on a CE level and/or RSRP.

A. Here, a specific CE level and/or RSRP may be configured by the base station for high-layer signaling.

B. In this case, in the simplest case, when the specific CE level is higher and/or the RSRP is lower than a specific value, the EDT may be configured not to be requested.

C. Here, the CE level for the EDT request may be different from the actual CE level at which the UE transmits Msg.1.

That is, the reason is that an NPRACH resource for the EDT may not have a CE level capable of transmitting Msg.1 based on the RSRP of the UE.

In addition, the UE may initially transmit Msg.1 in the first stage and not receive the RAR to select an NPRACH resource at the next CE level.

Also, it may be because the NPRACH resource including the multi-tone capability is not included in the specific CE level.

2. Even though the Msg.1 transmission has been attempted N times, the EDT request may be restricted to the UE that has not completed the random access procedure.

A. Here, N times may be configured as high-layer signaling or configured as a specific value in a 3GPP TS spec.

B. Even through the EDT request is performed to Msg.1 and the corresponding NPUSCH is transmitted to Msg.3, when a signal promised in a Msg.4 process is not received (for example, a UL grant capable of inferring an ACK for Msg.3 is not received, a DL grant is not received, or a contention resolution ID which has been used by the UE in the Msg.4 is not received), the EDT may be configured not to be performed consecutively or during a specific time T (or for a specific number of NPRACH resource periods corresponding thereto).

Here, M and T also may be configured as high-layer signaling or configured as a specific value in a 3GPP TS spec.

3. The base station informs the SIBx-NB of the NPUSCH resource information to be scheduled to the Msg.3 for the EDT, and an EUT request may be made only when a block error rate (BLER) is expected to substantially satisfy a specific value under the above conditions.

A. Here, NPUSCH resource information to be scheduled by the base station in Msg.3 for EDT may vary for each CE level, and as an example of the resource information, there are a TBS, a repetition number, a subcarrier spacing, and multi-tone or single-tone.

B. For example, the UE may determine whether to perform the EDT request through Msg.1 based on the amount of data stored in its uplink buffer, the type of data (C-plane or U-plane data), or multi-tone transmission capability.

C. Here, when the BLER is not specified, the BLER may be automatically designated as 1 or 10%, or the BLER may not be considered.

4. The base station configures a specific reference channel of the downlink and the UE estimates the BLER from the corresponding reference channel to configure to perform an EUT request only when a specific BLER condition may be satisfied.

A. For example, only when the NPDCCH included in a common search space (CSS) succeeds decoding without using a specific ratio of a maximum repetition number or an aggregation level, the base station may configure to perform the EUT request.

B. Alternatively, the base station may indirectly derive RSRQ or channel quality by assuming a specific reference channel based on the NRS of the downlink, and configure the EDT to be requested only when the corresponding value is higher than a specific value.

5. The base station may newly configure another RSRP that may perform the EDT request at the corresponding CE level separately from the RSRP condition used so that the UE selects the NPRACH CE level.

A. Even in the case where a specific CE level is selected as the RSRP value measured at the UE, when the measured RSRP value is lower than another RSRP reference value (which may be a value set from the base station or induced according to the CE level) that may request the EDT at the corresponding CE level, the EDT request may not be allowed. Alternatively, on the contrary, the EDT request may be allowed only when the measured RSRP value is lower than another RSRP reference value that may request an EDT at the corresponding CE level.

This is because the gain (power consumption) generated from the EDT is expected to be larger for the UE with lower RSRP, while the EDT procedure is not completed and has a high possibility to be failed.

B. Here, another RSRP value capable of requesting the EDT at the corresponding CE level may be configured as an absolute RSRP value or an offset value from a boundary (an upper limit value or a lower limit value) of the corresponding CE level.

6. The EDT request may be limitedly configured depending on the multi-tone capability and/or the multi-carrier-NPRACH capability of the UE, which may have different conditions for each CE level.

A. In particular, the base station may schedule a single-tone NPUSCH with a subcarrier spacing of 15 kHz at all times with an UL grant for an EDT request, and perform the multi-tone scheduling after Msg.3 according to capability information such as multi-tone capability and the like reported by the UE in the Msg.3.

7. When the conditions are not mutually exclusive, one or more conditions may be configured and used and may vary depending on an operation mode of the network or the number of CRS and/or NRS ports.

Method of Enabling N TBS Sets that May be Scheduled with the EUT

When receiving the EDT request from the UE through Msg.1, the base station may schedule only the UL grant of the maximum EDT TBS corresponding to the corresponding Msg.1 in Msg.2, or (N−1) other TBS values determined by the maximum EDT TBS value as well as the maximum EDT TBS corresponding to the corresponding Msg.1.

Here, N may be defined as 4. That is, the UE may determine whether to request the EDT to the corresponding Msg.1 by considering the type and size of data (e.g., C-Plane or U-Plane data) accumulated in its UL buffer and the CE level before transmitting Msg.1.

In this case, base station system information to be referred is a maximum schedulable TBS value for each CE level or Msg.3 for each carrier capable of transmitting Msg.1.

That is, if the maximum TBS that may expect scheduling with the EDT is larger than the size of the UL buffer at Msg.3, the UE may perform the EDT request to the corresponding Msg.1.

At this time, the base station receiving the Msg.1 may transmit a UL grant for scheduling Msg.3 to the corresponding UE in the Msg.2 RAR.

Here, the TBS indicated by the UL grant may include 1) all or some of the UL grant values of the existing Msg.2 RAR for rejecting the EDT request of the UE, or 2) simultaneously schedules a maximum TBS and N−1 TBSs (less than the maximum TBS value, and each TBS may not overlap each other) induced from the value, or 3) transmit the UL grant only with the maximum TBS.

Each using method and object may be as follows.

1) Including all or some of the UL grant values of the existing Msg.2 RAR for rejecting the EDT request of the UE The base station may reject the EDT request of the UE according to the scheduling situation.

As a method for this, a TBS set used in the existing random access procedure (including other parameters related to resource allocation and MCS as well as the TBS) may be indicated as an UL grant.

When the TBS set used in the existing random access is included in the Msg.2 UL grant, the UE may recognize that the EDT request is rejected from the base station and follow the existing random access procedure.

That is, the UE transmits Msg.3 to the base station according to the method indicated by the UL grant, and the operation is the same as the existing random access procedure.

2) Simultaneously schedules maximum TBS and N−1 TBSs (less than the maximum TBS value, and each TBS may not overlap each other) induced from the value When the UE performs the EDT request to Msg.1, the maximum value of the TBS that may be scheduled in Msg.2 may be known from the system information in advance.

The maximum TBS value may vary depending on characteristics of Msg.1 transmitted by the UE.

Here, the characteristics of Msg.1 are a Msg.1 resource, a CE level, a RA-RNTI, a RAPID, and the like.

The base station may schedule N−1 TBSs smaller therethan, including the maximum TBS, at Msg.2, and the N−1 TBS values are determined according to the maximum TBS value.

In addition, even when the maximum TBS value is the same, N−1 TBS values or TBS sets may vary depending on the resource, the CE level, the RA-RNTI, and the RAPID of Msg.1.

For example, the UL grant received from the base station is all scheduled for TBS1, TBS2, TBS3, and TBS4 (when N=4), and which TBS value is used to transmit Msg.3 may be directly selected by the UE by considering the size and type of data accumulated in the UL buffer of the UE.

As a simple example, a TBS value that requires the least amount of padding bits other than the data, may be selected in Msg.3.

The base station performs blind detection on N TBSs in Msg.3 and transmits Msg.4 for the detected specific TBS.

3) Transmit UL grant only to maximum TBS

Only the maximum TBS is used for TBS scheduling in Msg.2 even though the method is the same as the method of 2).

This is to minimize UL resources that may be wasted when the base station does not support blind detection or when the Msg.3 repetition of the UE is too large.

Alternatively, on the contrary, when the Msg. 3 repetition is too large, it may be because the TBS size selected by the UE may be a small value.

As a method for distinguishing the methods 2) and 3) in the above methods, there may be a method A of broadcasting whether the EDT UL grant supports only the maximum TBS in the system information (i.e., when the UE requests the EDT to Msg.1, whether the TBS of the EDT UL grant that may be expected by the UE is limited to the largest value) or whether N TBSs including the maximum TBS may be scheduled at the same time (that is, whether the UL grant corresponding to the EDT request schedules N TBSs at the same time and the UE may be selected from N TBSs) and a method B of indicating directly the cases in the UL grant.

A) Method of informing methods 2) and 3) in system information in advance before performing the EDT request to Msg.1

When the UE may know the TBS set that may be expected from the Msg.2 UL grant for the EDT request in advance before performing the EDT request to Msg.1 (whether only the maximum TBS is scheduled or N TBSs including the maximum TBS are scheduled), there is an advantage in that the UE may determine in advance whether to request the EDT to Msg.1.

For example, when the data stored in the UL buffer of the UE is 300 bits, the UE may attempt or not the EDT request according to case where the TBS of Msg. 3 capable of scheduling with the EDT is available only as 1,000 or {400, 600, 800, 1000}.

That is, when the TBS of Msg. 3 is always available only as 1,000, the UE needs to perform padding of 700 bits to attempt to perform an existing random access procedure instead of the EDT request.

To this end, in the method of informing the methods 2) and 3) in the system information, depending on the CE level, the RA-RNTI, the RAPID, and the resource (or carrier) location of Msg.1, the method 2) is partially allowed and only the method 3) may be partially configured to be expected.

Here, the CE level is a CE level induced from the Msg. 1 resource, not the CE level of the UE.

In this case, according to 2) and 3), the method of configuring the UL grant by the base station and the method of interpreting the UL grant by the UE may vary in Msg.2.

Also, even in the cases 2) and 3), all or part of the TBS set of the UL grant of Msg.2 used for the existing Msg.3 scheduling in the UL grant needs to always be included.

B) Method of informing dynamically directly 2) and 3) in Msg.2

Unlike A), the method of distinguishing 2) and 3) in Msg.2 may have a disadvantage that the UE may not predict the TBS set(s) of the EDT Msg.3 in advance.

However, even in the case, since the EDT may be advantageous in terms of resource utilization efficiency and power consumption as compared with the existing random access procedure, it may be necessary to dynamically select 2) and 3) in the base station.

In such a case, irrespective of 2) and 3), UL grants transmitted in Msg.2 need to be configured and interpreted identically.

However, even in the case, all or part of the TBS set of the UL grant of Msg.2 used for the existing Msg.3 scheduling in the UL grant needs to always be included.

The TBS set configuration for EDT, which is newly added to UL grant, may be configured as system information.

Method for Configuring Period of Monitoring Msg. 4 after EDT Transmission

The UE expects to receive the Msg.4 after transmitting the Msg.3.

Figure 16:
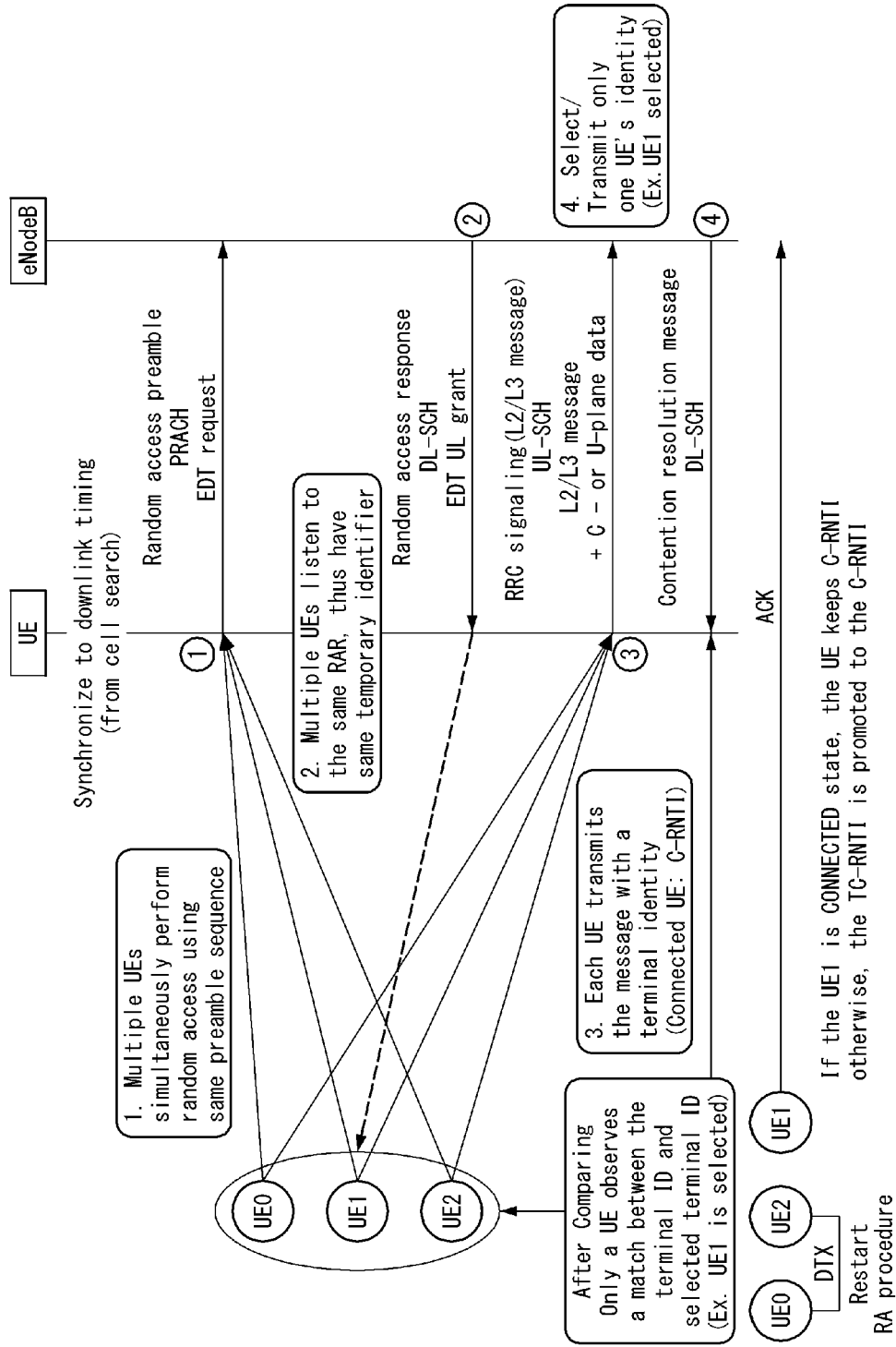
FIG. 16 is a diagram illustrating an EDT process to which a method proposed in this specification may be applied.

This corresponds to a contention resolution message process of FIG. 16 (4).

Generally, in an NB-IoT, the UE expects to receive a DCI N1 format scrambled with TC-RNTI in a Type-2 CSS interval after Msg.3 transmission.

At this time, some areas of the Type-2 CSS period may be excluded from the NPDCCH monitoring area for Msg.4 according to the TBS selected by the UE.

That is, according to an Rmax value of the NPDCCH configured in the Type-2 CSS area, the UE blindly detects an actual repetition number (R) value of the NPDCCH in several cases.

For some R, there may be cases where reception is not expected by R according to the TBS of the selected Msg. 3.

Even in this case, the UE may not attempt the NPDCCH monitoring in a search space including the corresponding DL subframe.

This may be configured differently depending on the Rmax or R value, and may be determined by a ratio of subframes that may not be monitored.

In addition, in order to reduce the blind detection number of the UE, it is assumed that the largest Msg. 3 TBS is transmitted irrespective of the selected Msg. 3 TBS, and the NPDCCH for Msg. 4 may be monitored only in the Type-2 CSS area existing thereafter.

This may be to match a period (generally defined as a timer) in which the UE may expect Msg.4 in terms of the base station which does not know which TBS is selected by the UE. FIG. 16 is a diagram showing an example of an EDT process.

Operating Method of UE in Case of EDT Transmission Failure

When the UE performs the EDT request and the corresponding

EDT procedure is failed or stopped because there is no response (a command of allowing the EDT or fall-backing in an existing RA procedure) thereto or the UE transmits the EDT Msg.3 but does not receive the Msg.4 for a specific time, a subsequent operation of the UE may be defined differently from the existing RA process.

For example, when the EDT is failed, the UE may resume the existing RA procedure at the same CE level, or change the CE level to resume the EDT request or the existing RA procedure.

When the existing RA procedure is resumed at the same CE level, the UE may use the transmission power previously used without adjusting the power of Msg.1.

Alternatively, when higher power than the transmission power previously used may be used, the UE may retransmit Msg.1 requesting EDT with high transmission power at the corresponding CE level again.

However, in any case, when the EDT procedure fails N consecutive times, no EDT request is allowed for a specific T time, and only Msg.1 transmission requesting the existing RA procedure may be allowed.

In addition, when the EDT request is explicitly rejected from Msg.2 (when receiving a command to fall back to the existing RA process), the EDT request may not be allowed for a specific time.

Method of Varying Transmission for Each EDT TBS

Like the case of '2) simultaneously scheduling the maximum TBS and N−1 TBSs (less than the maximum TBS value, and each TBS may not overlap each other) induced from the value' of 'the method of enabling N TBS sets schedulable with the EDT' described above, when the UE transmits the Msg.3 by directly selecting the TBS from the N TBSs, the base station needs to blindly detect the TBS selected from the UE or used for the corresponding Msg.3 among the N TBSs.

That is, the base station may need to perform demodulation and decoding for each TBS in a state in which it is impossible to predict which TBS will be selected among the N TBSs.

As a method of reducing the complexity of this method, in the method of scheduling various TBS sets to EDT Msg.3 by considering the 'code-rate' described above, a method of repeatedly transmitting the Msg.3 by the specific method for each TBS and an EDT Msg.3 UL grant related thereto will be described.

This is a method that may be applied in association with a UL grant design and Msg.3 resource allocation.

Hereinafter, as a different method, a method for generating a physical layer signal of Msg. 3 and distinguishing TBSs using a reference signal will be described.

Elements that may be considered differently in generation of Msg.3 physical layer signal and channel according to the TBS transmitted to Msg.3 are as follows.

1. Reference signal (DMRS) related parameters of Msg.3
 ① Group hopping pattern (fgh) among parameters determining DMRS sequence group number Here, a $C_{init}$ value used to generate a pseudo random sequence to be used may be configured differently for each TBS, or a position of the sequence selected for the group-hopping pattern among generated pseudo random sequences may be configured differently for each TBS.
 ② Sequence shift pattern ($f_{ss}$) among parameters determining DMRS sequence group number Among the parameters for determining the sequence shift pattern, some values may be determined to be different values according to the TBS value selected by the UE in Msg.3.

For example, groupAssignmentNPUSCH received from a higher layer in NB-IoT may be defined differently for each TBS.
 ③ DMRS cyclic shift (CS)

A value (NB-IoT, a α value in $r_u(n)=e^{j\alpha n}e^{j\phi(n)\pi/4}$) of cyclic-shifting the generated DMRS sequence may be configured differently for each TBS.

However, when Msg.3 is allocated to less than 3 tone in the NB-IoT, some TBSs may use the same α.

On the other hand, in the case of eMTC, this value may be selected so that a difference in a value between the different TBSs is the largest within the Msg.3 scheduled RB size.

For example, when a may be selected from 2pi/12*[0, 1, 2, 3, . . . , 11], four TBSs have the same interval a and may be selected as 2pi/12*[0, 4, 8, 12] so that an interval between a may be maximized, and may be allocated as different values for each TBS among possible a without any special constraints.

Also, when the EDT Msg.3 transmission in eMTC is allowed for sub-PRB (PUSCH transmission using REs less than 12 REs), the DMRS cyclic shift value may be selected for each TBS in the same manner as the previously proposed NB-IoT.

2. Parameters related to shared channel of Msg.3
 ① Orthogonal cover code (OCC) in (N)PUSCH When the repeated transmission number of Msg.3 may be different for each Msg.3 TBS selected from the UE, a value of the orthogonal cover code multiplied by the subframe, slot or symbol between the repeated (N)PUSCH transmissions may be selected as a different value between the TBSs.
 ② CD Scrambling initial value The scrambling initial value applied to the (N)PUSCH may vary according to the Msg.3 TBS selected from the UE.

3. Initial value of pseudo random sequence used for DMRS and scrambling sequence generation The initial value used to generate the pseudo-random sequence or a location of some sequences selected for DMRS and scrambling sequence generation from the pseudo-random sequence is used/selected differently for each TBS, or may be used/selected based on the transmission completion time (e.g., radio frame or subframe or slot number) other than the transmission starting time position for each TBS.

Method of Selecting (N)PRACH Resource for Requesting EDT

In an FDD NB-IoT system, a method of selecting the NPRACH resource by the UE is as follows.

1. Select CE level by comparing measured NRSRP with configured threshold value

2. When an NPRACH resource is configured in two or more carriers, carriers with the NPRACH resource at the corresponding CE level are selected as an NPRACH transmission candidate carrier set.

3. Select carriers to be used for the actual NPRACH transmission from the NPRACH transmission candidate carrier set according to the probability set by the base station.

When the NPRACH resource selection method for requesting the EDT also follows the above method, the UE may not have an NPRACH resource for the EDT request to the carrier randomly selected according to the probability to have a disadvantage of only transmitting the uplink data after being to an RRC connected state by performing the existing random access procedure.

Therefore, the NPRACH resource selection for the EDT request needs to be defined differently from the existing NPRACH resource selection method, which may be expressed by the following procedure.

1. Select CE level by comparing measured NRSRP with configured threshold value

2. First select carriers with the NPRACH resource for the EDT request at the corresponding CE level as an NPRACH transmission candidate carrier set.

A. When there is no carrier with the NPRACH resource for the EDT request at the corresponding CE level, the EDT request is abandoned and the existing NPRACH resource selection method is followed (of course, a process of finding the NPRACH resource for the EDT request again may be performed by increasing the CE level).

B. When there is at least one carrier in which the NPRACH resource for the EDT request is configured at the corresponding CE level, but there is only the EDR request NPRACH resource capable of scheduling only the TBS smaller than the size of the data to be transmitted in the Msg.3 by the UE, the EDT request is abandoned and the existing NPRACH resource selection method is followed (of course, a process of finding the NPRACH resource for the EDT request again may be performed by increasing the CE level).

C. When there is at least one carrier in which the NPRACH resource for the EDT request is configured at the corresponding CE level, but there is the EDR request NPRACH resource capable of scheduling only the TBS larger than or equal to the size of the data to be transmitted in the Msg.3 by the UE,
 i) (Option-1) the corresponding NPRACH resource carriers are selected as a transmission candidate carrier set.
 ii) (Option-2) NPRACH resource carriers, which are expected to minimize zero-padding in Msg.3, are selected as a candidate transmission carrier.

3. Select carriers to be used for the actual NPRACH transmission from the NPRACH transmission candidate carrier set according to the probability set by the base station.

According to the above-described methods, a method for selecting an NPRACH resource carrier may vary depending on whether to request an EDT for the same UE and the type and size of data transmitted to the EDT in Msg.3.

Each of the methods discussed above may be applied independently or in combination of one or more methods or in combination for the method for performing the EDT proposed in this specification.

Operations of the UE and the base station performing the EDT proposed in this specification will be described based on the contents described above.

FIG. 17 is a flowchart illustrating an example of an operation of a UE for performing the method proposed in this specification.

That is, FIG. 17 illustrates an operation method for the UE for performing early data transmission (EDT) in the random access procedure in the wireless communication system.

First, the UE receives, from the UE, a control message including first information indicating whether selection for a second transport size (TBS) smaller than a first TBS for message 3 is permitted and second information for the first TBS (S1710).

The message 3 may correspond to a specific coverage enhancement (CE) level.

In addition, a resource in a frequency domain and a start position of a time domain in which the message 3 is transmitted may be constant regardless of a TBS.

Here, the first TBS means a maximum TBS for the message 3.

In addition, the UE transmits, to the base station, a request for the EDT by using message 1.

In addition, the request for the EDT may be determined based on at least one of a CE level or reference signal received power (RSRP).

In addition, the request for the EDT may be transmitted to the base station on a carrier corresponding to the CE level.

In addition, the UE receives a UL grant for the message 3 from the base station (S1730).

The UL grant may be included in message 2 used in the random access procedure.

In addition, the UE determines a repetition number for the message 3 based on the control message and the UL grant (S1740).

In addition, the UE transmits the message 3 to the base station by the repetition number (S1750).

Additionally, after step S1750, the UE may monitor a physical downlink control channel in a Type-2 common search space (CSS) and receive message 4 from the base station based on the physical downlink control channel.

The request for the EDT may be identified based on at least one of a starting carrier index of an NPRACH, a non-anchor carrier index used for transmission of the NPRACH, or a random access preamble identifier (RAPID).

In addition, the message 2 may include information indicating permission or rejection of the request for the EDT.

In this case, when the request for the EDT is identified based on the RAPID, the permission or rejection may be indicated by a specific field of a medium access control (MAC) packet data unit (PDU) corresponding to the RAPID.

Here, the specific field may be a reserved bit.

Alternatively, the UE may identify acceptance or rejection of the request for the EDT through whether the value for the TBS included in the UL grant is the same as the value for the previous TBS.

That is, the UE may identify that the request for the EDT is rejected when the value for the TBS included in the UL grant is the same as the value for the previous TBS.

The message 1, the message 2, the message 3, and the message 4 described in FIG. 17 may mean a message to be transmitted and received to and from the base station in the random access procedure.

FIG. 18 is a flowchart illustrating another example of the operation of the UE for performing the method proposed in this specification.

First, the UE receives, from the UE, a control message including first information indicating whether selection for a second transport size (TBS) smaller than a first TBS for message 3 is permitted and second information for the first TBS (S1810).

The message 3 may correspond to a specific coverage enhancement (CE) level.

In addition, a resource in a frequency domain and a start position of a time domain in which the message 3 is transmitted may be constant regardless of a TBS.

Here, the first TBS means a maximum TBS for the message 3.

The UE receives, from the base station, third information for a second TBS subset including at least one second TBS (S1820).

In addition, the UE select a specific second TBS in the second TBS subset (S1830).

Here, the message 3 may be transmitted according to a repetition number for the specific second TBS.

The repetition number for the specific second TBS may be determined based on the repetition number for the message 3 configured by the UL grant, a value of the first TBS, and a value of the specific second TBS.

In addition, a value of the specific second TBS may be determined based on the value of the first TBS and a more detailed method will be described with reference to the above-mentioned contents.

In addition, the UE transmits, to the base station, a request for the EDT by using message 1 (S1840).

In addition, the request for the EDT may be determined based on at least one of a CE level or reference signal received power (RSRP).

In addition, the request for the EDT may be transmitted to the base station on a carrier corresponding to the CE level.

In addition, the UE receives a UL grant for the message 3 from the base station (S1850).

In addition, the UE determines a repetition number for the message 3 based on the control message and the UL grant (S1860).

In addition, the UE transmits the message 3 to the base station by the repetition number (S1870).

Additionally, after step S1870, the UE may monitor a physical downlink control channel in a Type-2 common search space (CSS) and receive message 4 from the base station based on the physical downlink control channel.

The request for the EDT may be identified based on at least one of a starting carrier index of an NPRACH, a non-anchor carrier index used for transmission of the NPRACH, or a random access preamble identifier (RAPID).

In addition, the message 2 may include information indicating permission or rejection of the request for the EDT.

In this case, when the request for the EDT is identified based on the RAPID, the permission or rejection may be indicated by a specific field of a medium access control (MAC) packet data unit (PDU) corresponding to the RAPID.

Here, the specific field may be a reserved bit.

Alternatively, the UE may identify acceptance or rejection of the request for the EDT through whether the value for the TBS included in the UL grant is the same as the value for the previous TBS.

That is, the UE may identify that the request for the EDT is rejected when the value for the TBS included in the UL grant is the same as the value for the previous TBS.

The message 1, the UL grant, the message 3, and the message 4 described in FIG. 18 may mean a message to be transmitted and received to and from the base station in the random access procedure.

Figure 21:
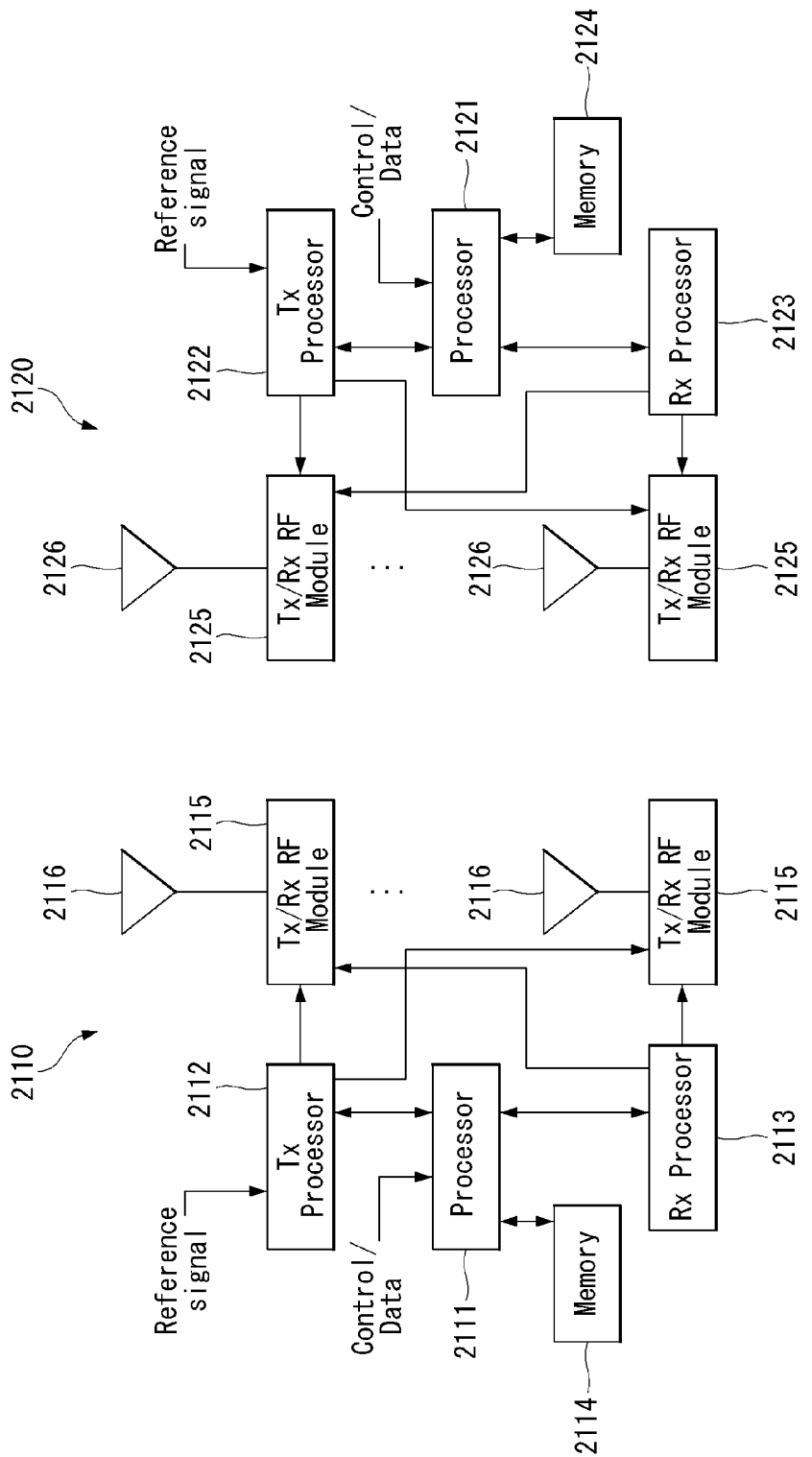
FIG. 21 illustrates another example of the block diagram of the wireless communication device to which methods proposed in this specification may be applied.

Referring to FIGS. 17, 20 and 21, a description will be given of a part implemented in the UE according to the method proposed in this specification.

In order to perform early data transmission (EDT) in the random access procedure in the wireless communication system, the UE may include a radio frequency (RF) module transmitting and receiving a radio signal, and a processor controlling the RF module.

Here, the processor of the UE controls the RF module to receive, from the UE, a control message including first information indicating whether selection for a second transport size (TBS) smaller than a first TBS for message 3 is permitted and second information for the first TBS.

The first TBS is a maximum TBS for the message 3.

In addition, the processor controls the RF module to transmit, to the base station, a request for the EDT by using message 1.

In addition, the processor controls the RF module to receive a UL grant for the message 3 from the base station.

In addition, the processor determines a repetition number for the message 3 based on the control message and the UL grant.

In addition, the processor controls the RF module to transmit the message 3 to the base station by the repetition number.

Further, the processor controls the RF module to receive, from the base station, third information for a second TBS subset including at least one second TBS.

In addition, the processor controls the RF module to select a specific second TBS in the second TBS subset and transmit the message 3 according to a repetition number for the specific second TBS.

The repetition number for the specific second TBS may be determined based on the repetition number for the message 3 configured by the UL grant, a value of the first TBS, and a value of the specific second TBS.

The request for the EDT may be identified based on at least one of a starting carrier index of an NPRACH, a non-anchor carrier index used for transmission of the NPRACH, or a random access preamble identifier (RAPID).

In addition, the message 2 may include information indicating permission or rejection of the request for the EDT.

In this case, when the request for the EDT is identified based on the RAPID, the permission or rejection may be indicated by a specific field of a medium access control (MAC) packet data unit (PDU) corresponding to the RAPID.

Here, the specific field may be a reserved bit.

Alternatively, the processor of the UE control to confirm acceptance or rejection of the request for the EDT through whether the value for the TBS included in the UL grant is the same as the value for the previous TBS.

That is, the processor of the UE may control to identify that the request for the EDT is rejected when the value for the TBS included in the UL grant is the same as the value for the previous TBS.

FIG. 19 is a flowchart illustrating an example of an operation of a base station for performing the method proposed in this specification.

That is, FIG. 19 illustrates an operation method for the base station for performing early data transmission (EDT) in the random access procedure in the wireless communication system.

First, the base station transmits, to the UE, a control message including first information indicating whether selection for a second transport size (TBS) smaller than a first TBS for message 3 is permitted and second information for the first TBS (S1910).

The message 3 may correspond to a specific coverage enhancement (CE) level.

In addition, a resource in a frequency domain and a start position of a time domain in which the message 3 is received may be constant regardless of a TBS.

Here, the first TBS means a maximum TBS for the message 3.

In addition, the base station receives, from the UE, a request for the EDT by using message 1 (S1920).

In addition, the request for the EDT may be determined based on at least one of a CE level or reference signal received power (RSRP).

In addition, the base station may receive the request for the EDT by the UE on a carrier corresponding to the CE level.

In addition, the base station transmits a UL grant for the message 3 from the UE (S1930).

In addition, the base station receives the message 3 from the UE by the specific repetition number (S1940).

Here, the specific repetition number may be determined based on the control message and the UL grant.

Additionally, after step S1940, the base station may transmit message 4 to the UE as a response the message 3.

The request for the EDT may be identified based on at least one of a starting carrier index of an NPRACH, a non-anchor carrier index used for transmission of the NPRACH, or a random access preamble identifier (RAPID).

In addition, the message 2 may include information indicating permission or rejection of the request for the EDT.

In this case, when the request for the EDT is identified based on the RAPID, the permission or rejection may be indicated by a specific field of a medium access control (MAC) packet data unit (PDU) corresponding to the RAPID.

Here, the specific field may be a reserved bit. The message 1, the UL grant, the message 3, and the message 4 described in FIG. 19 may mean a message to be transmitted and received to and from the UE in the random access procedure.

Referring to FIGS. 19, 20 and 21, a description will be given of a part implemented in the base station according to the method proposed in this specification.

In order to perform early data transmission (EDT) in the random access procedure in the wireless communication system, the base station includes a radio frequency (RF) module transmitting and receiving a radio signal, and a processor controlling the RF module.

Here, the processor of the base station controls the RF module to transmit, to the UE, a control message including first information indicating whether selection for a second transport size (TBS) smaller than a first TBS for message 3 is permitted and second information for the first TBS.

The message 3 may correspond to a specific coverage enhancement (CE) level.

In addition, a resource in a frequency domain and a start position of a time domain in which the message 3 is received may be constant regardless of a TBS.

Here, the first TBS means a maximum TBS for the message 3.

In addition, the processor of the base station controls the RF module to receive, from the UE, a request for the EDT by using message 1.

The request for the EDT may be determined based on at least one of a CE level or reference signal received power (RSRP).

In addition, the processor of the base station may control the RF module to receive the request for the EDT by the UE on a carrier corresponding to the CE level.

In addition, the processor of the base station controls the RF module to transmit a UL grant for the message 3 to the UE.

In addition, the base station controls the RF module to receive the message 3 from the UE by a specific repetition number.

Here, the specific repetition number may be determined based on the control message and the UL grant.

The request for the EDT may be identified based on at least one of a starting carrier index of an NPRACH, a non-anchor carrier index used for transmission of the NPRACH, or a random access preamble identifier (RAPID).

In addition, the message 2 may include information indicating permission or rejection of the request for the EDT.

In this case, when the request for the EDT is identified based on the RAPID, the permission or rejection may be indicated by a specific field of a medium access control (MAC) packet data unit (PDU) corresponding to the RAPID.

Here, the specific field may be a reserved bit. The message 1, the UL grant, the message 3, and the message 4 may mean a message to be transmitted and received to and from the UE in the random access procedure.

Overview of Devices to which Present Invention is Applicable

FIG. 20 illustrates a block diagram of a wireless communication device to which methods proposed in this specification may be applied.

Referring to FIG. 20, a wireless communication system includes a base station 2010 and multiple user equipment 2020 positioned within an area of the base station.

Each of the base station and the UE may be expressed as a wireless device.

The base station includes a processor 2011, a memory 2012, and a radio frequency (RF) module 2013. The processor 2011 implements a function, a process, and/or a method which are proposed in FIGS. 1 to 19 above. Layers of a radio interface protocol may be implemented by the processor. The memory is connected with the processor to store various information for driving the processor. The RF module is connected with the processor to transmit and/or receive a radio signal.

The UE includes a processor 2021, a memory 2022, and an RF module 2023.

The processor implements a function, a process, and/or a method which are proposed in FIGS. 1 to 19 above. Layers of a radio interface protocol may be implemented by the processor. The memory is connected with the processor to store various information for driving the processor. The RF module is connected with the processor to transmit and/or receive a radio signal.

The memories 2012 and 2022 may be positioned inside or outside the processors 2011 and 2021 and connected with the processor by various well-known means.

Further, the base station and/or the UE may have a single antenna or multiple antennas.

The antennas 2014 and 2024 serve to transmit and receive the radio signals.

FIG. 21 illustrates another example of the block diagram of the wireless communication device to which methods proposed in this specification may be applied.

Referring to FIG. 21, a wireless communication system includes a base station 2110 and multiple user equipment 2120 positioned within an area of the base station. The base station may be represented by a transmitting apparatus and the UE may be represented by a receiving apparatus, or vice versa. The base station and the UE include processors 2111 and 2121, memories 2114 and 2124, one or more Tx/Rx radio frequency (RF) modules 2115 and 2125, Tx processors 2112 and 2122, Rx processors 2113 and 2123, and antennas 2116 and 2126. The processor implements a function, a process, and/or a method which are described above. More specifically, a higher layer packet from a core network is provided to the processor 2111 in DL (communication from the base station to the UE). The processor implements a function of an L2 layer. In the DL, the processor provides multiplexing between a logical channel and a transmission channel and allocation of radio resources to the UE 2120, and takes charge of signaling to the terminal. The transmit (TX) processor 2112 implements various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 2116 via individual Tx/Rx modules (or transceivers, 2115). Each Tx/Rx module may modulate an RF carrier into each spatial stream for transmission. In the UE, each Tx/Rx module (or transceiver, 2125) receives a signal through each antenna 2126 of each Tx/Rx module. Each Tx/Rx module reconstructs information modulated with the RF carrier and provides the reconstructed information to the receive (RX) processor 2123. The RX processor implements various signal processing functions of layer 1. The RX processor may perform spatial processing on information in order to reconstruct an arbitrary spatial stream which is directed for the terminal. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the base station. The soft decisions may be based on channel estimation values. The soft decisions are decoded and deinterleaved to reconstruct data and control signals originally transmitted by the base station on the physical channel. The corresponding data and control signals are provided to the processor 2121.

UL (communication from the UE to the base station) is processed by the base station 2110 in a scheme similar to a scheme described in association with a receiver function in the UE 2120. Each Tx/Rx module 2125 receives the signal through each antenna 2126. Each Tx/Rx module provides the RF carrier and information to the RX processor 2123. The processor 2121 may be associated with the memory 2124 storing a program code and data. The memory may be referred to as a computer readable medium.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems in addition to the 3GPP LTE/LTE-A system.

The invention claimed is:

1. A method for performing, by a user equipment (UE), an uplink transmission using early data transmission (EDT) in a wireless communication system supporting a narrowband, the method comprising:
   receiving, from a base station (BS), control information including information representing a maximum transport block size (TBS) for the uplink transmission,
   transmitting, to the BS, a random access preamble for a request of the EDT;
   receiving, from the BS, a random access response message;
   selecting, by the UE, a specific TBS;
   determining, by the UE, a repetition number for the uplink transmission based on the specific TBS; and
   performing, by the UE, the uplink transmission by the repetition number.

2. The method of claim 1, wherein the random access preamble is a message 1, the random access response message is a message 2, and the uplink transmission is a message 3.

3. The method of claim 1, wherein the uplink transmission corresponds to a specific coverage enhancement (CE) level.

4. The method of claim 1, further comprising:
   receiving, from the BS, second information for a TBS subset including at least one TBS.

5. The method of claim 4, wherein the specific TBS is included in the TBS subset.

6. The method of claim 5, wherein the repetition number is determined based on a repetition number for the uplink transmission configured by the random access response message, the maximum TBS, and the specific TBS.

7. The method of claim 6, wherein the specific TBS is determined based on the maximum TBS.

8. The method of claim 1, wherein a resource in a frequency domain and a start position of a time domain in which the uplink transmission is transmitted are constant regardless of a TBS.

9. The method of claim 1, wherein the random access preamble for the request of the EDT is determined based on at least one of a CE level or reference signal received power (RSRP).

10. The method of claim 9, wherein the random access preamble for the request of the EDT is transmitted to the BS on a carrier corresponding to the CE level.

11. The method of claim 1, further comprising:
    monitoring a physical downlink control channel in a Type-2 common search space (CSS); and
    receiving a response message for the uplink transmission from the BS based on the physical downlink control channel.

12. The method of claim 1, wherein the random access preamble for the request of the EDT is identified based on at least one of a starting carrier index of an NPRACH, a non-anchor carrier index used for transmission of the NPRACH, or a random access preamble identifier (RAPID).

13. The method of claim 12, wherein the random access response message includes information for a permission or a rejection for the request of the EDT.

14. The method of claim 13, wherein when the request of the EDT is identified based on the RAPID, the permission or rejection is indicated by a specific field of a medium access control (MAC) packet data unit (PDU) corresponding to the RAPID.

15. The method of claim 12, further comprising:
    confirming whether a value of a TBS included in the random access response message is the same as a value for a previous TBS; and identifying that the request of the EDT is rejected when the value for the TBS included in the random access response message is the same as the value for the previous TBS.

16. A user equipment (UE) performing an uplink transmission using early data transmission (EDT) in a wireless communication system supporting a narrowband, the UE comprising:
- a transmitter and a receiver; and
- a processor, operatively coupled to the transmitter and the receiver,
- wherein the processor is configured to:
  - receive, from a base station (BS), control information including information representing a maximum transport block size (TBS) for the uplink transmission,
  - transmit, to the BS, a random access preamble for a request of the EDT,
  - receive, from the BS, a random access response message,
  - select, by the UE, a specific TBS;
  - determine, by the UE, a repetition number for the uplink transmission based on the specific TBS, and
  - performing, by the UE, the uplink transmission by the repetition number.

17. The UE of claim 16, wherein the processor is further configured to receive, from the BS, second information for a TBS subset including at least one TBS.

18. The UE of claim 17, wherein the specific TBS is included in the TBS subset transmit the message 3 according to a repetition number for the specific TBS.

19. The UE of claim 18, wherein the repetition number is determined based on a repetition number for the uplink transmission configured by the random access response message, the maximum TBS, and the specific TBS.

the encoded transform coefficient information and the predicted value.

* * * * *